United States Patent
Constantinou

(10) Patent No.: US 11,001,031 B2
(45) Date of Patent: *May 11, 2021

(54) COMPOSITE MATERIALS, METHODS OF MAKING, METHODS OF USE, AND ARTICLES INCORPORATING THE COMPOSITE MATERIALS

(71) Applicant: NIKE, Inc., Beaverton, OR (US)

(72) Inventor: Jay Constantinou, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/626,394

(22) PCT Filed: Oct. 19, 2018

(86) PCT No.: PCT/US2018/056667
§ 371 (c)(1),
(2) Date: Dec. 24, 2019

(87) PCT Pub. No.: WO2019/079692
PCT Pub. Date: Apr. 25, 2019

(65) Prior Publication Data
US 2020/0237048 A1    Jul. 30, 2020

Related U.S. Application Data

(60) Provisional application No. 62/743,380, filed on Oct. 9, 2018, provisional application No. 62/703,513, filed
(Continued)

(51) Int. Cl.
*B32B 3/26* (2006.01)
*A43B 13/04* (2006.01)
(Continued)

(52) U.S. Cl.
CPC .............. *B32B 3/266* (2013.01); *A43B 13/04* (2013.01); *A43B 13/122* (2013.01);
(Continued)

(58) Field of Classification Search
CPC .................................................... A43B 7/06
See application file for complete search history.

(56) References Cited

U.S. PATENT DOCUMENTS

| | | | |
|---|---|---|---|
| 2,920,983 A | | 1/1960 | John |
| 3,225,007 A | * | 12/1965 | Gruber .................. C08G 18/86 |
| | | | 525/440.01 |

(Continued)

FOREIGN PATENT DOCUMENTS

| | | |
|---|---|---|
| CA | 2017349 | 11/1990 |
| CN | 1890097 | 1/2007 |

(Continued)

OTHER PUBLICATIONS

Pebax Brochure: https://www.polyonedistribution.com/sites/default/files/files/featured/Pebax-Elastomers-Brochure-optimized%20%281%29.pdf (Year: 2018).*
(Continued)

*Primary Examiner* — Frank J Vineis
*Assistant Examiner* — Nicole T Gugliotta
(74) *Attorney, Agent, or Firm* — Thomas|Horstemeyer, LLP

(57) ABSTRACT

The present disclosure provides for articles including a structure having one or more channels that allow water to contact a water-swellable material. Absorption of water by the water-swellable material causes the topography of the outward-facing surface (10) of the structure to be altered, which can improve traction (95). The structure described herein can be used to make and/or be incorporated into various types of articles or components of articles. The
(Continued)

article can be an article of footwear (100, 1, 75), a component of an article of footwear (100, 1, 75), an article of apparel, a component of an article of apparel, an article of sporting equipment, or a component of an article of sporting equipment.

14 Claims, 8 Drawing Sheets

Related U.S. Application Data on Jul. 26, 2018, provisional application No. 62/693,740, filed on Jul. 3, 2018, provisional application No. 62/574,262, filed on Oct. 19, 2017.

(51) Int. Cl.
| | |
|---|---|
| *A43B 13/12* | (2006.01) |
| *B29D 35/14* | (2010.01) |
| *B32B 25/04* | (2006.01) |
| *B32B 25/08* | (2006.01) |
| *A43B 13/18* | (2006.01) |
| *A43B 13/22* | (2006.01) |
| *B29D 35/12* | (2010.01) |
| *A43C 15/16* | (2006.01) |
| *B29L 31/50* | (2006.01) |

(52) U.S. Cl.
CPC .......... *B29D 35/142* (2013.01); *B32B 25/042* (2013.01); *B32B 25/08* (2013.01); *B32B 2307/728* (2013.01); *B32B 2307/73* (2013.01); *B32B 2319/00* (2013.01); *B32B 2437/02* (2013.01)

(56) References Cited

U.S. PATENT DOCUMENTS

| | | | |
|---|---|---|---|
| 3,463,662 | A | 8/1969 | Hodes |
| 3,637,001 | A | 1/1972 | Roberts et al. |
| 4,118,354 | A | 10/1978 | Harada et al. |
| 4,271,608 | A | 6/1981 | Tomuro |
| 4,501,591 | A | 2/1985 | Ucci et al. |
| 4,520,138 | A | 5/1985 | Himes |
| 4,523,005 | A | 6/1985 | Szycher |
| 4,924,608 | A | 5/1990 | Mogonye |
| 4,990,357 | A | 2/1991 | Karakelle et al. |
| 5,120,816 | A | 6/1992 | Gould et al. |
| 5,160,790 | A | 11/1992 | Elton |
| 5,480,377 | A | 1/1996 | Cartmell et al. |
| 5,576,072 | A | 11/1996 | Hostettler et al. |
| 5,591,779 | A | 1/1997 | Bleys et al. |
| 5,709,954 | A | 1/1998 | Lyden et al. |
| 5,763,335 | A | 6/1998 | Hermann |
| 5,832,636 | A | 11/1998 | Lyden et al. |
| 5,943,792 | A | 8/1999 | Powell |
| 5,969,076 | A | 10/1999 | Lai et al. |
| 6,003,191 | A | 12/1999 | Sherry et al. |
| 6,011,104 | A | 1/2000 | Udy |
| 6,046,295 | A | 4/2000 | Frisch et al. |
| 6,076,283 | A | 6/2000 | Boie |
| 6,112,380 | A | 9/2000 | Dolan et al. |
| 6,162,369 | A | 12/2000 | Allewaert et al. |
| 6,203,812 | B1 | 3/2001 | Ehrhard et al. |
| 6,335,392 | B1 | 1/2002 | Umezawa et al. |
| 6,367,167 | B1 | 4/2002 | Krstic et al. |
| 6,698,110 | B1 | 3/2004 | Robbins |
| 6,782,642 | B2 | 8/2004 | Knoche et al. |
| 6,855,743 | B1 | 2/2005 | Gvozdic |
| 6,874,251 | B2 | 4/2005 | Moretti |
| 6,922,918 | B2 | 8/2005 | Issler |
| 6,948,264 | B1 | 9/2005 | Lyden |
| 6,949,271 | B2 | 9/2005 | Shannon et al. |
| 7,020,988 | B1 | 4/2006 | Holden et al. |
| 7,169,720 | B2 | 1/2007 | Etchells et al. |
| 7,373,739 | B2 | 5/2008 | Doerer et al. |
| 7,451,511 | B2 | 11/2008 | Ellis et al. |
| 7,451,557 | B2 | 11/2008 | McDonald et al. |
| 7,594,345 | B2 | 9/2009 | Fusco |
| 7,752,775 | B2 | 7/2010 | Lyden |
| 7,785,521 | B1 | 8/2010 | Chen |
| 7,814,687 | B2 | 10/2010 | Cook et al. |
| 7,832,120 | B2 | 11/2010 | Jung |
| 7,845,096 | B2 | 12/2010 | Ellis et al. |
| 7,854,076 | B2 | 12/2010 | Keppler et al. |
| 8,110,242 | B2 | 2/2012 | Hawkins et al. |
| 8,291,617 | B2 | 10/2012 | Halberstadt et al. |
| 8,303,977 | B2 | 11/2012 | Kuzma et al. |
| 8,609,766 | B2 | 12/2013 | Bette |
| 8,791,200 | B2 | 7/2014 | Köcher et al. |
| 8,796,394 | B2 | 8/2014 | Messersmith et al. |
| 8,853,289 | B2 | 10/2014 | Smith et al. |
| 8,906,497 | B2 * | 12/2014 | Marchgraber ......... C08J 9/0061 428/317.9 |
| 9,139,684 | B2 | 9/2015 | Coneski et al. |
| 9,206,114 | B1 | 12/2015 | Coneski et al. |
| 9,392,841 | B2 | 7/2016 | Walker et al. |
| 9,456,654 | B2 | 10/2016 | Dyer et al. |
| 10,051,913 | B2 | 8/2018 | Dyer et al. |
| 10,064,447 | B2 | 9/2018 | Wright et al. |
| 10,070,685 | B2 | 9/2018 | Walker et al. |
| 10,076,154 | B2 | 9/2018 | Walker et al. |
| 10,076,155 | B2 | 9/2018 | Dyer et al. |
| 10,076,156 | B2 | 9/2018 | Dyer et al. |
| 10,076,157 | B2 | 9/2018 | Wright et al. |
| 10,076,158 | B2 | 9/2018 | Wright et al. |
| 10,085,513 | B2 | 10/2018 | Dyer et al. |
| 10,092,062 | B2 | 10/2018 | Dyer et al. |
| 10,130,140 | B2 | 11/2018 | Dyer et al. |
| 2001/0053897 | A1 | 12/2001 | Frate et al. |
| 2002/0116843 | A1 | 8/2002 | Harrison |
| 2002/0188057 | A1 | 12/2002 | Chen |
| 2003/0074718 | A1 | 4/2003 | English |
| 2003/0213148 | A1 | 11/2003 | Knowles |
| 2003/0226283 | A1 | 12/2003 | Braunschweiler |
| 2004/0020080 | A1 | 2/2004 | Cox et al. |
| 2004/0147188 | A1 | 7/2004 | Johnson et al. |
| 2004/0255362 | A1 | 12/2004 | Soerens et al. |
| 2005/0288440 | A1 | 12/2005 | Chou et al. |
| 2006/0035030 | A1 | 2/2006 | Fan |
| 2006/0141186 | A1 | 6/2006 | Janssen et al. |
| 2007/0017124 | A1 | 1/2007 | Koo et al. |
| 2007/0124960 | A1 | 6/2007 | Friedman |
| 2007/0141306 | A1 | 6/2007 | Kasai et al. |
| 2008/0120869 | A1 | 5/2008 | Roy et al. |
| 2008/0155857 | A1 | 7/2008 | Rosen |
| 2008/0193774 | A1 * | 8/2008 | Stone ................... A43B 13/223 428/423.1 |
| 2008/0241371 | A1 | 10/2008 | Havelka et al. |
| 2008/0314287 | A1 | 12/2008 | Clark et al. |
| 2009/0084477 | A1 | 4/2009 | Sandstrom et al. |
| 2009/0090031 | A1 | 4/2009 | Jung |
| 2009/0234039 | A1 | 9/2009 | Schutte et al. |
| 2009/0313855 | A1 | 12/2009 | Yoshida et al. |
| 2010/0048752 | A1 | 2/2010 | Vignola et al. |
| 2010/0083534 | A1 | 4/2010 | Howlett |
| 2010/0109200 | A1 | 5/2010 | Cox et al. |
| 2010/0113733 | A1 | 5/2010 | Cox et al. |
| 2010/0146824 | A1 | 6/2010 | Sensini |
| 2010/0154253 | A1 | 6/2010 | Imazato et al. |
| 2010/0215707 | A1 | 8/2010 | McDonald et al. |
| 2010/0323573 | A1 | 12/2010 | Chu et al. |
| 2011/0008612 | A1 | 1/2011 | Lee |
| 2011/0112236 | A1 | 5/2011 | Ding |
| 2011/0287929 | A1 | 11/2011 | Smith et al. |
| 2012/0088602 | A1 | 4/2012 | Morken |
| 2012/0148778 | A1 | 6/2012 | Dawkins |
| 2012/0151805 | A1 | 6/2012 | Polegato |
| 2012/0210608 | A1 | 8/2012 | Baker et al. |
| 2012/0216423 | A1 | 8/2012 | Lyden |
| 2012/0216424 | A1 | 8/2012 | Lyden |
| 2012/0260535 | A1 | 10/2012 | Tsang |
| 2012/0312192 | A1 | 12/2012 | Detty et al. |

(56) References Cited

U.S. PATENT DOCUMENTS

| | | |
|---|---|---|
| 2013/0109804 A1 | 5/2013 | Kusaka et al. |
| 2013/0255103 A1 | 10/2013 | Dua et al. |
| 2013/0260104 A1 | 10/2013 | Dua et al. |
| 2013/0260629 A1 | 10/2013 | Dua et al. |
| 2013/0340295 A1 | 12/2013 | Adami et al. |
| 2014/0024768 A1 | 1/2014 | Coneski et al. |
| 2014/0075791 A1 | 3/2014 | Smith et al. |
| 2014/0217636 A1 | 8/2014 | Skaja et al. |
| 2015/0141539 A1 | 5/2015 | Lee |
| 2015/0307745 A1 | 10/2015 | Popa et al. |
| 2015/0353474 A1 | 12/2015 | Coneski et al. |
| 2015/0353741 A1 | 12/2015 | Liao |
| 2016/0058107 A1 | 3/2016 | Walker et al. |
| 2016/0136912 A1 | 5/2016 | Le et al. |
| 2016/0286905 A1 | 10/2016 | Schiller |
| 2016/0295959 A1 | 10/2016 | Dyer et al. |
| 2017/0015825 A1* | 1/2017 | Ting .................. B29D 35/122 |
| 2017/0238654 A1 | 8/2017 | Baghdadi et al. |
| 2017/0251751 A1 | 9/2017 | Baghdadi et al. |
| 2019/0116927 A1 | 4/2019 | Constantinou et al. |
| 2019/0223547 A1 | 7/2019 | Farr et al. |
| 2020/0231728 A1* | 7/2020 | Le Floch ............. B32B 25/045 |

FOREIGN PATENT DOCUMENTS

| | | | | |
|---|---|---|---|---|
| CN | 201157028 | | 12/2008 | |
| CN | 201360601 | | 12/2009 | |
| CN | 201445011 | | 5/2010 | |
| CN | 101873812 | | 10/2010 | |
| CN | 101953525 | | 1/2011 | |
| CN | 101953534 | | 1/2011 | |
| CN | 102038315 | | 5/2011 | |
| CN | 102250407 | | 11/2011 | |
| CN | 102595949 | | 7/2012 | |
| CN | 103357062 | | 10/2013 | |
| CN | 103757744 | | 4/2014 | |
| CN | 203952576 | | 11/2014 | |
| CN | 104549961 | | 4/2015 | |
| DE | 4138941 | | 6/1993 | |
| DE | 29602823 | | 4/1996 | |
| DE | 102009009589 A1 | | 9/2010 | |
| DE | 1020090009589 | * | 9/2010 | ............... A43B 7/06 |
| DE | 102013221204 | | 4/2015 | |
| EP | 1894482 | | 4/2008 | |
| EP | 2030517 | | 3/2009 | |
| EP | 2462908 | | 6/2012 | |
| EP | 2292113 | | 12/2012 | |
| GB | 2313537 | | 12/1997 | |
| JP | H06253905 | | 9/1994 | |
| JP | H08258511 | | 10/1996 | |
| JP | H105005 | | 1/1998 | |
| JP | 2000166609 | | 6/2000 | |
| JP | 2000308501 | | 11/2000 | |
| JP | 2002325601 | | 11/2002 | |
| JP | 2005111691 | | 4/2005 | |
| JP | 2008260889 | | 10/2008 | |
| JP | 2010099332 | | 5/2010 | |
| JP | 4864227 | | 2/2012 | |
| KR | 100750324 | | 8/2007 | |
| KR | 101232846 | | 6/2012 | |
| KR | 20120124616 | | 11/2012 | |
| TW | 377281 | | 12/1999 | |
| TW | 201002788 | | 1/2010 | |
| WO | 00143449 | | 7/2000 | |
| WO | 2005000061 | | 1/2005 | |
| WO | 2006015325 | | 2/2006 | |
| WO | 2007090245 | | 8/2007 | |
| WO | 2007135069 | | 11/2007 | |
| WO | 2013106658 | | 7/2013 | |
| WO | 2014025161 | | 2/2014 | |
| WO | 2014126643 | | 8/2014 | |
| WO | WO 2016/033271 | * | 3/2016 | ........... A43B 13/122 |
| WO | 2019028118 A1 | | 2/2019 | |

OTHER PUBLICATIONS

International Preliminary Report on Patentability issued for application PCT/US2018/056712, dated Dec. 13, 2019.
International Search Report for application PCT/US2018/056667, dated Jul. 3, 2019.
International Preliminary Examining Authority for application PCT/US2018/056667, dated Oct. 4, 2019.
Polgar, Lorenzo & Fallani, Francesca & Cuijpers, Juul & Raffa, Patrizio & Broekhuis, Antonius & Duin, M. & Picchioni, F.. (2017). Water-swellable elastomers: Synthesis, properties and applications. Reviews in Chemical Engineering. 35. 10.1515/revce-2017-0052.
Dehbari, Nazila. "Water-swellable rubber with nanotechnology-enabled super capacity as smart water-leakage sealant" School of Computer Science, Engineering and Mathematics. Flinders University. Jul. 2017.
International Preliminary Report on Patentability for PCT/US18/56667 dated Apr. 10, 2019.
International Search Report for PCT/US2018/056702 dated May 2, 2019.
Written Opinion of the International Searching Authority for PCT/US2018/056702 dated May 2, 2019.
International Preliminary Report on Patentability for PCT/US2018/056702 dated May 14, 2019.

* cited by examiner

COMPOSITE MATERIALS, METHODS OF MAKING, METHODS OF USE, AND ARTICLES INCORPORATING THE COMPOSITE MATERIALS

CROSS-REFERENCE TO RELATED APPLICATIONS

This application is the 35 U.S.C. § 371 national stage application of PCT Application No. PCT/US2018/056667, filed Oct. 19, 2018, which application claims the benefit of and priority to U.S. Provisional Application Ser. No. 62/574,262, having the title "RUBBER COMPOSITIONS AND USES THEREOF", filed on Oct. 19, 2017, and to U.S. Provisional Application Ser. No. 62/693,740, having the title "COLOR CHANGE MATERIALS, METHODS OF MAKING, METHODS OF USE, AND ARTICLES INCORPORATING THE COLOR CHANGE MATERIALS", filed on Jul. 3, 2018, and to U.S. Provisional Application Ser. No. 62/703,513, having the title "MATERIALS, METHODS OF MAKING, METHODS OF USE, AND ARTICLES INCORPORATING THE MATERIALS", filed on Jul. 26, 2018, and to U.S. Provisional Application Ser. No. 62/743,380, having the title "COMPOSITE MATERIALS, METHODS OF MAKING, METHODS OF USE, AND ARTICLES INCORPORATING THE COMPOSITE MATERIALS", filed on Oct. 9, 2018, the disclosures which are incorporated herein by reference in their entireties.

BACKGROUND

Articles of apparel and sporting equipment of various types are frequently used for a variety of activities including outdoor activities, military use, and/or competitive sports. The externally facing surfaces of the articles often include elements formed of elastomeric materials, including cured rubbers which include pigments or dyes. During the use of these articles, the externally facing surfaces of the articles may frequently make contact with water, either in the form of liquid water, water vapor, or wet ground.

BRIEF DESCRIPTION OF THE DRAWINGS

FIG. 3A is a side view of an example of footwear, while

DESCRIPTION

Figure 1A:
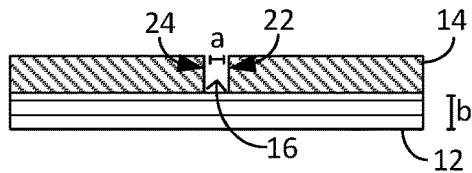
FIGS. 1A-1F illustrate various cross-sectional views and top views of structures including an embodiment of the present disclosure.
Figure 1A:
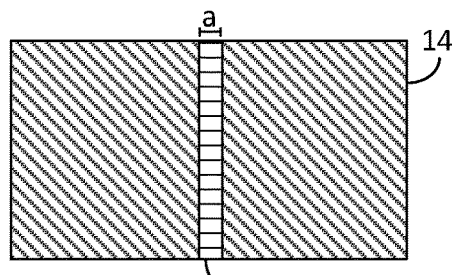

The present disclosure provides for articles including a structure, where the structure includes a first layer having an externally-facing side and an internally-facing side. The structure also includes a second layer operably attached to the internally-facing side of the first layer. The structure includes one or more channels that extend through an entire thickness of the first layer and to the second layer. In other words, the structure includes one or more channels extending from the externally-facing side of the first layer, through a core of the first layer, through the internally-facing side of the first layer and to the second layer, such that a portion of the second layer is exposed. For example, a first side of the second layer, or a portion of a core of the second layer may be exposed. The one or more channels allow water to contact the exposed region of the second layer. While the first layer of the structure is formed of a material that is substantially impermeable to water (for example, a polymeric material having a hydrophobic nature such as a cured rubber), the second layer is formed of a water-swellable material (for example, a polymeric material having a highly hydrophilic nature such as a polymeric hydrogel). Upon exposure of the structure to water, the water passes through the channel to the exposed region of the second layer. The exposed region of the second layer reversibly takes up the water and swells (i.e., expands in size), in at least one direction. In addition to swelling, the material of the second layer may undergo other changes in physical properties, such as becoming softer and/or more lubricious.

The swelling of the second layer alters topography of the at least one channel (e.g., length, width, height) and/or topography of at least a portion of the externally-facing side of the first layer of the structure (e.g., height). The presence of constraining boundaries (e.g., boundary layer) of the material of the second layer in the structure can affect the extent and dimensions of alterations that result from exposure to water. The alteration(s) in topography or dimensions of the externally-facing surface of the first layer or of the one or more channels can alter a coefficient of friction of the externally-facing surface of the first layer of the structure, for example, increasing traction of an outsole in footwear or of a gripping surface on a bat or racket under wet conditions. Alternatively or in addition, these alteration(s) in topography and/or dimensions can result in the structure acting as an actuator, moving or altering a position of an element operably connected to the first surface of the structure, such as a traction element or toe cap or rand for an article of footwear. Alternatively or additionally, these alteration(s) in topography and/or dimension can result in an aesthetically appealing change to the structure, such as by exposing a feature or color upon exposure to water which was not visible when the structure is substantially dry.

In accordance with the present disclosure, the material(s) forming the first layer of the structure is substantially impermeable to water, such, if not for the channels and/or exposed edges, the second layer of the structure would remain substantially dry. In other words, the first layer of the structure includes one or more materials having sufficiently low level of water uptake and transference such that, during normal use of the article comprising the structure, less than 0.5 weight percent of water (based on a total weight of the first layer) penetrates the first layer, passes through the interface between the first layer and the second layer, and into the second layer. The water can be in the form of liquid water (including aqueous solutions), water vapor, or wet ground (e.g., wet soil, wet grass, wet pavement, etc.) The first layer can include a material such as a cured rubber while the second layer of the structure includes a water-swellable material (e.g., an elastomeric material), such as a polymeric hydrogel, or a cured mixture of a hydrogel and a rubber. The water-swellable material of the second layer can have a water uptake capacity of 2 percent or more, such as at least 10 percent. In the structure, the first layer and the second layer are attached (e.g., affixed, adhered, bonded, or a combination thereof) to each other. In the example where the first layer comprises a cured rubber and the second layer comprises a cured mixture of a hydrogel and a rubber, the first layer and the second layer can be attached to each other using crosslinks formed between the cured rubber of the first layer and the cured rubber of the second layer by curing the first and second layers while in contact with each other. In the example where the second layer is a cured mixture of a polymeric hydrogel and a rubber, the cured mixture can include a lesser proportion of polymeric hydrogel distributed throughout a greater proportion of rubber, with at least a portion of the polymeric hydrogel in the cured mixture being physically entrapped by the cured rubber of the cured mixture.

The water-swellable material (e.g., elastomeric material) of the present disclosure combines the elastomeric properties of a cured rubber, which generally has a hydrophobic nature and a limited ability to take up water, with hydrophilic nature and ability to take up water, dry, and then again take up water, of a polymeric hydrogel. The polymeric network formed in the elastomeric material by curing the rubber with the polymeric hydrogel dispersed in it can also entrap at least a portion of the polymeric hydrogel present within the polymeric matrix formed by the curing. In many examples of the resulting elastomeric material, a majority of or substantially all of the polymeric hydrogel remains entrapped in the elastomeric material rather than migrating out of the elastomeric material when soaked in water or when repeatedly exposed to water. As can be readily appreciated, an elastomeric material which retains both its durability, elastomeric nature and ability to take up water on repeated exposure to water can be used in a variety of articles of manufacture, including articles which contact mud or soil during use, where the accumulation of mud or soil is not desirable.

Due to the presence of uncured or partially cured rubber in the uncured composition, curing the uncured composition in contact with another material (e.g., another uncured rubber, a crosslinkable polymer, or a polymer precursor, also for example the first layer and the second layer) can result in chemical bonds (e.g., crosslinking bonds, polymer bonds, etc.) forming between the elastomeric material of the present disclosure and the other material during curing. This makes it possible to bond other polymeric materials including conventional rubber (i.e., rubber substantially free of the polymeric hydrogel) and/or different elastomeric materials of the present disclosure (e.g., elastomeric materials having different formulations and/or characteristics) to one another during a curing process, without the need to use adhesives.

The structure described herein can be used to make and/or be incorporated into various types of articles or components of articles. The article can be an article of footwear, a component of an article of footwear, an article of apparel, a component of an article of apparel, an article of sporting equipment, or a component of an article of sporting equipment. In the example where the article is an article of footwear, the structure can be incorporated into an upper of the footwear or into the sole of the footwear or both. The first layer of the structure can be externally-facing when incorporated into an article and when the structure is incorporated into a sole for footwear, the structure can be ground-facing in the footwear.

When the structure is on the sole of an article of footwear, the first layer of the structure can be ground facing and can include a tread pattern. In general, the tread pattern is used to provide for traction and can include tread elements along with the one or more channels of the structure. Upon exposure to water, the water-swellable material (e.g., the polymeric hydrogel) of the second layer takes up the water and swells, causing changes in dimensions of the one or more channels (e.g., length, width, and/or height) and/or changes to the topography of the externally-facing side of the first layer, and consequently the tread patter is altered. The tread pattern can be altered by changing the height of the tread elements, the distance between two (or more) tread elements, the dimensions of the channels, the distance between sides of the channels, and the like. The changes in the tread pattern can improve traction and/or cause an aesthetically appealing change and/or can alter a position of an element operably connected to the structure such as, for example, a tread element or a rand or a toe cap. Upon drying of the second layer of the structure, the changes to topography and/or dimensions of the structure are reversed, so that the traction following drying returns substantially to the original level of traction.

When the structure is on a surface of an article of apparel or sporting equipment, the first layer of the structure can include a traction pattern. In general, the tractions pattern is used to provide for traction (e.g., improve grip) and can include a plurality of individual traction elements along with one or more channels of the structure. Upon exposure to water, the water-swellable material (e.g., the polymeric hydrogel) of the second layer takes up the water and swells, causing changes in dimensions of the one or more channels and/or changes in dimensions of the one or more channels and/or changes to topography of the externally-facing side of the first layer, and consequently the traction pattern is altered, increasing wet traction (e.g., grip) of the surface. The traction pattern can be altered by changing the height of individual traction elements, the distance between two (or more) traction elements, the number of channels, the dimensions of the channels, the distance between the sides of the channels, etc. Upon drying of the second layer of the structure, the changes in topography and/or dimensions of the structure are reversed, and the traction following drying returns substantially to the original level of traction.

When the structure is on a surface of an article of footwear, apparel or sporting equipment, the first layer of the structure can be operably connected to a moveable or positionable element. Upon exposure to water, the water-swellable material (e.g., the polymeric hydrogel) of the second layer takes up the water and swells, causing changes in dimensions of the one or more channels and/or changes in dimensions of the one or more channels and/or changes to topography of the externally-facing side of the first layer. This change in topography and/or dimension of externally-facing side of the first layer or a channel can move or re-position the attached element. The movement or repositioning of the attached element can result from changing the height of individual traction elements, the dimensions of the channels, the distance between the sides of the channels, etc. The movement or re-positioning of the attached element can serve a utilitarian function (e.g., altering traction, grip, etc.), or can serve an aesthetic function (e.g., exposing a decoration or color). Upon drying of the second layer of the structure, the changes in topography and/or dimensions of the structure are reversed, and results in the attached element returning substantially to its original position.

The present disclosure provides for a structure comprising: a first layer having an externally-facing side and an internally-facing side opposing the externally-facing side, wherein the first layer is substantially impermeable to liquid water; and a second layer attached to the internally-facing side of the first layer, wherein the second layer is water-swellable; wherein the first layer comprises one or more channels that extend through an entire thickness of the first layer to the second layer, the one or more channels expose a region of the second layer, the one or more channels allow water to contact the exposed region of the second layer, each of the one or more channels has a first channel sidewall in the first layer and an opposing second channel sidewall in the first layer, and the first sidewall has a first position relative to the second sidewall when the exposed region of the second layer is substantially dry, and a second position relative to the second sidewall when the exposed region takes up water and swells, wherein the second position differs from the first position in a measurable distance along at least a portion of a length, a width, a height, or any combination thereof, of the at least one channel. In addition, an article can include the structure as described above and herein. The second layer can comprise an elastomeric material that includes a rubber and a polymeric hydrogel. In the elastomeric material, the polymeric hydrogel can be physically entrapped by the cured rubber. In the elastomeric material, the polymeric hydrogel can be chemically entrapped by the cured rubber through chemical bonds such as crosslinking bonds. In the elastomeric material, the polymeric hydrogel can be both physically entrapped by and chemically bonded to the cured rubber. The curing can comprise forming chemical bonds between polymer chains of the rubber, which forms a polymeric network of cured rubber chains that physically entraps at least a portion the polymeric hydrogel within the elastomeric material. The curing can comprise forming chemical bonds which link polymer chains of the rubber to polymer chains of at least a portion of the polymeric hydrogel present in the elastomeric material, forming a polymeric network of the bonded cured rubber chains and hydrogel chains, which chemically entraps the at least a portion of the polymeric hydrogel within the elastomeric material.

The present disclosure provides for a method of making an article comprising: attaching a first component and a structure as described above and herein to one another, thereby forming the article. The article can be an article of footwear, an article of apparel, or an article of sporting equipment, or a component of each. The first component can be an upper component for an article of footwear while the structure can be part of a sole component for an article of footwear. Alternatively or in addition, the structure can be part of an upper of an article of footwear, and the component can be a sole component for an article of footwear. In addition, the present disclosure provides for an article comprising a product of the method as described above and provided herein.

A method of preparing the structure is also disclosed. The method comprises: attaching an internally-facing side of a first layer and a first side of a second layer, wherein the first layer is substantially impermeable to water and the second layer is water-swellable; and forming one or more channels exposing a region of the second layer, wherein each of the one or more channels extends through an entire thickness of the first layer to the second layer, includes a first channel sidewall and an opposing second channel sidewall in the first layer, and is configured to allow water to contact the exposed region of the second layer. In one example, the first layer can comprise a first composition comprising a cured rubber, and the second layer can comprise a second composition comprising a mixture of a cured rubber and a polymeric hydrogel. Optionally, the method can further comprise curing the first layer in contact with the second layer, thereby forming a chemical bond or a mechanical bond or both between the first layer material and the second layer material. The curing can be conducted after the step of forming the one or more channels. Alternatively, the curing step can be conducted prior to the step of forming the one or more channels. In a particular example, prior to the curing step, the first composition comprises an uncured rubber, and the second composition comprises a polymeric hydrogel dispersed in an uncured rubber and following the curing step, the first composition comprises a cured rubber, and the second composition comprises the polymeric hydrogel dispersed in a cured rubber, wherein the polymeric hydrogel is physically entrapped by the cured rubber.

In addition, the present disclosure provides a structure prepared according to the method as described above and herein. Also, the present disclosure provides an article of footwear prepared according to the method as described above and herein.

This disclosure is not limited to particular aspects, embodiment or examples described, and as such may, of course, vary. The terminology used herein serves the purpose of describing particular aspects, embodiments and examples only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual aspects, embodiments and examples described and illustrated herein has discrete components and features which may be readily separated from or combined with the features of any of the other several aspects, embodiments and examples without departing from the scope or spirit of the present disclosure. Any recited method may be carried out in the order of events recited or in any other order that is logically possible.

Aspects, embodiments and examples of the present disclosure will employ, unless otherwise indicated, techniques of material science, chemistry, textiles, polymer chemistry, textile chemistry, and the like, which are within the skill of the art. Such techniques are explained fully in the literature.

Unless otherwise indicated, any of the functional groups or chemical compounds described herein can be substituted or unsubstituted. A "substituted" group or chemical compound, such as an alkyl, alkenyl, alkynyl, cycloalkyl, cycloalkenyl, aryl, heteroaryl, alkoxyl, ester, ether, or carboxylic ester refers to an alkyl, alkenyl, alkynyl, cycloalkyl, cycloalkenyl, aryl, heteroaryl, alkoxyl, ester, ether, or carboxylic ester group, has at least one hydrogen radical that is substituted with a non-hydrogen radical (i.e., a substituent). Examples of non-hydrogen radicals (or substituents) include, but are not limited to, alkyl, cycloalkyl, alkenyl, cycloalkenyl, alkynyl, ether, aryl, heteroaryl, heterocycloalkyl, hydroxyl, oxy (or oxo), alkoxyl, ester, thioester, acyl, carboxyl, cyano, nitro, amino, amido, sulfur, and halo. When a substituted alkyl group includes more than one non-hydrogen radical, the substituents can be bound to the same carbon or two or more different carbon atoms.

Unless otherwise defined, all technical and scientific terms used herein have the same meaning as commonly understood by one of ordinary skill in the art of microbiology, molecular biology, medicinal chemistry, and/or organic chemistry. Although methods and materials similar or equivalent to those described herein can be used in the practice or testing of the present disclosure, suitable methods and materials are described herein.

As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

As used herein, the term "weight" refers to a mass value, such as having the units of grams, kilograms, and the like. Further, the recitations of numerical ranges by endpoints include the endpoints and all numbers within that numerical range. For example, a concentration ranging from 40 percent by weight to 60 percent by weight includes concentrations of 40 percent by weight, 60 percent by weight, and all water uptake capacities between 40 percent by weight and 60 percent by weight (e.g., 40.1 percent, 41 percent, 45 percent, 50 percent, 52.5 percent, 55 percent, 59 percent, etc.).

As used herein, the term "providing", such as for "providing a structure", when recited in the claims, is not intended to require any particular delivery or receipt of the provided item. Rather, the term "providing" is merely used to recite items that will be referred to in subsequent elements of the claim(s), for purposes of clarity and ease of readability.

As used herein, the phrase "consist essentially of" or "consisting essentially of" refer to the feature being disclosed as having primarily the listed feature without other active components (relative to the listed feature) and/or those that do not materially affect the characteristic(s) of the listed feature. For example, the elastomeric material can consist essentially of a polymeric hydrogel, which means that second composition can include fillers, colorants, etc. that do not substantially interact with or interact with the change the function or chemical characteristics of the polymeric hydrogel. In another example, the polymeric hydrogel can consist essentially of a polycarbonate hydrogel, which means that the polymeric hydrogel does not include a substantial amount or any amount of another type of polymer hydrogel such as a polyetheramide hydrogel or the like.

As used herein, the terms "at least one" and "one or more of" an element are used interchangeably, and have the same meaning that includes a single element and a plurality of the elements, and may also be represented by the suffix "(s)" at the end of the element. For example, "at least one polyurethane", "one or more polyurethanes", and "polyurethane(s)" may be used interchangeably and have the same meaning.

Now having described the present disclosure in general, additional details are provided. The present disclosure describes a structure including the first layer and the second layer attached to the first layer. The first layer is substantially impermeable to water, and has one or more channels that extend through the entire thickness of the first layer to the second layer so that water can pass through the one or more channels and contact the second layer. The structure can be used to make and/or be incorporated into various types of articles (e.g., various types articles including, but not limited to, footwear, apparel, sporting equipment, or components of each).

The second layer includes a second composition that swells when contacted with water. The second composition can include a water swellable material such as the polymeric hydrogel. In a particular example, the second composition includes a mixture of the rubber and the polymeric hydrogel. In this example, after curing of the second composition, the polymeric hydrogel is distributed throughout the cured rubber and at least a portion of the polymeric hydrogel is physically entrapped by the cured rubber. The polymeric hydrogel, when contacted by water, takes up water, reversibly, and undergoes a change in physical properties (e.g., expand) when taken up water is present in the polymeric hydrogel. Similarly, when the polymeric hydrogel is physically entrapped by cured rubber, the mixture of the polymeric hydrogel and the cured rubber, when contacted by water, takes up water, reversibly, and undergoes a change in physical properties when taken up water is present in the mixture.

As the polymeric hydrogel of the second composition of the second layer takes up water, the polymeric hydrogel can underdo a reversible physical change that can cause changes in the topography of the first layer. For example, upon uptake of water, the polymeric hydrogel, the mixture, and the second layer including the mixture can expand in the x-, y-, and/or z-directions that can cause a change in the dimensions of the channel (e.g., length, width, and/or height). As a result, absorption of water by the polymeric hydrogel can change in the dimensions of the channel and/or topography of the first layer to functionally improve the article and/or cause an aesthetic change. For example, when the structure is included in an outsole of an article of footwear, the outsole may be relatively smooth when dry, but upon exposure, the outsole can become rough due to the swelling of the polymeric hydrogel, and the expansion of the second layer of the structure in the x-, y-, and/or -z directions.

A second composition used to form the second layer can include an uncured or partially rubber and the polymeric hydrogel, where the polymeric hydrogel is distributed throughout the uncured rubber prior to curing the rubber. A first material can be disposed on the second composition (e.g., uncured or partially cured rubber) to form the first layer. The first composition and the second composition can be cured in contact with each other so that the first layer and the second layer adhere to one another following curing (e.g., cross-linking) of the rubber in the first and second layers. For example, the curing process can result in a portion of the rubber of the first layer crosslinking with a portion of the rubber of the second layer, forming chemical bonds which adhere the first layer and the second layer to each other. Additional details regarding the uncured rubber or the partially cured rubber of the second layer and the first layer as well as the polymeric hydrogel are provided below and herein.

The second composition and/or the first composition can include a crosslinking agent. The crosslinking agent can be a crosslinking agent for crosslinking uncured or partially cured rubber. The crosslinking agent can include a thermally initiated crosslinking agent. The thermally initiated crosslinking agent may be, without limitation, a sulfur-based crosslinking agent or a peroxide-based crosslinking agent. When desirable, the uncured rubber may be an ultra-violet (UV) radiation curable rubber, and the crosslinking agent is an initiator for crosslinking the radiation curable rubber to form the second layer upon exposure to UV radiation.

The present disclosure also provides for the second composition that includes the cured rubber and the polymeric hydrogel, where the polymeric hydrogel is distributed throughout the cured rubber and at least a portion (e.g., about 1 weight percent to about 100 weight percent) of the polymeric hydrogel is physically entrapped by the cured rubber and a portion can optionally (e.g., about 0 weight percent to about 50 weight percent) be chemically bonded or crosslinked with the cured rubber of the second layer and/or the first layer.

In addition, the first and second compositions can independently and optionally include one or more colorants such as dyes and pigments, which can be homogeneously or heterogeneously distributed within the composition. The selection of one or more colorants and the distribution of the colorants can be random or selected to achieve a desired aesthetic effect.

The incorporation of the structure and use in an article or component in finished articles in other applications, generally include any article of manufacture including, but not limited to, footwear, apparel, such as garments, and sporting equipment, such as balls, bats, clubs, protective gear, tires and wheels, as well as hunting, hiking, or camping equipment, or the like, are within the scope of the present disclosure, and described in more detail herein.

The article or component of a finished article can comprise the structure having the first layer including the one or more channels configured to be externally-facing when the article or component is present in a finished article and a second surface that opposes the first surface. The first side of the second layer is attached to the second side of the first layer. The second surface of the second layer is located such that it can be optionally attached (e.g., affixed, adhered, bonded, coupled) with a substrate (e.g., upper component or midsole of an article of footwear), which makes up part of the finished article.

Optionally, a side of a third layer comprising a third material can be attached to the second surface of the second layer of the structure. The third layer can be substantially water-impermeable, and can constrain and/or protect the second layer. The third layer comprises a third composition, and optionally the third composition can comprise a cured rubber. In addition to being attached (e.g., mechanically, chemically (e.g., crosslinking bonds of the rubber of each layer), etc) to the second side of the second layer, the third layer can be attached to a third side of the second layer (i.e., a first edge (or side as opposed to a top or bottom) of the second layer), or a fourth side of the second layer (i.e., a second edge of the second layer opposite the first edge), or any additional side, or all sides, of the second layer. Thus, in addition to constraining and/or protecting the second side of the second layer, the third layer can optionally constrain and/or protect (e.g., as a boundary layer) one or more additional sides (i.e., on or more edges) of the second layer.

Alternatively or in addition, a fourth layer can be attached (e.g., mechanically, chemically (e.g., crosslinking bonds of the rubber of each layer), etc) to one or more edges of the second layer of the structure. The fourth layer can be substantially water-impermeable. The fourth layer comprises a fourth composition, and optionally the fourth composition can comprise a cured rubber. The fourth layer can constrain and/or protect (e.g., as a boundary layer) one or more edges of the second layer.

The structure can extend across an entire externally-facing surface (ground facing), such as an entire bottom surface (e.g., ground-facing surface) of an article. Alternatively, the structure can be present as one or more regions of the article or component that are present at separate, discrete locations on an externally-facing side or surface of a finished article. In this example, the remaining regions of the externally-facing surface, such as the remaining bottom surface of an outsole, can be free of the structure.

The article can be an article of footwear that includes the upper component and the structure as or part of the sole. The first layer of the structure defines a portion of an externally facing side or surface of the sole, so that upon exposure to water, the water can flow through the channel(s) so that the polymeric hydrogel of the second composition absorbs the water and undergoes a physical change, which alters the topography of the first layer (e.g., tread pattern). The article of footwear can include more than one types of structures located in different areas, where the different structures can have different polymeric hydrogel thicknesses of the first layer or the second layer or both, different tread patterns, and the like. Various ways in which the structure have been presented herein, but the structure can be used in other ways or various combinations to achieve appealing aesthetic change to the article.

The structure can be incorporated into articles such as molded components, textiles, films and the like. For example, the molded component, textile or film can be used in apparel (e.g., shirts, jerseys, pants, shorts, gloves, glasses, socks, hats, caps, jackets, undergarments) or components thereof, containers (e.g., backpacks, bags), and upholstery for furniture (e.g., chairs, couches, car seats), bed coverings (e.g., sheets, blankets), table coverings, towels, flags, tents, sails, and parachutes. In addition, the structure can be used to produce articles or other items that are disposed on the article, where the article can be striking devices (e.g., bats, rackets, sticks, mallets, golf clubs, paddles, etc.), athletic equipment (e.g., golf bags, baseball and football gloves, soccer ball restriction structures), protective equipment (e.g., pads, helmets, guards, visors, masks, goggles, etc.), locomotive equipment (e.g., bicycles, motorcycles, skateboards, cars, trucks, boats, surfboards, skis, snowboards, etc.), balls or pucks for use in various sports, fishing or hunting equipment, furniture, electronic equipment, construction materials, eyewear, timepieces, jewelry, and the like.

In the example where the article of the present disclosure is an article of footwear, it may be designed for a variety of uses, such as sporting, athletic, military, work-related, recreational, or casual use. Primarily, the article of footwear is intended for outdoor use on unpaved surfaces (in part or in whole), such as on a ground surface including one or more of grass, turf, gravel, sand, dirt, clay, mud, and the like, whether as an athletic performance surface or as a general outdoor surface. However, the article of footwear may also be desirable for indoor applications, such as indoor sports including dirt playing surfaces for example (e.g., indoor baseball fields with dirt infields).

The article of footwear can be designed use in outdoor sporting activities, such as global football/soccer, golf, American football, rugby, baseball, running, track and field, cycling (e.g., road cycling and mountain biking), and the like. The article of footwear can optionally include traction elements (e.g., lugs, cleats, studs, and spikes as well as tread patterns) to provide traction on soft and slippery surfaces, wherein the elastomeric material can be located between or among the traction elements and optionally on the sides of the traction elements, but not on the surface of the traction element that directly contact the ground or surface during wear. In other words, the terminal ends of the traction elements can be substantially free of the elastomeric material of the present disclosure. Cleats, studs and spikes are commonly included in footwear designed for use in sports such as global football/soccer, golf, American football, rugby, baseball, and the like, which are frequently played on unpaved surfaces. Lugs and/or exaggerated tread patterns are commonly included in footwear including boots design for use under rugged outdoor conditions, such as trail running, hiking, and military use.

The structure including elastomeric material of the present disclosure can be incorporated into articles such as footwear or components thereof, apparel or components thereof, sporting equipment or components thereof. The structure (e.g., outsole) that can have a range of dimensions depending upon the use. In one aspect, the elastomeric material can be used in an outsole or as a layer in an outsole and can a thickness of about 0.1 millimeters to 10 millimeters, about 0.1 millimeters to 5 millimeters, about 0.1 millimeters to 2 millimeters, about 0.25 millimeters to 2 millimeters, or about 0.5 millimeters to 1 millimeter, where the width and length can vary depending upon the particular application (e.g., article to be incorporated into).

The structure can be attached (e.g., affixed, adhered, coupled, bonded, etc) to at least a portion of a substrate or component of the substrate, where the substrate can be, without limitation, natural leather, a synthetic leather, a polymeric foam, a textile, a molded solid polymeric material, or a combination thereof. The structure or a portion thereof can be attached to a substrate that comprises a thermoset polymeric material, a thermoplastic polymeric material, or a combination thereof. The thermoset polymeric material may include a rubber, such as a natural rubber, a polybutadiene rubber, a polyisoprene rubber, or any combination thereof. The thermoplastic polymeric material may include, without limitation, a thermoplastic polyurethane, a thermoplastic polyester, a thermoplastic polyamide, a thermoplastic polyolefin, or any combination thereof.

The substrate may also be comprised of a textile including, without limitation, a knit textile, a woven textile, a non-woven textile, a braided textile a crocheted textile, or any combination thereof. The textile can comprise a plurality of fibers, one or more yarns, or both. The plurality of fibers or the one or more yarns or both can include one or more natural or synthetic fibers or yarns. The synthetic fibers or yarns can comprise, consist of, or consist essentially of a thermoplastic composition. The polymeric component of the thermoplastic composition may comprise, consist of, or consist essentially of a thermoplastic polyurethane (TPU), a thermoplastic polyamide, a thermoplastic polyester, a thermoplastic polyolefin, or a mixture thereof.

In another example, the structure itself can comprise a plurality of fibers, one or more yarns, one or more textiles, or any combination thereof. The plurality of fibers, the one or more yarns, the one or more textiles, or any combination thereof, can act as a filler or as a reinforcing element in one or more layers of the structure. The one or more textiles can comprise a knit textile, a woven textile, a non-woven textile, a braided textile, a crocheted textile, or any combination thereof. The plurality of fibers, the one or more yarns, the one or more textiles, or any combination thereof, can be present in the first layer, or in the second layer, or in any optional additional layer of the structure, or in any combination thereof. One or more layers of the structure can be a composite layer, in which the plurality of fibers are dispersed in the composition of the layer (e.g., the first composition, the second composition, the third composition, etc.), or in which the composition of the first and/or second layer infiltrates a yarn and/or a textile consolidates the fibers of the yarn and/or the fibers or yarn of the textile. For example, the first layer can be a composite layer comprising a first plurality of fibers dispersed in the first composition. Similarly, the second layer can be a composite layer comprising a second textile and the second composition, wherein the second composition infiltrates gaps between fibers and/or yarns of the textile, and substantially surrounds the fibers and/or yarns of the textile. The plurality of fibers, the one or more yarns, the one or more textiles, or any combination thereof, may include one or more natural or synthetic fibers or yarns. The synthetic fibers or yarns may comprise, consist of, or consist essentially of a thermoplastic composition. The polymeric component of the thermoplastic composition may comprise, consist of, or consist essentially of a thermoplastic polyurethane (TPU), a thermoplastic polyamide, a thermoplastic polyester, a thermoplastic polyolefin, or a mixture thereof.

Optionally, the structure, or the article or component of the article including the structure can further include an adhesive, a primer, a tie layer, or a combination thereof located between one or more layer to bond the layers of the structure to one another, or to bond the structure to the article or component, or both. The adhesive, tie layer, or primer may comprise, but not be limited to, a polymer having one or more epoxy segments, urethane segments, acrylic segments, cyanoacrylate segments, silicone segments, or a combination thereof. Alternatively, the adhesive, primer, or tie layer includes a thermoplastic polyurethane. In an aspect, an adhesive, a primer, a tie layer, or a combination thereof is not located between the first and the second layer.

As described herein, the structure can include a tread pattern, in particular when used in article of footwear. The tread pattern can be present in the first layer of the structure. The plurality of channels of the structure can be part of and/or form portions of a tread pattern. The phrase "tread pattern" refers to any arrangement of tread elements and channels that are in a predetermined pattern. In some cases, tread patterns can be applied to the first layer (e.g., a sole) to enhance traction for the article of footwear. In other cases, tread patterns can be applied to the first layer to enhance the aesthetic appearance of the footwear. Upon exposure to water, the second composition (e.g., polymeric hydrogel) of the second layer that is exposed by the one or more channels absorbs the water and expands. The expansion can cause a change in the channel (e.g., one or more of the dimensions can change) and also can change the surface topography of the first layer relative to prior to being exposed to water. In other words, the tread pattern can change upon exposure to water, where the change can enhance the traction and/or aesthetic appearance of the first layer. Each dimension of the channel can be about 0.5 millimeter to 5 or 10 millimeters or more and the dimensions can be constant (e.g. a constant width or height) or vary based on the location of the channel.

The tread pattern can comprise one or more of tread elements and channels, while in other examples only channels are included. The channels can separate one or more of the tread elements. The channels can be located between adjacent tread elements. A plurality of tread elements can be integrally formed with outsole. Alternatively, the tread elements can be distinct elements that are attached to an outer surface of outsole. In some instances, the tread pattern can be disposed on various portions of outsole such as the forefoot portion, the midfoot portion, and/or the heel portion. Upon exposure of the second layer to water, the position and/or dimensions of tread elements and/or channels can be change relative to the position and/or dimensions in the dry state.

When a plurality of tread elements is included, the tread elements can have the same or different dimensions (e.g., length, width, and/or height) A portion of the tread elements can have the same dimensions while other tread elements have one or more different dimensions. The channels can have the same or different dimensions (e.g., length, width, and/or height). A portion of the channels can have the same dimensions while other tread elements have one or more different dimensions. The selection of dimensions for each of the tread elements and/or channels on areas of the tread pattern of the first layer can be selected based on the intended use.

Generally, the tread pattern can include tread elements and channels arranged in various configurations. In some embodiments, tread elements and the channels of a tread pattern can be arranged in substantially linear configurations. For example, in some cases, tread elements and the channels in a tread pattern can be arranged as linear tread elements that are oriented in a substantially lateral direction. In other cases, tread elements and the channels in a tread pattern can be arranged as linear ridges that are oriented in a substantially longitudinal direction or a diagonal direction. The tread elements and the channels of a tread pattern can be arranged in substantially nonlinear configurations. For example, in some cases, tread elements and the channels can have a generally wavy shape.

In other cases, tread elements and the channels can be arranged in any other nonlinear configuration. It will be understood that the term "nonlinear configuration" is not intended to be limited to a particular type of nonlinear shape or arrangement. For example, a nonlinear configuration for a tread pattern can include smooth nonlinear shapes such as sinusoidal shapes, wavy shapes, as well as other smooth nonlinear shapes. Also, a nonlinear configuration for a tread pattern can include polygonal nonlinear shapes with edges such as zig-zag shapes, triangle wave shapes, square wave shapes, as well as any other types of non-smooth nonlinear shapes. Furthermore, in some cases, a tread pattern can be associated with a regular nonlinear configuration that includes repeating patterns. In other cases, however, a tread pattern can be associated with an irregular nonlinear configuration that does not include repeating patterns. In still other cases, a tread pattern can be associated with a nonlinear configuration that includes some portions with repeating patterns and other portions with non-repeating patterns. Still further, some tread patterns can include nonlinear configurations that are symmetric about an axis of a first layer. For example, in embodiments including tread patterns with configurations that are sinusoidal configurations, the tread configurations may be substantially symmetric about a central longitudinal axis of the first layer. In contrast, in other embodiments including tread patterns with configurations that are irregular wave configurations, the tread configurations may not be symmetric about any axis of the first layer.

The spacing between/among the tread elements and/or the channels can vary in a regular or irregular pattern across the externally-facing surface of the first layer. Tread elements and channels can be configured in alternating patterns so that portions of the tread elements and channels are in a different direction and/or angles than other portions.

The cross-sectional shape of the tread elements and/or channels can be the same or different along the entire externally-facing surface of the first layer, or across an entire thickness of the first layer. The cross-sectional shape of the tread elements and/or channels can be triangular, rounded, square, rectangular, polygonal, or other shape. In aspect, the plurality of tread elements can comprise ridge-like tread elements, where the ground-contacting ends of the tread elements can be flat, concave, or convex while the sides can be tapered on non-tapered.

Figure 1B:
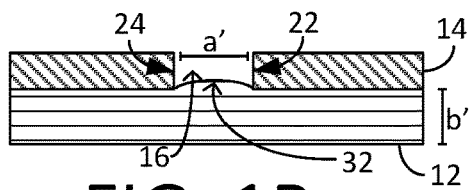
Figure 1B:
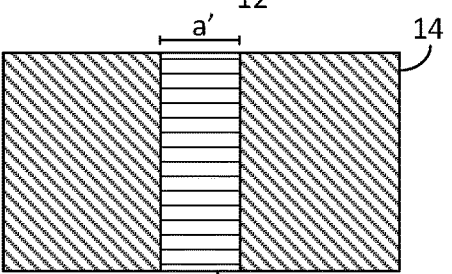

FIGS. 1A-1F illustrate cross-sectional and top views of a structure including the first layer 14, the second layer 12 and a channel 16 having a first channel wall 22 and a second channel wall 24 opposite the first channel wall 22. FIGS. 1A and 1B illustrate where the second layer 12 is unconstrained on the edges (e.g., side) and bottom. FIG. 1A illustrates the structure in the dry state and the second layer 12 has a height "b" and the channel 12 has a width "a". Upon exposure to water, the polymeric hydrogel in the second layer 12 expands, which causes the second layer height to increase to "b'" and the width of the channel 16 changes to "a'".

Figure 1C:
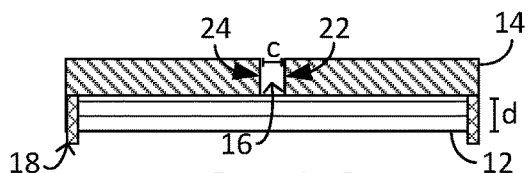
Figure 1C:
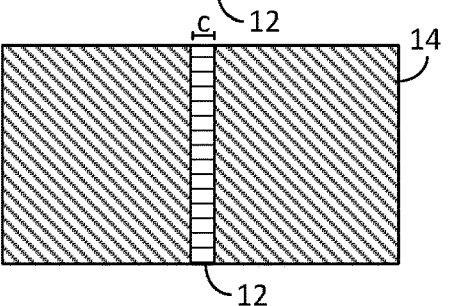
Figure 1D:
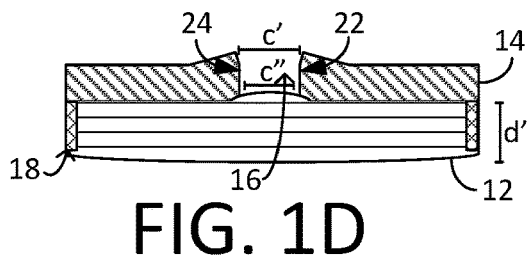
Figure 1D:
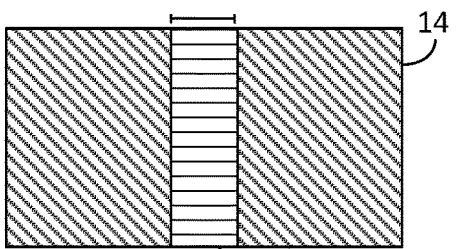

FIGS. 1C and 1D illustrate where the second layer 12 is unconstrained on the bottom but constrained on the edges by a boundary layer 18 (e.g., another layer (third layer) or component of the structure) (the edges not shown in the cross-section can also include a boundary). The boundary layer 18 can be made of any of the materials provided herein (e.g., rubber, a polymer, etc.) as well as those used in articles of footwear, articles of apparel, and articles of sporting equipment as well as components of each. FIG. 1C illustrates the structure in the dry state and the second layer 12 has a height "d" and the channel 12 has a width "c". Upon exposure to water, the polymeric hydrogel in the second layer 12 expands, which causes the second layer height to increase to "c'" and the width of the channel 16 changes to "c'" and "c''". The width of the channel 16 changes along the height of the channel 16 as shown by "c'" and "c''". The channel 16, or the first layer region around the channel 16, also changes in regard to height in that the expansion of the polymeric hydrogel pushes the first layer region to extend beyond the plane that it was in while in the dry state.

Figure 1E:
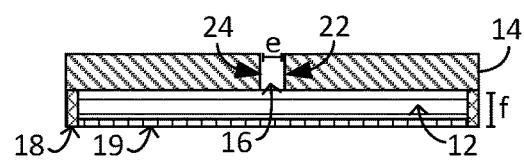
Figure 1E:
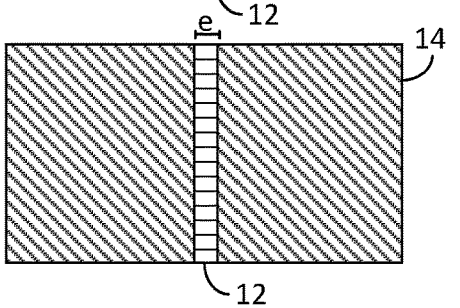
Figure 1F:
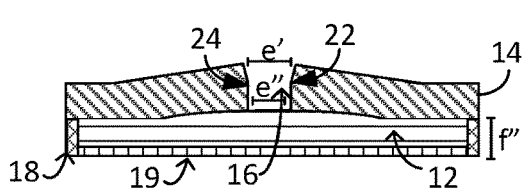
Figure 1F:
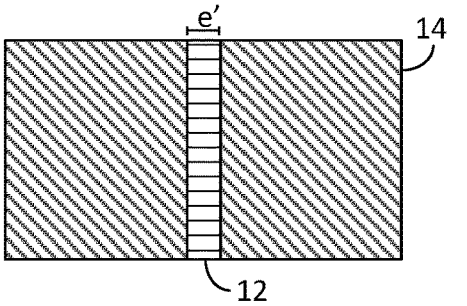

FIGS. 1E and 1F illustrate where the second layer 12 is constrained on the bottom and on the edges by a boundary layers 18 (edges) and 19 (bottom) (e.g., another layer (third and/or fourth layer) or component of the structure) (the edges not shown in the cross-section can also include a boundary). FIG. 1E illustrates the structure in the dry state and the second layer 12 has a height "f" and the channel 12 has a width "e". Upon exposure to water, the polymeric hydrogel in the second layer 12 expands, which causes the second layer height to increase to "c'" and the width of the channel 16 changes to "e'" and "e''". The width of the channel 16 changes along the height of the channel 16 as shown by "e'" and "e''". The channel 16, or the first layer region around the channel 16, also changes in regard to height in that the expansion of the polymeric hydrogel pushes the first layer region to extend beyond the plane that it was in while in the dry state.

As FIGS. 1A to 1F illustrate, the expansion of the polymeric hydrogel can change depending upon the constraints (e.g., one or more boundary layers) around, adjacent, and/or upon the second layer, but they are not to scale. The composition and design of the first and second layer, the channel dimensions, the tread design, and the constraints upon the first and/or second layer can be used to tailor the change in topography of the first layer, and/or the change in the dimensions of the channel.

Referring now to FIGS. 2A to 2G, the finished article 1 may be, without limitation, an article of apparel, such as a garment 50, or an article of sporting equipment, such as a ball cap or helmet 55, footwear 75; a tire or wheel 60; hunting, hiking, or camping equipment 65; a ball, glove, bat, club, or protective gear 70. Alternatively, the structure may be attached to, coupled with, or in contact with another material, e.g., a substrate 25 of the finished article 1. The structure can be attached to a component of the article of footwear 75. For example, the structure may be an outsole 15, for example (see FIGS. 2F & 2G).

Figure 2A:
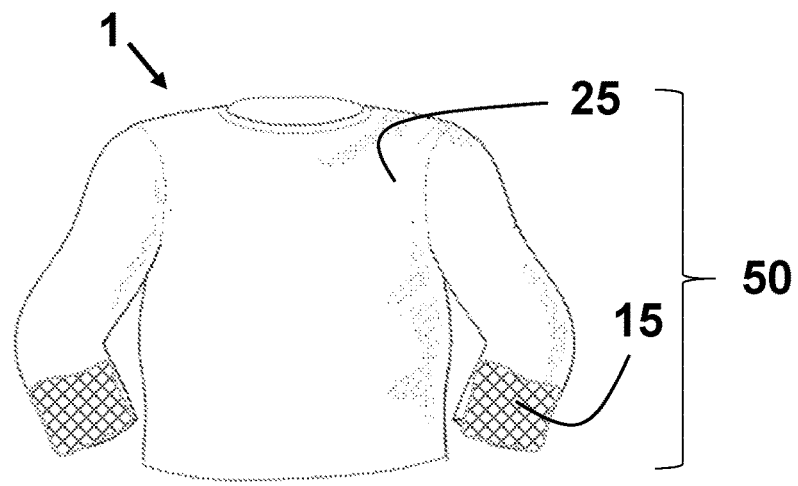
FIG. 2A is a perspective view of a finished article in the form of a garment comprising a structure of the present disclosure.
Figure 2B:
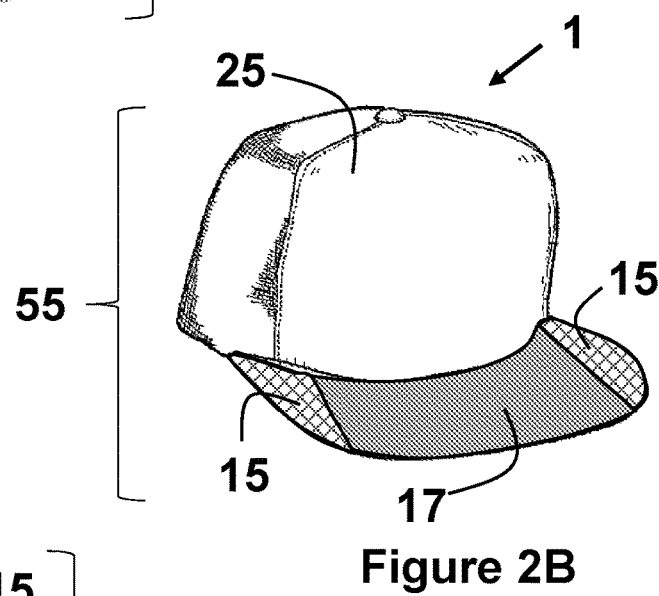
FIG. 2B is a perspective view of a finished article in the form of a ball cap or helmet comprising a structure of the present disclosure.
Figure 2C:
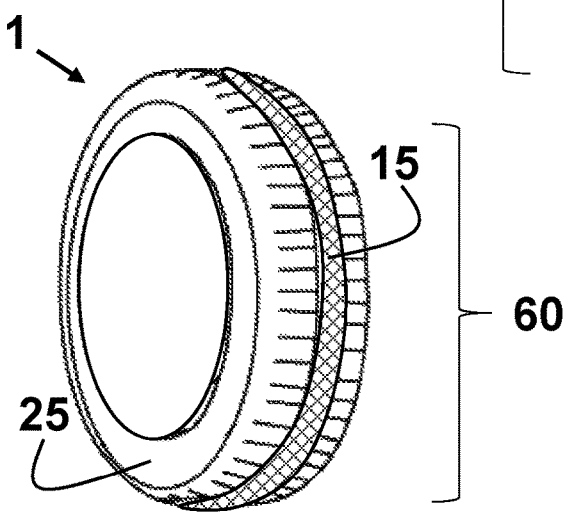
FIG. 2C is a perspective view of a finished article in the form of a tire or wheel comprising a structure of the present disclosure.
Figure 2D:
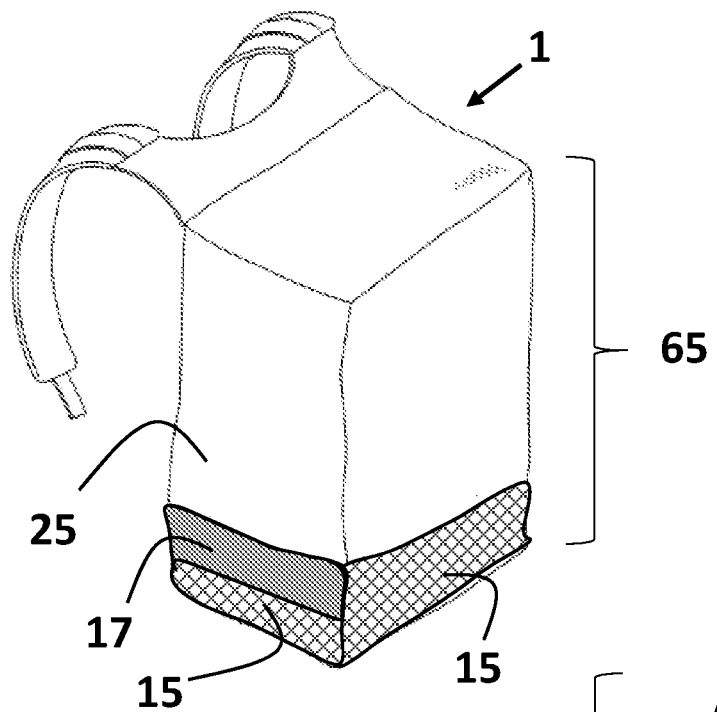
FIG. 2D is a perspective view of a finished article in the form of hiking equipment comprising a structure of the present disclosure.
Figure 2E:
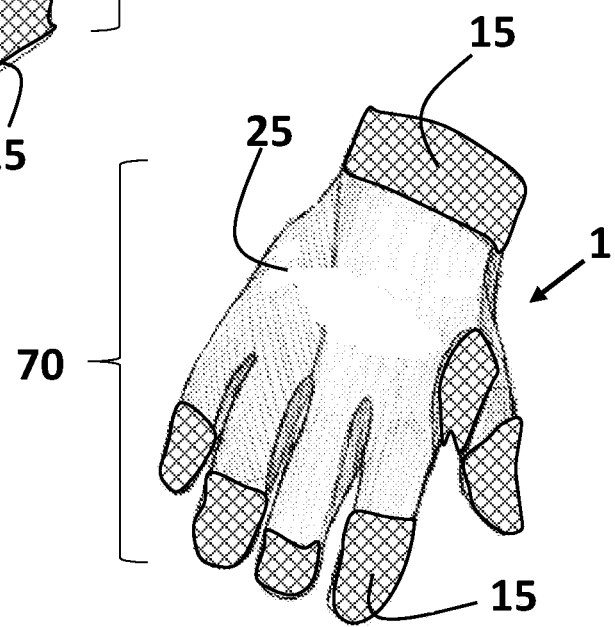
FIG. 2E is a perspective view of a finished article in the form of a protective glove comprising a structure of the present disclosure.
Figure 2F:
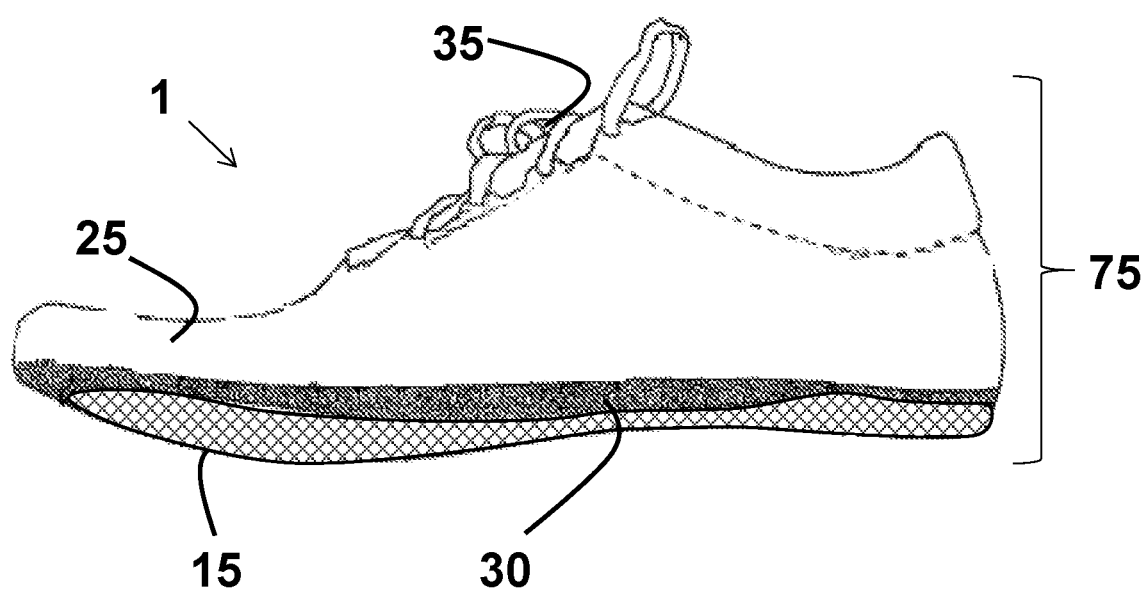
FIG. 2F is a perspective view of a finished article in the form of footwear comprising a structure of the present disclosure.
Figure 2G:
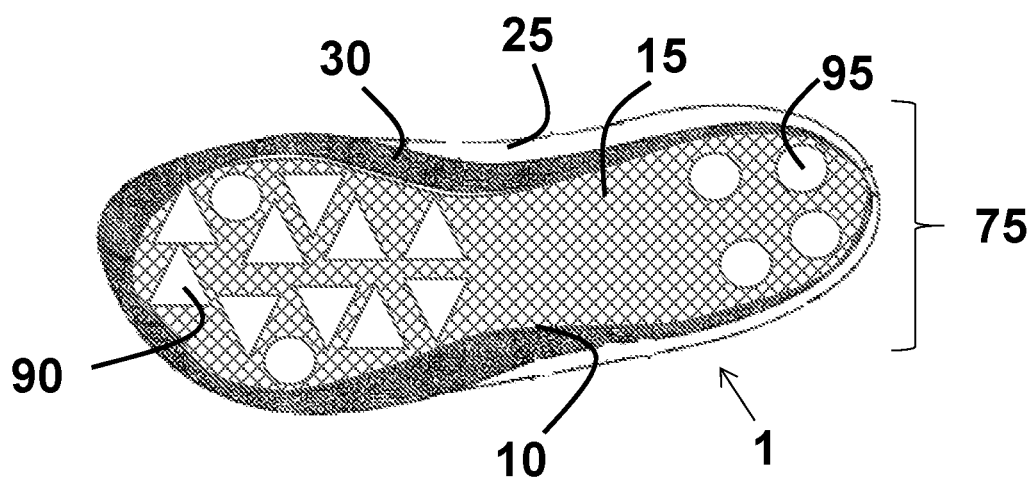
FIG. 2G is a bottom-side view of the finished article of footwear of FIG. 2F.

Referring now to FIGS. 2F and 2G, the footwear 75 or shoe 75 may comprise, consist of, or consist essentially of an upper 25 and an outsole 15 having a predetermined shape. The outsole 15 is in contact with and affixed or attached to the upper 25. At least part of the outsole 15 comprises a structure according to the present disclosure.

Still referring to FIGS. 2F and 2G, the outsole 15 refers to the very bottom of the article of footwear 75 such that one surface 10 is facing the ground during wear. The outsole 15 can exhibit a thickness that is in the range from about 0.2 millimeters to about 2.0 millimeters; alternatively, about 0.2 millimeters to about 1.0 millimeters. The outsole 15 may be relatively smooth or include a tread pattern 90. The surface 10 of the outsole 15 may directly contact the ground during wear. Optionally, the outsole 15 may also include one or more traction elements 95. When the outsole 15 includes traction elements 95, the traction elements 95 may directly contact the ground during wear, while the surface 10 of the outsole may only contact the ground when the ground is sufficiently soft that an entire height of the traction elements 95 sink into the ground during wear. The traction elements 95 may provide enhanced traction, as well as provide support or flexibility to the outsole 15 and/or provide an aesthetic design or look to the shoe.

The traction elements 95 may include, but are not limited to, various shaped projections, such as cleats, studs, spikes, or similar elements configured to enhance traction for a wearer during cutting, turning, stopping, accelerating, and backward movement as described in more detail herein. The traction elements 95 can be arranged in any suitable pattern along the bottom surface of the outsole 15. For instance, the traction 95 elements can be distributed in groups or clusters along the outsole 15 (e.g., clusters of 2-8 traction elements). Alternatively, the traction elements 95 can be arranged along the outsole 15 symmetrically or non-symmetrically between a medial side and a lateral side of the article of footwear 1. Moreover, one or more of the traction elements can be arranged along a centerline of the outsole 15 between the medial side and the lateral side.

The traction elements 95 can be made of one or more materials that are different from the materials of the first or second layers of the structure. When desirable, the traction elements 95 may be individually selected to be comprised of the same rubber as is present in the first or second layer of the structure. Alternatively, the traction elements 95 can comprise a different rubber (e.g., a harder rubber) or a different polymeric material (e.g., a different type of cured rubber, or a polymeric material substantially free of natural or synthetic rubber). In at least one of the traction elements 95 the portion of said element that makes contact with the ground may be substantially free of the structure. The one or more traction elements 95 may be made of a polymeric material that is harder than a material forming the first layer of the structure. A plurality of traction elements can be present with at least two of the plurality of traction elements differing from each other based on height, width, or thickness.

Figure 3A:
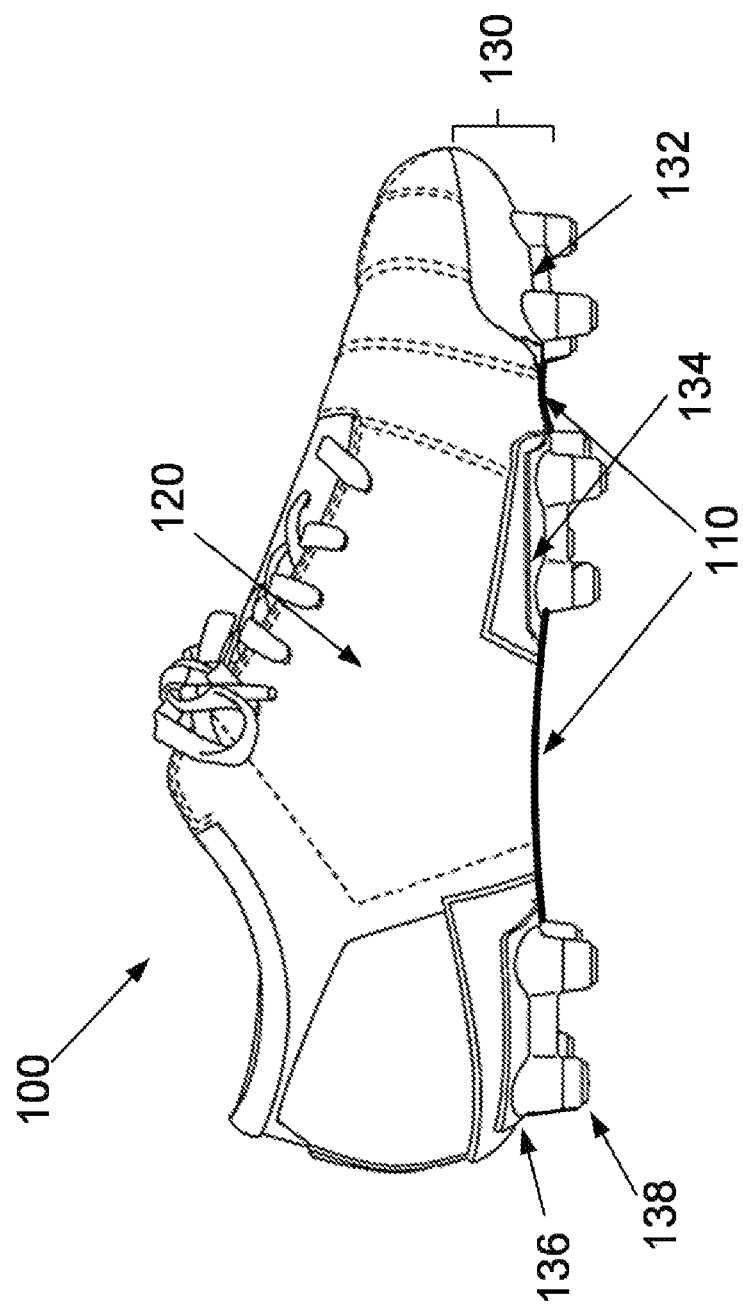
Figure 3B:
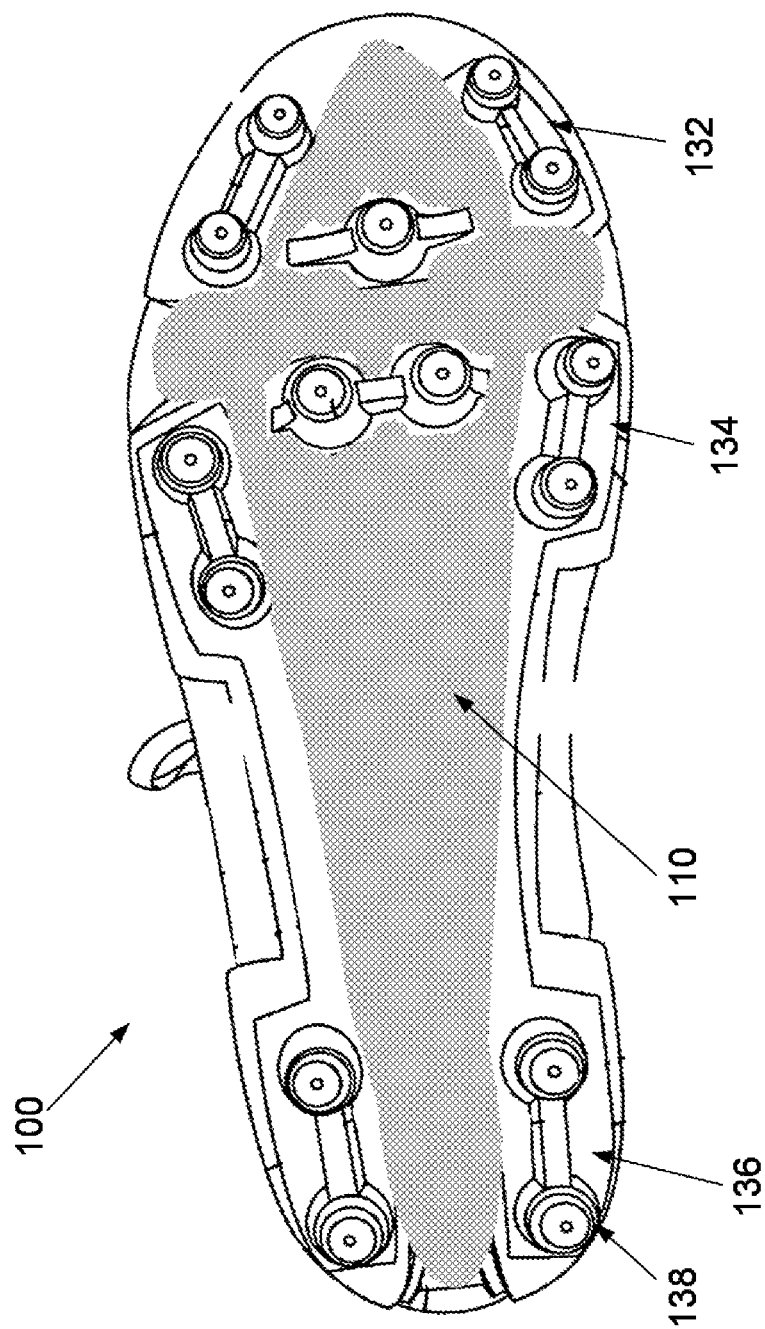
FIG. 3B is a bottom view of an example of footwear.

In another aspect, FIGS. 3A and 3B illustrates an article of footwear 100 that includes an upper 120' and a sole structure 130, where the upper 120 is secured to the sole structure 130. The sole structure 130 can include a toe plate 132, a mid-plate 134, and a heel plate 136 and traction elements 138 as well as a structure of the present disclosure, where the structure is on the outside surface so to be ground-facing under normal use. Optionally, the structure can form at least a portion of an externally-facing layer of the upper 120. The structure can be in any region of the upper 120, including in a region proximal to the sole structure 130. In other examples not depicted, the sole structure 130 may incorporate foam, one or more fluid-filled chambers, plates, moderators, or other elements that further attenuate forces, enhance stability, or influence the motions of the foot.

The upper 120 of the footwear 100 has a body which may be fabricated from materials known in the art for making articles of footwear, and is configured to receive a user's foot. The upper 120 and components of the upper 120 may be manufactured according to conventional techniques (e.g., molding, extrusion, thermoforming, stitching, knitting, etc.). The upper 120 may alternatively have any desired aesthetic design, functional design, brand designators, and the like.

The sole structure 130 may be directly or otherwise secured to the upper 120 using any suitable mechanism or method. As used herein, the terms "secured to", such as for an outsole that is secured to an upper, e.g., is operably secured to an upper, refers collectively to direct connections, indirect connections, integral formations, and combinations thereof. For instance, for the sole structure 130 that is secured to the upper 120, the sole structure 130 can be directly connected to the upper 120 using a hot melt adhesive layer and optionally include the outsole 120 indirectly connected to the upper (e.g., with an intermediate midsole), can be integrally formed with the upper (e.g., as a unitary component), and combinations thereof.

Figure 4:
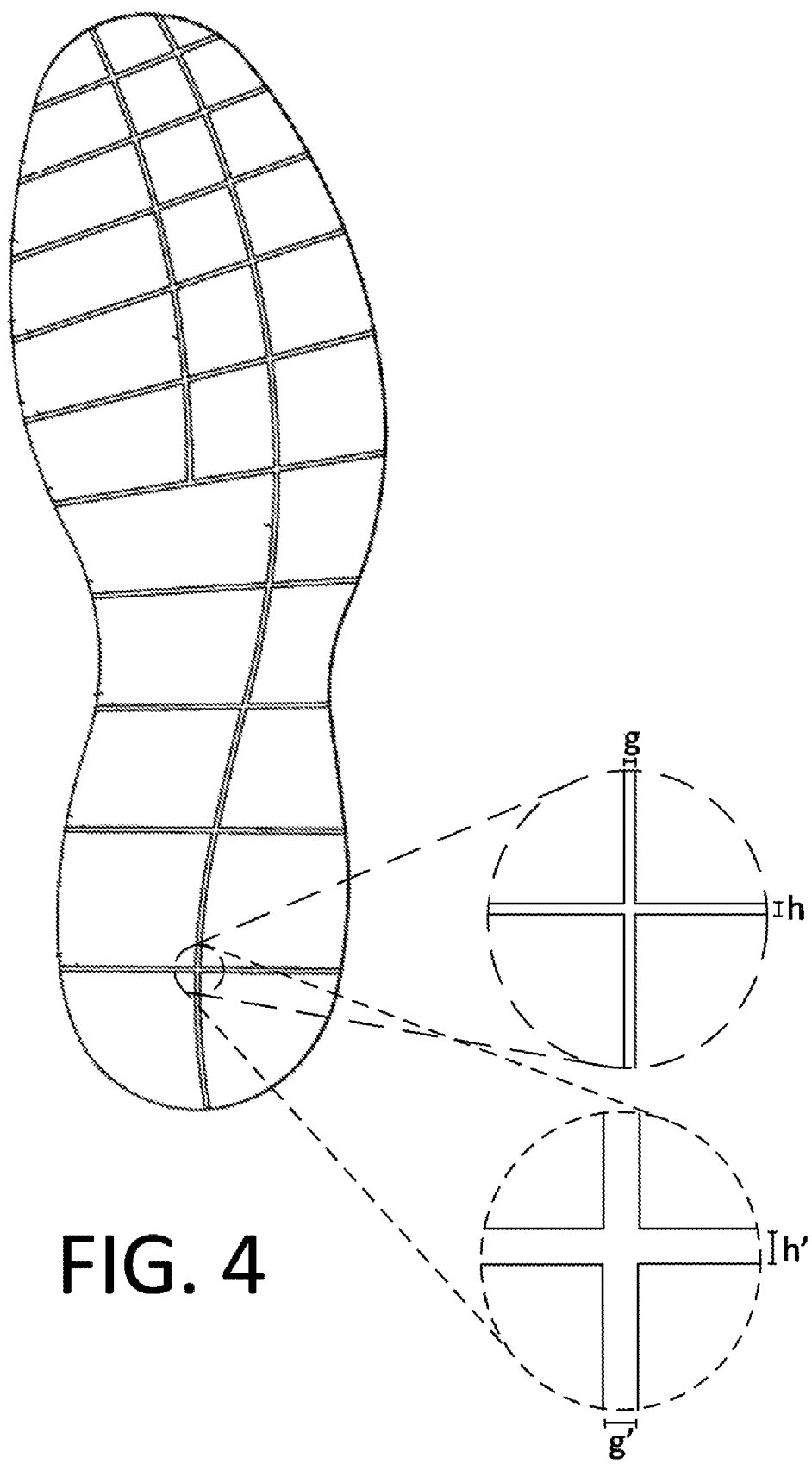
FIG. 4 illustrates a bottom view of a sole of an article of footwear including channels.
Figure 5:
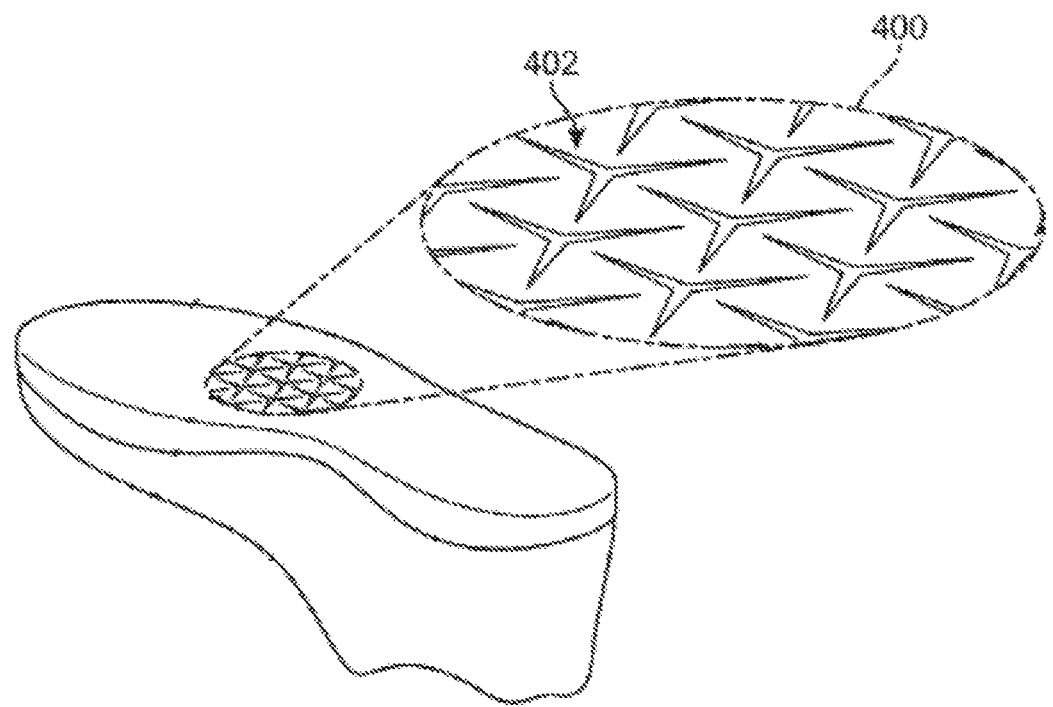
FIGS. 5 and 6 illustrate perspective views of another article of footwear including channels.
Figure 6:
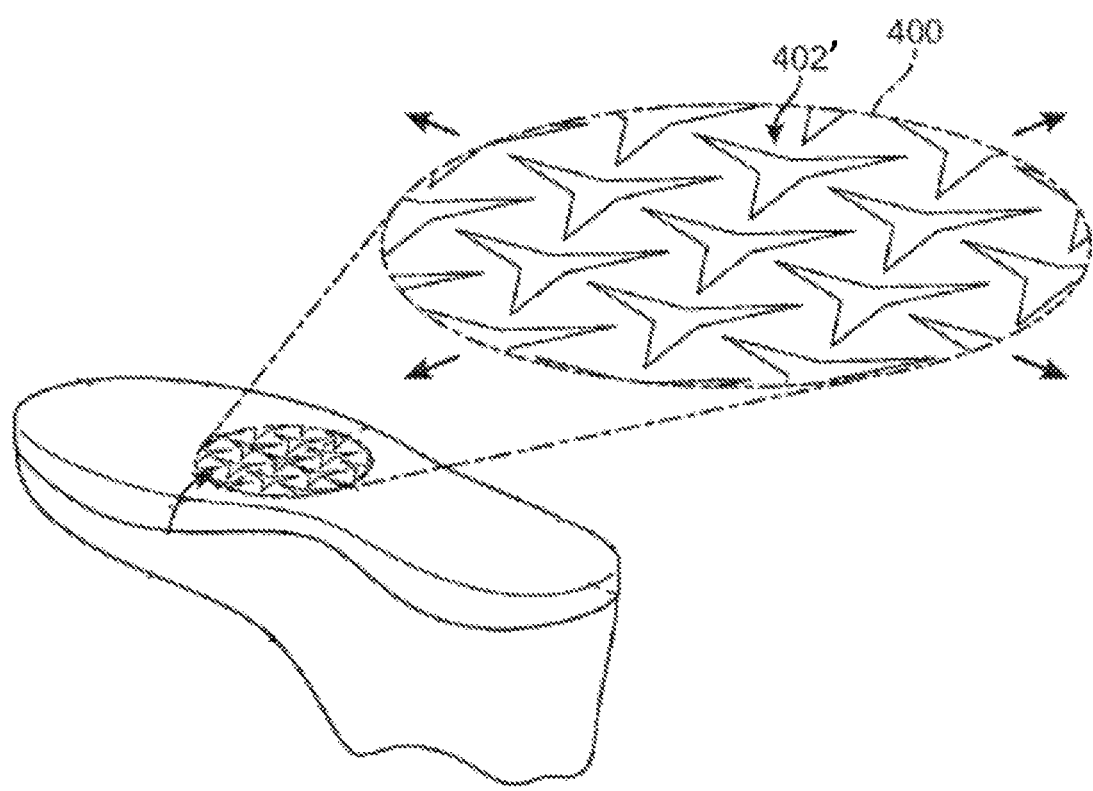

FIGS. 4-6 illustrate the sole of an article of footwear. FIG. 4 illustrates the sole of the article of footwear and the two zoomed in illustrations show the channels before and after exposure of the polymeric hydrogel to water. The width of the channels are "g" and "h" before exposure and are wider after exposure as represented by "g'" and "h'". Similarly, the channel patter for the sole shown in FIGS. 5 and 6 illustrate the "star" channel before 402 and after 402' exposure to water, and the dimension(s) change of the "star" channel change.

The term "externally-facing" or "exterior-facing" refers to the position the element (e.g., the first layer) is intended to be in when the element is present in an article during normal use. If the article is footwear, the element is positioned toward the ground during normal use (i.e., is ground-facing) by a wearer when in a standing position, and thus may optionally contact the ground including unpaved surfaces when the footwear is used in a conventional manner, such as standing, walking or running on an unpaved surface. In other words, even though the element may not necessarily be facing the ground during various steps of manufacturing or shipping, if the element is intended to face the ground during normal use by a wearer, the element is understood to be externally-facing or more specifically for an article of footwear, ground-facing. In some circumstances, due to the presence of elements such as traction elements, the externally facing (e.g., ground-facing) surface can be positioned toward the ground during conventional use but may not necessarily come into contact the ground. For example, on hard ground or paved surfaces, the terminal ends of traction elements on the outsole may directly contact the ground, while portions of the outsole located between the traction elements do not. As described in this example, the portions of the outsole located between the traction elements are considered to be externally facing (e.g., ground-facing) even though they may not directly contact the ground in all circumstances.

In some examples, the second composition or second layer can prevent or reduce the accumulation of soil in the channel or on the externally-facing side of the first layer of the structure, such as during wear on unpaved surfaces. This may be particularly true when the second composition or second layer comprises a polymeric hydrogel. For example, the topography of the first layer and/or channel can change from a dry state to a wet state when the polymeric hydrogel in the second composition of the second layer is exposed to water via the channels. The change in the topography can prevent or reduce the accumulation of soil on the externally-facing side of the first layer.

As used herein, the term "soil" can include any of a variety of materials commonly present on a ground or playing surface and which might otherwise adhere to an outsole or exposed midsole of a footwear article. Soil can include inorganic materials such as mud, sand, dirt, and gravel; organic matter such as grass, turf, leaves, other vegetation, and excrement; and combinations of inorganic and organic materials such as clay. Additionally, soil can include other materials such as pulverized rubber which may be present on or in an unpaved surface.

While not wishing to be bound by theory, it is believed that the polymeric hydrogel or the elastomeric material, when present in the second composition and the second layer and when sufficiently wet with water (including water containing dissolved, dispersed or otherwise suspended materials) can provide compressive compliance and/or expulsion of uptaken water. In particular, it is believed that the compressive compliance of the wet polymeric hydrogel, the expulsion of liquid from the wet polymeric hydrogel, the change in the topography of the first layer, a change in the dimensions of the one or more channels or combination thereof, can disrupt the adhesion of soil on or at the sole, or the cohesion of the particles to each other, or can disrupt both the adhesion and cohesion. This disruption in the adhesion and/or cohesion of soil is believed to be a responsible mechanism for preventing (or otherwise reducing) the soil from accumulating on the footwear sole (due to the presence of the wet material).

This disruption in the adhesion and/or cohesion of soil is believed to be a responsible mechanism for preventing (or otherwise reducing) the soil from accumulating on the externally-facing side of the first layer of the structure (due to the presence of the polymeric hydrogel). As can be appreciated, preventing soil from accumulating on articles of footwear, apparel or sporting equipment can improve the performance of traction elements present on the articles (e.g., on a sole) during use or wear on unpaved surfaces, can prevent the article from gaining weight due to accumulated soil during use or wear, can preserve performance of the article and thus can provide significant benefits to a user or wearer as compared to an article without the polymeric hydrogel present.

The swelling of polymeric hydrogel, the elastomeric material, the second composition, or the second layer can be observed as an increase in thickness of the second layer from the dry-state thickness of the second layer, through a range of intermediate-state thicknesses as additional water is absorbed, and finally to a saturated-state thickness of the second layer, which is an average thickness of the second layer when fully saturated with water. For example, the saturated-state thickness (or length, and/or height) for the fully saturated polymeric hydrogel, the elastomeric material, the second composition, or the second layer can be greater than 25 percent, greater than 50 percent, greater than 100 percent, greater than 150 percent, greater than 200 percent, greater than 250 percent, greater than 300 percent, greater than 350 percent, greater than 400 percent, or greater than 500 percent, of the dry-state thickness for the same second layer, as characterized by the Swelling Capacity Test. The saturated-state thickness (or length, and/or height) for the fully saturated polymeric hydrogel, the elastomeric material, the second composition, or the second layer can be about 150 percent to 500 percent, about 150 percent to 400 percent, about 150 percent to 300 percent, or about 200 percent to 300 percent of the dry-state thickness for the same second layer. In an embodiment, the increase in thickness may be greater in areas at and/or near the channel where the polymeric hydrogel, the elastomeric material, the second composition, or the second layer is exposed through the channel.

The polymeric hydrogel, the elastomeric material, the second composition, or the second layer in neat form can have an increase in thickness (or length, and/or height) at 1 hour of about 35 percent to 400 percent, about 50 percent to 300 percent, or about 100 percent to 200 percent, as characterized by the Swelling Capacity Test. In some further embodiments, the polymeric hydrogel, the elastomeric material, the second composition, or the second layer in neat form can have an increase in thickness (or length, and/or height) at 24 hours of about 45 percent to 500 percent, about 100 percent to 400 percent, or about 150 percent to 300 percent. Correspondingly, the polymeric hydrogel, the elastomeric material, the second composition, or the second layer in neat form can have an increase in volume at 1 hour of about 50 percent to 500 percent, about 75 percent to 400 percent, or about 100 percent to 300 percent. In an embodiment, the increase in thickness may be greater in areas at and/or near the channel where the polymeric hydrogel, the elastomeric material, the second composition, or the second layer is exposed through the channel.

The polymeric hydrogel, the elastomeric material, the second composition, or the second layer can quickly take up water that is in contact with the second composition. For instance, the polymeric hydrogel, the elastomeric material, the second composition, or the second layer can take up water from mud and wet grass, such as during a warmup period prior to a competitive match. Alternatively (or additionally), the polymeric hydrogel, the elastomeric material, the second composition, or the second layer can be preconditioned with water so that the second composition of the second layer is partially or fully saturated, such as by spraying or soaking the structure with water prior to use.

The polymeric hydrogel, the elastomeric material, the second composition, or the second layer can exhibit an overall water uptake capacity of about 2 percent to 225 percent as measured in the Water Uptake Capacity Test over a soaking time of 24 hours using the Component Sampling Procedure, as will be defined below. The overall water uptake capacity (at 24 hours) exhibited by the polymeric hydrogel, the elastomeric material, the second composition, or the second layer can be in the range of about 5 percent to about 225 percent; about 10 percent to about 200 percent; about 20 percent to about 150 percent; or about 30 percent to about 125 percent. The water uptake capacity, as measured by the Water Uptake Capacity test at 24 hours, exhibited by the polymeric hydrogel, the elastomeric material, the second composition, or the second layer can be about 2 percent or more, about 5 percent or more, about 10 percent or more about 20 percent or more, or about 30 percent or more. For the purpose of this disclosure, the term "overall water uptake capacity" is used to represent the amount of water by weight taken up by the polymeric hydrogel, the elastomeric material, the second composition, or the second layer as a percentage by weight of the polymeric hydrogel, the elastomeric material, the second composition, or the second layer when dry. The procedure for measuring overall water uptake capacity includes measurement of the "dry" weight of the polymeric hydrogel, the elastomeric material, the second composition, or the second layer, immersion of the second composition in water at ambient temperature (~23 degree C.) for a predetermined amount of time, followed by re-measurement of the weight of the second composition when "wet". The procedure for measuring the overall weight uptake capacity according to the Water Uptake Capacity Test using the Component Sampling Procedure is described below.

The polymeric hydrogel, the elastomeric material, the second composition, or the second layer, can exhibit an overall water uptake capacity of about 2 percent to 225 percent as measured in the Water Uptake Capacity Test over a soaking time of 24 hours using the Component Sampling Procedure, as will be defined below. The overall water uptake capacity (at 24 hours) exhibited by the the polymeric hydrogel, the elastomeric material, the second composition, or the second layer can be in the range of about 5 percent to about 225 percent; about 10 percent to about 200 percent; about 20 percent to about 150 percent; or about 30 percent to about 125 percent. The water uptake capacity, as measured by the Water Uptake Capacity test at 24 hours, exhibited by the polymeric hydrogel, the elastomeric material, the second composition, or the second layer can be about 2 percent or more, about 5 percent or more, about 10 percent or more about 20 percent or more, or about 30 percent or more. For the purpose of this disclosure, the term "overall water uptake capacity" is used to represent the amount of water by weight taken up by the polymeric hydrogel, the elastomeric material, the second composition, or the second layer as a percentage by weight of the polymeric hydrogel when dry. The procedure for measuring overall water uptake capacity includes measurement of the "dry" weight of the polymeric hydrogel, the elastomeric material, the second composition, or the second layer, immersion of the polymeric hydrogel, the elastomeric material, the second composition, or the second layer in water at ambient temperature (~23 degree C.) for a predetermined amount of time, followed by re-measurement of the weight of the polymeric hydrogel when "wet". The procedure for measuring the overall weight uptake capacity according to the Water Uptake Capacity Test using the Component Sampling Procedure is described below.

The polymeric hydrogel, the elastomeric material, the second composition, or the second layer can have a "time value" equilibrium water uptake capacity, where the time value corresponds to the duration of soaking or exposure to water (e.g., for example in use of footwear being exposed to water). For example, a "30 second equilibrium water uptake capacity" corresponds to the water uptake capacity at a soaking duration of 30 seconds, a "2 minute equilibrium water uptake capacity" corresponds to the water uptake capacity at a soaking duration of 2 minutes, and so on at various time duration of soaking. A time duration of "0 seconds" refers to the dry-state and a time duration of 24 hours corresponds to the saturated state of the polymeric hydrogel, the elastomeric material, the second composition, or the second layer at 24 hours. Additional details are provided in the Water Uptake Capacity Test Protocol described herein.

The polymeric hydrogel, the elastomeric material, the second composition, or the second layer can have a "time value" equilibrium water uptake capacity, where the time value corresponds to the duration of soaking or exposure to water (e.g., for example in use of footwear being exposed to water). For example, a "30 second equilibrium water uptake capacity" corresponds to the water uptake capacity at a soaking duration of 30 seconds, a "2 minute equilibrium water uptake capacity" corresponds to the water uptake capacity at a soaking duration of 2 minutes, and so on at various time duration of soaking. A time duration of "0 seconds" refers to the dry-state and a time duration of 24 hours corresponds to the saturated state of the polymeric hydrogel, the elastomeric material, the second composition, or the second layer at 24 hours. Additional details are provided in the Water Uptake Capacity Test Protocol described herein.

The polymeric hydrogel, the elastomeric material, the second composition, or the second layer can also be characterized by a water uptake rate of 10 $g/m^2/4$ min to 120 $g/m^2/\sqrt{min}$ as measured in the Water Uptake Rate Test using the Material Sampling Procedure. The water uptake rate is defined as the weight (in grams) of water absorbed per square meter ($m^2$) of the polymeric hydrogel, the elastomeric material, the second composition, or the second layer over the square root of the soaking time ($\sqrt{min}$). Alternatively, the water uptake rate ranges from about 12 $g/m^2/\sqrt{min}$ to about 100 $g/m^2/\sqrt{min}$; alternatively, from about 25 $g/m^2/\sqrt{min}$ to about 90 $g/m^2/\sqrt{min}$; alternatively, up to about 60 $g/m^2/\sqrt{min}$.

To cause a character change (e.g., swelling to cause a topological change in the first layer) of the polymeric hydrogel, the elastomeric material, the second composition, or the second layer, the polymeric hydrogel, the elastomeric material, the second composition, or the second layer can have a water uptake rate of 10 $g/m^2/\sqrt{min}$ to 120 $g/m^2/\sqrt{min}$ as measured in the Water Uptake Rate Test using the Material Sampling Procedure The polymeric hydrogel, the elastomeric material, the second composition, or the second layer can also be characterized by a water uptake rate of 10 $g/m^2/\sqrt{min}$ to 120 $g/m^2/\sqrt{min}$ as measured in the Water Uptake Rate Test using the Material Sampling Procedure. The water uptake rate is defined as the weight (in grams) of water absorbed per square meter ($m^2$) of the polymeric hydrogel, the elastomeric material, the second composition, or the second layer over the square root of the soaking time ($\sqrt{min}$). Alternatively, the water uptake rate ranges from about 12 $g/m^2/\sqrt{min}$ to about 100 $g/m^2/\sqrt{min}$; alternatively, from about 25 $g/m^2/\sqrt{min}$ to about 90 $g/m^2/1$ min; alternatively, up to about 60 $g/m^2/\sqrt{min}$.

To cause a character change of the polymeric hydrogel, the elastomeric material, the second composition, or the second layer, the polymeric hydrogel, the elastomeric material, the second composition, or the second layer can have a water uptake rate of 10 $g/m^2/\sqrt{min}$ to 120 $g/m^2/\sqrt{min}$ as measured in the Water Uptake Rate Test using the Material Sampling Procedure.

The overall water uptake capacity and the water uptake rate can be dependent upon the amount of the polymeric hydrogel that is present in the elastomeric material, the second composition, or the second layer. The polymeric hydrogel, the elastomeric material, the second composition, or the second layer hydrogel can characterized by a water uptake capacity of 50 percent to 2000 percent as measured according to the Water Uptake Capacity Test using the Material Sampling Procedure. In this case, the water uptake capacity of the polymeric hydrogel, the elastomeric material, the second composition, or the second layer is determined based on the amount of water by weight taken up by the polymeric hydrogel as a percentage by weight of dry polymeric hydrogel, the elastomeric material, the second composition, or the second layer. Alternatively, the water uptake capacity exhibited by the polymeric hydrogel, the elastomeric material, the second composition, or the second layer is in the range of about 100 percent to about 1500 percent; alternatively, in the range of about 300 percent to about 1200 percent.

To cause a character change of the polymeric hydrogel, the elastomeric material, the second composition, or the second layer, the polymeric hydrogel, the elastomeric material, the second composition, or the second layer can have a water uptake capacity of 50 percent to 2000 percent as measured according to the Water Uptake Capacity Test using the Material Sampling Procedure.

The polymeric hydrogel, the elastomeric material, the second composition, or the second layer can exhibit no appreciable weight loss in a Water Cycling Test. The Water Cycling Test as further defined below involves a comparison of the initial weight of the polymeric hydrogel, the elastomeric material, the second composition, or the second layer to that of the polymeric hydrogel, the elastomeric material, the second composition, or the second layer after being soaked in a water bath for a predetermined amount of time, dried and then reweighed. Alternatively, the polymeric hydrogel, the elastomeric material, the second composition, or the second layer exhibits a Water Cycling weight loss from 0 percent by weight to about 15 percent by weight as measured pursuant to the Water Cycling Test and using the Material Sampling Procedure or the Component Sampling Procedure. Alternatively, the water cycling weight loss is less than 15 percent by weight; alternatively, less than 10 percent by weight.

The polymeric hydrogel, the elastomeric material, the second composition, or the second layer may also be characterized by the degree to which it exhibits a mud pull-off force that is less than about 12 Newton (N). Alternatively, the mud pull-off force is less than about 10 N; alternatively, in the range of about 1 N to about 8 N. The mud pull-off force is determined by the Mud Pull-Off Test using the Component Sampling Procedure as described the Example section below.

The Component Sampling Procedure may constitute the Footwear Sampling Procedure, when the component is part of an article of footwear; the Apparel Sampling Procedure, when the component is part of another article of apparel (e.g., a garment); or the Equipment Sampling Procedure, when the component is part of an article of sporting equipment. The Material Sampling Procedure is used when the sample is provided in media form. Each of these sampling procedures are described in more detail in the Example section provided below.

As also discussed above, the surface of the exposed region of the polymeric hydrogel, the elastomeric material, the second composition, or the second layer can exhibit hydrophilic properties. The hydrophilic properties can be characterized by determining the static sessile drop contact angle of the polymeric hydrogel, the elastomeric material, the second composition, or the second layer surface. Accordingly, in some examples, the second composition's surface in a dry state has a static sessile drop contact angle (or dry-state contact angle) of less than 105 degree, or less than 95 degree, less than 85 degree, as characterized by the Contact Angle Test. The Contact Angle Test can be conducted on a sample obtained in accordance with the Article Sampling Procedure or the Co-Extruded Film Sampling Procedure. In some further examples, the second composition in a dry state has a static sessile drop contact angle ranging from 60 degree to 100 degree, from 70 degree to 100 degree, or from 65 degree to 95 degree.

In other examples, the surface of the exposed region of the polymeric hydrogel, the elastomeric material, the second composition, or the second layer in a wet state has a static sessile drop contact angle (or wet-state contact angle) of less than 90 degree, less than 80 degree, less than 70 degree, or less than 60 degree. In some further examples, the surface in a wet state has a static sessile drop contact angle ranging from 45 degree to 75 degree. In some cases, the dry-state static sessile drop contact angle of the surface is greater than the wet-state static sessile drop contact angle of the surface by at least 10 degree, at least 15 degree, or at least 20 degree, for example from 10 degree to 40 degree, from 10 degree to 30 degree, or from 10 degree to 20 degree.

The exposed region of the polymeric hydrogel, the elastomeric material, the second composition, or the second layer can also exhibit a low coefficient of friction when the second composition is wet. Examples of suitable coefficients of friction for the second composition in a dry state (or dry-state coefficient of friction) are less than 1.5, for instance ranging from 0.3 to 1.3, or from 0.3 to 0.7, as characterized by the Coefficient of Friction Test. The Coefficient of Friction Test can be conducted on a sample obtained in accordance with the Article Sampling Procedure, or the Co-Extruded Film Sampling Procedure. Examples of suitable coefficients of friction for the polymeric hydrogel, the elastomeric material, the second composition, or the second layer in a wet state (or wet-state coefficient of friction) are less than 0.8 or less than 0.6, for instance ranging from 0.05 to 0.6, from 0.1 to 0.6, or from 0.3 to 0.5. Furthermore, the polymeric hydrogel, the elastomeric material, the second composition, or the second layer can exhibit a reduction in its coefficient of friction from its dry state to its wet state, such as a reduction ranging from 15 percent to 90 percent, or from 50 percent to 80 percent. In some cases, the dry-state coefficient of friction is greater than the wet-state coefficient of friction for the material, for example being higher by a value of at least 0.3 or 0.5, such as 0.3 to 1.2 or 0.5 to 1.

Furthermore, the compliance of the polymeric hydrogel, the elastomeric material, the second composition, or the second layer can be characterized based on the polymeric hydrogel, the elastomeric material, the second composition, or the second layer storage modulus in the dry state (when equilibrated at 0 percent relative humidity (RH)), and in a partially wet state (e.g., when equilibrated at 50 percent RH or at 90 percent RH), and by reductions in its storage modulus between the dry and wet states. In particular, the polymeric hydrogel, the elastomeric material, the second composition, or the second layer can have a reduction in storage modulus (ΔE') from the dry state relative to the wet state. A reduction in storage modulus as the water concentration in the second composition corresponds to an increase in compliance, because less stress is required for a given strain/deformation.

The polymeric hydrogel, the elastomeric material, the second composition, or the second layer can exhibit a reduction in the storage modulus from its dry state to its wet state (50 percent RH) of more than 20 percent, more than 40 percent, more than 60 percent, more than 75 percent, more than 90 percent, or more than 99 percent, relative to the storage modulus in the dry state, and as characterized by the Storage Modulus Test with the Neat Film Sampling Process.

In some further aspects, the dry-state storage modulus of the polymeric hydrogel, the elastomeric material, the second composition, or the second layer is greater than its wet-state (50 percent RH) storage modulus by more than 25 megaPascals (MPa), by more than 50 MPa, by more than 100 MPa, by more than 300 MPa, or by more than 500 MPa, for example ranging from 25 MPa to 800 MPa, from 50 MPa to 800 MPa, from 100 MPa to 800 MPa, from 200 MPa to 800 MPa, from 400 MPa to 800 MPa, from 25 MPa to 200 MPa, from 25 MPa to 100 MPa, or from 50 MPa to 200 MPa. Additionally, the dry-state storage modulus can range from 40 MPa to 800 MPa, from 100 MPa to 600 MPa, or from 200 MPa to 400 MPa, as characterized by the Storage Modulus Test. Additionally, the wet-state storage modulus can range from 0.003 MPa to 100 MPa, from 1 MPa to 60 MPa, or from 20 MPa to 40 MPa.

The polymeric hydrogel, the elastomeric material, the second composition, or the second layer can exhibit a reduction in the storage modulus from its dry state to its wet state (90 percent RH) of more than 20 percent, more than 40 percent, more than 60 percent, more than 75 percent, more than 90 percent, or more than 99 percent, relative to the storage modulus in the dry state, and as characterized by the Storage Modulus Test with the Neat Film Sampling Process. The dry-state storage modulus of the polymeric hydrogel, the elastomeric material, the second composition, or the second layer can be greater than its wet-state (90 percent RH) storage modulus by more than 25 megaPascals (MPa), by more than 50 MPa, by more than 100 MPa, by more than 300 MPa, or by more than 500 MPa, for example ranging from 25 MPa to 800 MPa, from 50 MPa to 800 MPa, from 100 MPa to 800 MPa, from 200 MPa to 800 MPa, from 400 MPa to 800 MPa, from 25 MPa to 200 MPa, from 25 MPa to 100 MPa, or from 50 MPa to 200 MPa. Additionally, the dry-state storage modulus can range from 40 MPa to 800 MPa, from 100 MPa to 600 MPa, or from 200 MPa to 400 MPa, as characterized by the Storage Modulus Test. Additionally, the wet-state storage modulus can range from 0.003 MPa to 100 MPa, from 1 MPa to 60 MPa, or from 20 MPa to 40 MPa.

In addition to a reduction in storage modulus, the polymeric hydrogel, the elastomeric material, the second composition, or the second layer can also exhibit a reduction in its glass transition temperature from the dry state (when equilibrated at 0 percent relative humidity (RH)) to the wet state (when equilibrated at 90 percent RH). While not wishing to be bound by theory, it is believed that the water taken up by the polymeric hydrogel, the elastomeric material, the second composition, or the second layer plasticizes the polymeric hydrogel, the elastomeric material, the second composition, or the second layer, which reduces its storage modulus and its glass transition temperature, rendering the second composition more compliant (e.g., compressible, expandable, and stretchable).

The polymeric hydrogel, the elastomeric material, the second composition, or the second layer can exhibit a reduction in glass transition temperature from its dry-state (0 percent RH) glass transition temperature to its wet-state glass transition (90 percent RH) temperature of more than a 5 degree C. difference, more than a 6 degree C. difference, more than a 10 degree C. difference, or more than a 15 degree C. difference, as characterized by the Glass Transition Temperature Test with the Neat Film Sampling Process or the Neat Material Sampling Process. For instance, the reduction in glass transition temperature can range from more than a 5 degree C. difference to a 40 degree C. difference, from more than a 6 degree C. difference to a 50 degree C. difference, form more than a 10 degree C. difference to a 30 degree C. difference, from more than a 30 degree C. difference to a 45 degree C. difference, or from a 15 degree C. difference to a 20 degree C. difference. The polymeric hydrogel, the elastomeric material, the second composition, or the second layer can also exhibit a dry glass transition temperature ranging from −40 degree C. to −80 degree C., or from −40 degree C. to −60 degree C.

Alternatively (or additionally), the reduction in glass transition temperature can range from a 5 degree C. difference to a 40 degree C. difference, form a 10 degree C. difference to a 30 degree C. difference, or from a 15 degree C. difference to a 20 degree C. difference. The polymeric hydrogel, the elastomeric material, the second composition, or the second layer can also exhibit a dry glass transition temperature ranging from −40 degree C. to −80 degree C., or from −40 degree C. to −60 degree C.

The total amount of water that the polymeric hydrogel, the elastomeric material, the second composition, or the second layer can take up depends on a variety of factors, such as its composition, when present, the type and concentration of polymeric hydrogel (e.g., its hydrophilicity), its cross-linking density, its thickness, the amount of the second composition present in the second layer, and the like. The water uptake capacity and the water uptake rate of the polymeric hydrogel, the elastomeric material, the second composition, or the second layer, are dependent on the size and shape of its geometry, and are typically based on the same factors. Conversely, the water uptake rate is transient and can be defined kinetically. The three factors for water uptake rate for a given polymeric hydrogel, the elastomeric material, the second composition, or the second layer present in a given second layer having a given geometry include time, thickness, and the surface area of the exposed region available for taking up water.

As also mentioned above, in addition to swelling, the compliance of the polymeric hydrogel, the elastomeric material, the second composition, or the second layer can also increase from being relatively stiff (i.e., dry-state) to being increasingly stretchable, compressible, and malleable (i.e., wet-state). The increased compliance accordingly can allow the polymeric hydrogel, the elastomeric material, the second composition, or the second layer to readily compress under an applied pressure (e.g., during a foot strike on the ground), and in some examples, to quickly expel at least a portion of its retained water (depending on the extent of compression). While not wishing to be bound by theory, it is believed that this compressive compliance alone, water expulsion alone, or both in combination can disrupt the adhesion and/or cohesion of soil, which prevents or otherwise reduces the accumulation of soil.

In addition to quickly expelling water, in particular examples, the compressed polymeric hydrogel, the elastomeric material, the second composition, or the second layer is capable of quickly re-absorbing water when the compression is released (e.g., liftoff from a foot strike during normal use). As such, during use in a wet or damp environment (e.g., a muddy or wet ground), the polymeric hydrogel, the elastomeric material, the second composition, or the second layer can dynamically expel and repeatedly take up water over successive foot strikes, particularly from a wet surface. As such, polymeric hydrogel, the elastomeric material, the second composition, or the second layer can continue to prevent soil accumulation over extended periods of time (e.g., during an entire competitive match), particularly when there is ground water available for re-uptake, as well as undergo a character change and be aesthetically advantageous.

As used herein, the terms "take up", "taking up", "uptake", "uptaking", and the like refer to the drawing of a liquid (e.g., water) from an external source into the second layer, the second composition, and when present, the polymeric hydrogel, such as by absorption, adsorption, or both. Furthermore, as briefly mentioned above, the term "water" refers to an aqueous liquid that can be pure water, or can be an aqueous carrier with lesser amounts of dissolved, dispersed or otherwise suspended materials (e.g., particulates, other liquids, and the like).

Having described the article, the polymeric hydrogel, the elastomeric material, the first composition, the second composition, the first layer, and the second layer, in general, additional details are now provided. The article can include the structure including a second layer comprising a second composition comprising the polymeric hydrogel. In one example, the polymeric component of the second composition consists essentially of the polymeric hydrogel. In another example, the second composition is a mixture of a polymeric hydrogel and a rubber, where the polymeric hydrogel is distributed throughout the rubber. Following curing of the second composition, at least a portion (e.g. about 1 to 100 weight percent or about 50 to 100 weight percent) of the polymeric hydrogel present in the second composition is entrapped by the cured rubber. The polymeric hydrogel can be physically entrapped and/or chemically bonded to the cured rubber.

In the example where the structure is included in an article of footwear, the footwear can include an upper and a first region of an outsole comprising the first layer of the structure having one or more channels and a second layer including the second composition, for example, when the second composition comprises the mixture of the rubber and the first polymeric hydrogel. The externally-facing side of the first layer defines a portion of an externally facing side of the outsole. The article of footwear optionally can include a second region that can optionally include a second structure of the present disclosure or may include another material (e.g., rubber). The second region defines a second portion of the externally facing side of the outsole. Optionally, the second material is a second elastomeric material including a mixture of a second cured rubber and a second polymeric hydrogel. Alternatively, the second material is a second cured rubber which is substantially free of a polymeric hydrogel. The first polymeric hydrogel and the second polymeric hydrogel can be the same (e.g., the two polymeric hydrogels can be formed of the same type of polymer or combination of polymers having substantially equivalent water uptakes and are present in the elastomeric materials in substantially equivalent concentrations) or they can be different (e.g., they can be formed of different types of polymer, and/or have substantially different water uptakes, and/or be present in the elastomeric materials in substantially different concentrations). Similarly, the cured rubber of the first elastomeric material and second elastomeric material can be the same (e.g., the two cured rubbers are formed of the same type of uncured rubber or combination of uncured rubber having substantially equivalent molecular weights and are present in substantially equivalent concentrations) or they can be different (e.g., they are formed from types of uncured rubbers having different chemical structures and/or are present in substantially different concentrations).

As described herein, the second layers of the first and the second structures can include two or more different second compositions, including different types of polymeric hydrogels, where each of the second compositions have different water uptake capacities so that different physical properties are exhibited upon absorption of water but substantially the same physical properties in the dry state.

For the examples where the elastomeric material, the first composition, the second composition, the first layer, and/or the second layer or both include a rubber, additional details will be provided for the rubber.

The first elastomeric material can comprise a first colorant at a first concentration, where the type of colorant and/or the concentration of the colorant can be the same or different than a second elastomeric material. The first colorant and the second colorant can be the same or different and can have substantially the same or different concentration, where differences in the elastomeric material can be responsible for differences in a characteristic change of the elastomeric materials.

The rubber (e.g., uncured rubber, partially cured rubber, or cured rubber) of the first layer and the second layer can include one or more natural and/or synthetic rubbers. The natural or synthetic rubbers can include: butadiene rubber, styrene-butadiene (SBR) rubber, butyl rubber, isoprene rubber, urethane rubber (e.g., millable), nitrile rubber, neoprene rubber, ethylene propylene diene monomer (EPDM) rubber, ethylene-propylene rubber, urethane rubber or any combination thereof. Other examples of rubber compounds include, but are not limited to polynorbornene rubber, methyl methacrylate butadiene styrene rubber (MBS), styrene ethylene butylene (SEBS) rubber, silicone rubber, urethane rubber, and mixtures thereof. The natural or synthetic rubbers may be individually selected as virgin materials, regrind materials, or a mixture thereof.

The uncured rubber can be a millable rubber, such as a millable polyurethane rubber. The millable rubber may be a thermally curable millable rubber, such as a thermally curable millable polyurethane rubber, for example, a sulfur or peroxide curable millable rubber. The millable rubber may also be a UV curable polyurethane rubber such as, for example, MILLATHANE UV-curable millable polyurethane rubber (TSE Industries Inc., Clearwater, Fla., USA). The millable polyurethane rubber may be made be reacting either polyester or polyether polyols with diisocyanates, such as methylene diphenyl diisocyanate (MDI) or toluene diisocyanate (TDI), with or without a chain extender.

The rubber further can include an additive. For example, the additive can include a plurality of polymer chains individually having a maleic anhydride moiety grafted to the polymer chain. The additive can be a functionalized polymer which has been modified by grafting maleic anhydride groups into the polymer backbone, end groups, or side groups, including ethylene-based polymers with maleic anhydride grafting. The additive can be a maleic-anhydride modified polymer such as "FUSABOND" (sold by E. I. du Pont de Nemours and Company, Wilmington, Del., USA). The functionalized polymer can include modified ethylene acrylate carbon monoxide terpolymers, ethylene vinyl acetates (EVAs), polyethylenes, metallocenepolyethylenes, ethylene propylene rubbers and polypropylenes, where the modification to the functional polymer can include maleic anhydride grafted to the functional polymer. The amount of the additive present in the uncured rubber formulation can be up to 10 parts per hundred resin (phr), or from about 1 phr to about 8 phr, or from about 3 phr to about 6 phr.

The rubber can further comprise fillers; process oils; and/or a curing package including at least one of crosslinking agent(s), crosslinking accelerator(s), and crosslinking retarder(s). Examples of fillers include, but are not limited to, carbon black, silica, and talc. Examples of process oils include, but are not limited to, paraffin oil and/or aromatic oils. Examples of crosslinking agents include, but are not limited to sulfur or peroxide agents such as di-t-amyl peroxide, di-t-butyl peroxide, t-butyl cumyl peroxide, dicumyl peroxide (DCP), di(2-methyl-1-phenyl-2-propyl)peroxide, t-butyl 2-methyl-1-phenyl-2-propyl peroxide, di(t-buylperoxy)-diisopropylbenzene, 2,5-dimethyl-2,5-di(t-butylperoxy)hexane, 2,5-dimethyl-2,5-di(t-butylperoxy)hexyne-3,1,1-di(t-butylperoxy)-3,3,5-trimethylcyclohexane, 4,4-di(t-butylperoxy)-n-butylvalerate, and mixtures thereof. Examples of crosslinking accelerators include, but are not limited to, N-cyclohexyl-2-benzothiazole sulfenamide (CBZ), N-oxydiethylene-2-benzothiazole sulfenamide, N,N-diisopropyl-2-benzothiazole sulfenamide, 2-mercaptobenzothiazole, 2-(2,4-dinitrophenyl)mercaptobenzothiazole, 2-(2,6-diethyl-4-morpholinothio)benzothiazole and dibenzothiazyl disulfide; guanidine compounds, such as diphenylguanidine (DPG), triphenylguanidine, diorthonitrileguanidine, orthonitrile biguanide and diphenylguanidine phthalate; aldehyde amine compounds or aldehyde ammonia compounds, such as acetaldehyde-aniline reaction product, butylaldehyde-aniline condensate, hexamethylenetetramine and acetaldehyde ammonia; imidazoline compounds, such as 2-mercaptoimidazoline; thiourea compounds, such as thiocarbanilide, diethylthiourea, dibutyithiourea, trimethylthiourea and diorthotolylthiourea; thiuram compounds, such as tetramethylthiuram monosulfide, tetramethylthiuram disulfide, tetraethytthiuram disulfide, tetrabutylthiuram disulfide and pentamethylenethiuram tetrasulfide; dithioate compounds, such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium dimethyldithiocarbamate; xanthate compounds, such as zinc dibutylxanthogenate; and other compounds, such as zinc white. Examples of crosslinking retarders include, but are not limited to, alkoxyphenols, catechols, and benzoquinones, and alkoxyphenols such as 3,5-di-t-butyl-4-hydroxyanisol.

In the completed structure, the elastomeric material and/or the rubber comprises at least some level of crosslinking, is at least partially cured, and generally is fully cured. When the structure is used in an article, in the finished article, the rubber is at least partially cured, and is generally fully cured. Or stated another way, in the first and/or second layer including the rubber, the rubber is at least partially cured. As used herein, the term "partially cured" generally refers to a compound (e.g., a rubber) having a relatively low crosslink density of less than or equal to 10-moles per cubic centimeter, or less than or equal to 10-5 moles per cubic centimeter. For example, the partially cured first or second composition can have from about 15 to about 1500 monomer units present between crosslinks. Dynamic mechanical analysis (DMA) can be used to determine the modulus plateau for the compound. In the region of the modulus plateau above the glass transition temperature of the compound and below the melting point of the compound, the crosslink density is directly proportional to the modulus of the compound. As used herein, the term "cured" generally refers to a compound (e.g., a rubber) having a relatively high crosslink density. For example, the crosslink density of the cured compound can be at least 20 percent greater, or at least 30 percent greater, or at least 50 percent greater than the crosslink density of the uncured or partially cured composition.

Examples of crosslinking reactions include, but are not limited to, free-radical reactions, ionic reactions (both anionic and cationic), addition reactions, and metal salt reactions. Crosslinking reactions can be initiated by actinic radiation, including thermal radiation, UV radiation, electron beam radiation, and other types of high energy radiations. The crosslinking reactions can occur during a vulcanization process.

The term "partially cured" can denote the occurrence of at least about 1 percent, alternatively, at least about 5 percent of the total polymerization required to achieve a substantially full cure. The term "fully cured" is intended to mean a substantially full cure in which the degree of curing is such that the physical properties of the cured material do not noticeably change upon further exposure to conditions that induce curing (e.g., temperature, pressure, presence of curing agents, etc.).

In regard to the polymeric hydrogel, the polymeric hydrogel is distributed throughout the uncured rubber and/or the cured rubber in the elastomeric material. Upon curing of the uncured rubber, at least a portion of the polymeric hydrogel in the elastomeric material may be entrapped (e.g., physically entrapped and/or chemically) by the cured rubber. A portion of the polymeric hydrogel can optionally be chemically (e.g., covalently or ionically) bonded to the cured rubber in the elastomeric material or in an adjacent surface or structure. Substantially all of the polymeric hydrogel in the elastomeric material can be entrapped (e.g., physically or chemically) by the cured rubber.

The polymeric hydrogel is present in the composition and/or elastomeric material in an amount of about 5 weight percent to about 85 weight percent based on the overall weight of the resin (i.e., polymeric) component present in composition or the elastomeric material. Alternatively, the polymeric hydrogel is present in an amount that ranges from about 10 weight percent to about 80 weight percent based on the overall weight of the resin component of the composition or the elastomeric material; alternatively, about 15 weight percent to about 70 weight percent. In other words, the composition and/or the elastomeric material can comprise from about 5 parts per hundred resin (phr), or about 10 to 80 phr, or about 15 to 70 phr of the polymeric hydrogel. In an embodiment, the composition and/or elastomeric material includes from about 0.5 parts per hundred resin to about 85 parts per hundred resin of the polymeric hydrogel based on an overall weight of the composition, wherein the composition includes from about 5 parts per hundred to about 80 parts per hundred of the polymeric hydrogel based on an overall weight of the composition, wherein the composition includes from about 10 parts per hundred to about 75 parts per hundred of the polymeric hydrogel based on an overall weight of the composition, or wherein the composition includes from about 20 parts per hundred to about 70 parts per hundred of the polymeric hydrogel based on an overall weight of the composition.

For the purpose of this disclosure, the term "weight" refers to a mass value, such as having the units of grams, kilograms, and the like. Further, the recitations of numerical ranges by endpoints include the endpoints and all numbers within that numerical range. For example, a concentration ranging from 40 percent by weight to 60 percent by weight includes concentrations of 40 percent by weight, 60 percent by weight, and all concentrations there between (e.g., 40.1 percent, 41 percent, 45 percent, 50 percent, 52.5 percent, 55 percent, 59 percent, etc.). For example, a concentration ranging from 40 phr to 60 phr includes concentrations of 40 phr, 60 phr, and all concentrations there between (e.g., 40.1 phr, 41 phr, 45 phr, 50 phr, 52.5 phr, 55 phr, 59 phr, etc.).

Additional details are provided for the polymeric hydrogel component of the composition (e.g., second composition) and/or elastomeric material. The composition and/or elastomeric material includes the polymeric hydrogel distributed throughout the rubber, (i.e., the uncured rubber or the cured rubber) portion of the composition, and/or elastomeric material. Upon curing of the elastomeric material, at least a portion of the polymeric hydrogel in the composition may be entrapped (e.g., physically entrapped and/or chemically entrapped) by the cured rubber. For example, a portion of the polymeric hydrogel can optionally be covalently bonded to the cured rubber in the elastomeric material, and/or substantially all of the polymeric hydrogel in the elastomeric material can be physically entrapped by the cured rubber.

The polymeric hydrogel can be a thermoset hydrogel or a thermoplastic hydrogel. The polymeric hydrogel can be an elastomeric hydrogel, including an elastomeric thermoset hydrogel or an elastomeric thermoplastic hydrogel. The polymeric hydrogel can comprise one or more polymers. The polymer can be selected from: polyurethanes (including elastomeric polyurethanes, thermoplastic polyurethanes (TPUs), and elastomeric TPUs), polyesters, polyethers, polyamides, vinyl polymers (e.g., copolymers of vinyl alcohol, vinyl esters, ethylene, acrylates, methacrylates, styrene, and so on), polyacrylonitriles, polyphenylene ethers, polycarbonates, polyureas, polystyrenes, co-polymers thereof (including polyester-polyurethanes, polyether-polyurethanes, polycarbonate-polyurethanes, polyether block polyamides (PEBAs), and styrene block copolymers), and any combination thereof, as described herein. The polymer can include one or more polymers selected from the group consisting of polyesters, polyethers, polyamides, polyurethanes, polyolefins copolymers of each, and combinations thereof. The polymeric hydrogel can comprise a single type of polymeric hydrogel, or a mixture of two or more types of polymeric hydrogels. The polymeric hydrogel can comprise or consist essentially of a polyurethane hydrogel. The polymeric network of the elastomeric material can include one or more polyurethane hydrogels. Polyurethane hydrogels are prepared from one or more diisocyanate and one or more hydrophilic diol. A hydrophobic diol can be used in addition to the hydrophilic diol. The polymerization is normally carried out using roughly an equivalent amount of the diol and diisocyanate. Examples of hydrophilic diols are polyethylene glycols or copolymers of ethylene glycol and propylene glycol. The diisocyanate can be selected from a wide variety of aliphatic or aromatic diisocyanates. The relative hydrophobicity of the resulting polymer is determined by the amount and type of the hydrophilic diols, the type and amount of the hydrophobic diols, and the type and amount of the diisocyanates.

The polymeric hydrogel can comprise or consist essentially of a polyurea hydrogel. The polymeric network of the elastomeric material can include one or more polyurea hydrogels. Polyurea hydrogels are prepared from one or more diisocyanate and one or more hydrophilic diamine. A hydrophobic diamine can be used in addition to the hydrophilic diamine. The polymerization is normally carried out using roughly an equivalent amount of the diamine and diisocyanate. Typical hydrophilic diamines are amine-terminated polyethylene oxides and amine-terminated copolymers of polyethylene oxide/polypropylene. Examples are JEFFAMINE diamines sold by Huntsman (The Woodlands, Tex., USA). The diisocyanate can be selected from a wide variety of aliphatic or aromatic diisocyanates. The hydrophobicity of the resulting polymer is determined by the amount and type of the hydrophilic diamine, the type and amount of the hydrophobic amine, and the type and amount of the diisocyanate.

The polymeric hydrogel can comprise or consist essentially of a polyester hydrogel. The polymeric network of the elastomeric material can comprise one or more polyester hydrogels. Polyester hydrogels can be prepared from dicarboxylic acids (or dicarboxylic acid derivatives) and diols where part or all of the diol is a hydrophilic diol. Examples of hydrophilic diols are polyethylene glycols or copolymers of ethylene glycol and propylene glycol. A second hydrophobic diol can also be used to control the polarity of the final polymer. One or more diacid can be used which can be either aromatic or aliphatic. Block polyesters prepared from hydrophilic diols and lactones of hydroxyacids can also be used. The lactone can be polymerized on each end of the hydrophilic diol to produce a triblock polymer. In addition, these triblock segments can be linked together to produce a multiblock polymer by reaction with a dicarboxylic acid.

The polymeric hydrogel can comprise or consist essentially of a polycarbonate hydrogel. The polymeric network of the elastomeric material can comprise one or more polycarbonate hydrogels. Polycarbonates are typically prepared by reacting a diol with phosgene or a carbonate diester. A hydrophilic polycarbonate is produced when part or all of the diol is a hydrophilic diol. Examples of hydrophilic diols are hydroxyl terminated polyethers of ethylene glycol or polyethers of ethylene glycol with propylene glycol. A second hydrophobic diol can also be included to control the polarity of the final polymer.

The polymeric hydrogel can comprise or consist essentially of a polyetheramide hydrogel. The polymeric network of the elastomeric material can comprise one or more polyetheramide hydrogels. Polyetheramides are prepared from dicarboxylic acids (or dicarboxylic acid derivatives) and polyether diamines (a polyether terminated on each end with an amino group). Hydrophilic amine-terminated polyethers can be used to produce hydrophilic polymers that can swell with water. Hydrophobic diamines can be used in conjunction with hydrophilic diamines to control the hydrophilicity of the final polyetheramide hydrogel. In addition, the type dicarboxylic acid segment can be selected to control the polarity of the polyetheramide hydrogel and the physical properties of the polyetheramide hydrogel. Typical hydrophilic diamines are amine-terminated polyethylene oxides and amine-terminated copolymers of polyethylene oxide/polypropylene. Examples are JEFFAMINE diamines sold by Huntsman (The Woodlands, Tex., USA).

The polymeric hydrogel can comprise or consist essentially of a hydrogel formed of addition polymers of ethylenically unsaturated monomers. The polymeric network of the elastomeric material can comprise one or more hydrogels formed of addition polymers of ethylenically unsaturated monomers. The addition polymers of ethylenically unsaturated monomers can be random polymers. The addition polymers can be prepared by free radical polymerization of one of more hydrophilic ethylenically unsaturated monomer and one or more hydrophobic ethylenically unsaturated monomers. Examples of hydrophilic monomers are acrylic acid, methacrylic acid, 2-acrylamido-2-methylpropane sulphonic acid, vinyl sulphonic acid, sodium p-styrene sulfonate, [3-(methacryloylamino)propyl]trimethylammonium chloride, 2-hydroxyethyl methacrylate, acrylamide, N,N-dimethylacrylamide, 2-vinylpyrrolidone, (meth)acrylate esters of polyethylene glycol, and (meth)acrylate esters of polyethylene glycol monomethyl ether. Examples of hydrophobic monomers are (meth)acrylate esters of C1 to C4 alcohols, polystyrene, polystyrene methacrylate macromonomer and mono(meth)acrylate esters of siloxanes. The water uptake and physical characteristics of the resulting polymeric hydrogel can be tuned by selection of the monomer and the amounts of each monomer type.

The addition polymers of ethylenically unsaturated monomers can be comb polymers. Comb polymers are produced when one of the monomers is a macromer (an oligomer with an ethylenically unsaturated group one end). In one case the main chain is hydrophilic while the side chains are hydrophobic. Alternatively the comb backbone can be hydrophobic while the side chains are hydrophilic. An example is a backbone of a hydrophobic monomer such as styrene with the methacrylate monoester of polyethylene glycol.

The addition polymers of ethylenically unsaturated monomers can be block polymers. Block polymers of ethylenically unsaturated monomers can be prepared by methods such as anionic polymerization or controlled free radical polymerization. In one example, hydrogels are produced when the polymer has both hydrophilic blocks and hydrophobic blocks. The polymeric hydrogel can be a diblock polymer (A-B) polymer, triblock polymer (A-B-A) or multiblock polymer. Triblock polymers with hydrophobic end blocks and a hydrophilic center block can be useful for this application. Block polymers can be prepared by other means as well. Partial hydrolysis of polyacrylonitrile polymers produces multiblock polymers with hydrophilic domains (hydrolyzed) separated by hydrophobic domains (unhydrolyzed) such that the partially hydrolyzed polymer acts as a hydrogel. The hydrolysis converts acrylonitrile units to hydrophilic acrylamide or acrylic acid units in a multiblock pattern.

The polymeric hydrogel can comprise or consist essentially of a hydrogel formed of copolymers. The polymeric network of the elastomeric material can comprise one or more hydrogels formed of copolymers. Copolymers combine two or more types of monomeric units within each polymer chain to achieve the desired set of properties. Of particular interest are polyurethane/polyurea copolymers, polyurethane/polyester copolymers, and polyester/polycarbonate copolymers.

The polymeric hydrogel present may be characterized as including a plurality of polymer or copolymer chains in which each chain is independently selected to comprise a combination of both hard segments and soft segments. These hard and soft segments can exist as phase separated regions within the polymeric network while the polymeric hydrogel is in a solid (non-molten) state. The hard segments can form portions of the polymer chain backbones, and can exhibit high polarities, allowing the hard segments of multiple polymer chains to aggregate together, or interact with each other, to form semi-crystalline regions in the polymeric network. Typically, in polymeric hydrogels having both soft segments and hard segments, each of the soft segments of the polymeric hydrogel independently has a greater level of hydrophilicity than each of the hard segments.

A "semi-crystalline" or "crystalline" region has an ordered molecular structure with sharp melting points, which remains solid until a given quantity of heat is absorbed and then rapidly changes into a low viscosity liquid. A "pseudo-crystalline" region has properties of a crystal, but does not exhibit a true crystalline diffraction pattern. For ease of reference, the term "crystalline region" is used herein to collectively refer to a crystalline region, a semi-crystalline region, and a pseudo-crystalline region of a network of polymeric hydrogel chains. In some examples, the hard segments of polymeric hydrogels form crystalline regions.

In comparison, the soft segments of these polymeric hydrogels can be longer, more flexible, hydrophilic regions and can form networks that allow the elastomeric material to expand and swell under the pressure of taken up water. The soft segments can constitute amorphous hydrophilic regions of the hydrogel, or of crosslinked portions of the elastomeric material. The soft segments, or amorphous regions, can also form portions of the backbones of the polymer chains of the polymeric hydrogel along with the hard segments. Additionally, one or more portions of the soft segments, or amorphous regions, can be grafted or otherwise represent pendant chains that extend from the backbones at the soft segments. Each of the soft segments independently can include a plurality of hydroxyl groups, one or more poly(ethylene oxide) (PEO) segments, or both. The soft segments, or amorphous regions, can be covalently bonded to the hard segments, or crystalline regions (e.g., through carbamate linkages). For example, the polymeric hydrogel can include a plurality of amorphous hydrophilic regions covalently bonded to the crystalline regions of the hard segments.

The polymeric hydrogel, or the polymeric network of the elastomeric material, or both, can include a plurality of polymer or copolymer chains having at least a portion of the chains comprising a hard segment that is physically crosslinked to other hard segments and a soft segment covalently bonded to the hard segment, such as through a carbamate group or an ester group, among other functional groups.

The polymeric hydrogel or the polymeric network of the elastomeric material, or both, thereof may include a plurality of polymer or copolymer chains. At least a portion of the polymer or copolymer chains can include a first segment that forms at least a crystalline region with other hard segments of the copolymer chains and a second segment, such as a soft segment (e.g., a segment having polyether chains or one or more ether groups) covalently bonded to the first segment. In this example, the soft segment forms amorphous regions of the hydrogel or crosslinked polymeric network. The hydrogel or crosslinked polymeric network can include a plurality of polymer or copolymer chains, where at least a portion of the polymer or copolymer chains has hydrophilic segments.

The polymeric hydrogel can be an aliphatic polyurethane (TPU) resin that comprises a combination of hard segments and soft segments, wherein the hard segments include one or more segments having isocyanate groups. The hard segments may include segments formed from hexamethylene diisocyanate (HDI) or 4,4'-methylenebis(cyclohexyl isocyanate) (HMDI) in combination with 1,4-butanediol (1,4-BD) as a chain extender as shown in formula (F-1A). The segments having isocyanate groups include segments having isocyanate groups that are directly bonded to segments formed from the 1,4-BD. The soft segments may be formed from poly(ethylene oxide) (PEO) as shown in formula (F-1B). The reaction product or polymeric hydrogel formed of both hard segments, HS, and the soft segments, SS, may correspond to the formula shown in (F-1C), wherein the SS and HS correspond to the formulas shown in (F-1 D) and (F-1E), respectively. The polymeric hydrogel may exhibit an average ratio of a number of soft segments to a number of hard segments (SS:HS) present in the copolymer chains of the polymeric hydrogel in the range of about 6:1 to about 100:1; alternatively, in the range of about 15:1 to about 99:1; alternatively, in the range of about 30:1 to about 95:1; alternatively, in the range of about 50:1 to about 90:1; alternatively in the range of 75:1 to 85:1. As the SS:HS ratio of the copolymer increases, more PEO is present in the structure of the resin. While not wishing to be bound by theory, it is believed that the higher the SS:HS ratio, the higher water uptake capacity is for the copolymer and faster the release kinetics associated therewith. A chemical description of formulas F-1A to F-1E is provided below.

based on their chemical structures, and it is common for polymers to include relatively harder segments and relatively softer segments bonded to each other in a single monomeric unit or in different monomeric units. When the polymer includes repeating segments, physical interactions or chemical bonds can be present within the segments or between the segments or both within and between the segments. Examples of segments often referred to as hard segments include segments including a urethane linkage, which can be formed from reacting an isocyanate with a polyol to form a polyurethane. Examples of segments often referred to as soft segments include segments including an alkoxy functional group, such as segments including ether or ester functional groups, and polyester segments. Segments can be referred to based on the name of the functional group present in the segment (e.g., a polyether segment, a polyester segment), as well as based on the name of the chemical structure which was reacted in order to form the segment (e.g., a polyol-derived segment, an isocyanate-derived segment). When referring to segments of a particular functional group or of a particular chemical structure from which the segment was derived, it is understood that the polymer can contain up to 10 mole percent of segments of other functional groups or derived from other chemical structures. For

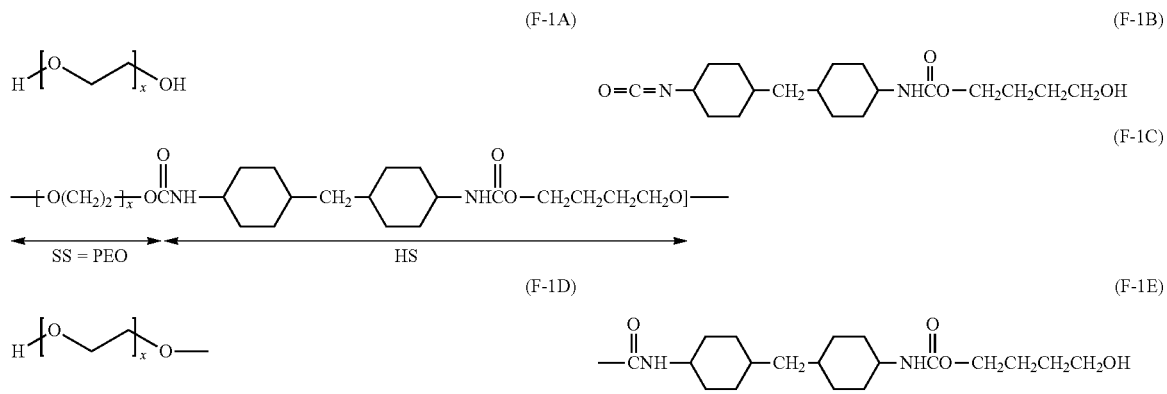

As used herein, the term "polymer" refers to a chemical compound formed of a plurality of repeating structural units referred to as monomers. Polymers often are formed by a polymerization reaction in which the plurality of structural units become covalently bonded together. When the monomer units forming the polymer all have the same chemical structure, the polymer is a homopolymer. When the polymer includes two or more monomer units having different chemical structures, the polymer is a copolymer. One example of a type of copolymer is a terpolymer, which includes three different types of monomer units. The co-polymer can include two or more different monomers randomly distributed in the polymer (e.g., a random co-polymer). Alternatively, one or more blocks containing a plurality of a first type of monomer can be bonded to one or more blocks containing a plurality of a second type of monomer, forming a block copolymer. A single monomer unit can include one or more different chemical functional groups.

Polymers having repeating units which include two or more types of chemical functional groups can be referred to as having two or more segments. For example, a polymer having repeating units of the same chemical structure can be referred to as having repeating segments. Segments are commonly described as being relatively harder or softer example, as used herein, a polyether segment is understood to include up to 10 mole percent of non-polyether segments.

The compositions of the present disclosure can be or can comprise a thermoplastic material. The article comprising the elastomeric material of the present disclosure can further comprise a thermoplastic material. The polymeric hydrogel of the composition and/or the elastomeric material can be a thermoplastic material. The composition can comprise at least one thermoplastic material in addition to the polymeric hydrogel. In general, a thermoplastic material softens or melts when heated and returns to a solid state when cooled. The thermoplastic material transitions from a solid state to a softened state when its temperature is increased to a temperature at or above its softening temperature, and a liquid state when its temperature is increased to a temperature at or above its melting temperature. When sufficiently cooled, the thermoplastic material transitions from the softened or liquid state to the solid state. As such, the thermoplastic material may be softened or melted, molded, cooled, re-softened or re-melted, re-molded, and cooled again through multiple cycles. For amorphous thermoplastic polymers, the solid state is understood to be the "rubbery" state above the glass transition temperature of the polymer. The thermoplastic material can have a melting temperature from about 90 degrees C. to about 190 degrees C. when determined in accordance with ASTM D3418-97 as described herein below, and includes all subranges therein in increments of 1 degree. The thermoplastic material can have a melting temperature from about 93 degrees C. to about 99 degrees C. when determined in accordance with ASTM D3418-97 as described herein below. The thermoplastic material can have a melting temperature from about 112 degrees C. to about 118 degrees C. when determined in accordance with ASTM D3418-97 as described herein below.

The glass transition temperature is the temperature at which an amorphous polymer transitions from a relatively brittle "glassy" state to a relatively more flexible "rubbery" state. The thermoplastic material can have a glass transition temperature from about −20 degrees C. to about 30 degrees C. when determined in accordance with ASTM D3418-97 as described herein below. The thermoplastic material can have a glass transition temperature (from about −13 degree C. to about −7 degrees C. when determined in accordance with ASTM D3418-97 as described herein below. The thermoplastic material can have a glass transition temperature from about 17 degrees C. to about 23 degrees C. when determined in accordance with ASTM D3418-97 as described herein below.

The thermoplastic material can have a melt flow index from about 10 to about 30 cubic centimeters per 10 minutes ($cm^3$/10 min) when tested in accordance with ASTM D1238-13 as described herein below at 160 degrees C. using a weight of 2.16 kilograms (kg). The thermoplastic material can have a melt flow index from about 22 $cm^3$/10 min to about 28 $cm^3$/10 min when tested in accordance with ASTM D1238-13 as described herein below at 160 degrees C. using a weight of 2.16 kg.

The elastomeric material can have a cold Ross flex test result of about 120,000 to about 180,000 cycles without cracking or whitening when tested on a plaque of the elastomeric material in accordance with the cold Ross flex test as described herein below. The elastomeric material can have a cold Ross flex test result of about 140,000 to about 160,000 cycles without cracking or whitening when tested on a plaque of the elastomeric material in accordance with the cold Ross flex test as described herein below.

The elastomeric material can have a modulus from about 5 megaPascals (MPa) to about 100 MPa when determined on a plaque in accordance with ASTM D412-98 Standard Test Methods for Vulcanized Rubber and Thermoplastic Rubbers and Thermoplastic Elastomers-Tension with modifications described herein below. The elastomeric material can have a modulus from about 20 MPa to about 80 MPa when determined on a plaque in accordance with ASTM D412-98 Standard Test Methods for Vulcanized Rubber and Thermoplastic Rubbers and Thermoplastic Elastomers-Tension with modifications described herein below.

The elastomeric material is a thermoset material. A "thermoset material" is understood to refer to a material which cannot be heated and melted, as its melting temperature is at or above its decomposition temperature. A "thermoset material" refers to a composition which comprises at least one thermoset polymer. The thermoset polymer and/or thermoset material can be prepared from a precursor (e.g., an uncured or partially cured polymer or material) using actinic radiation (e.g., thermal energy, ultraviolet radiation, visible radiation, high energy radiation, infrared radiation) to form a partially cured or fully cured polymer or material which no longer remains fully thermoplastic. In some cases, the cured or partially cured elastomeric material may retain some thermoplastic properties, in that it is possible to partially soften and mold the elastomeric material at elevated temperatures and/or pressures, but it is not possible to melt the elastomeric material. The curing can be promoted, for example, with the use of high pressure and/or a catalyst. The curing process is irreversible since it results in crosslinking and/or polymerization reactions of the precursors. The uncured compositions or partially cured elastomeric materials can be malleable or liquid prior to curing. In some cases, the uncured composition or partially cured elastomeric materials can be molded into their final shape, or used as adhesives. Once hardened, a thermoset material cannot be re-melted in order to be reshaped, but it may be possible to soften it. The textured surface can be formed by partially or fully curing the composition to lock in the textured surface into the elastomeric material.

The composition and/or the elastomeric material can comprise a polyurethane. The article comprising the elastomeric material can further include one or more components comprising a polyurethane. The polyurethane can be a thermoplastic polyurethane (also referred to as "TPU"). Alternatively, the polyurethane can be a thermoset polyurethane. Additionally, the polyurethane can be an elastomeric polyurethane, including an elastomeric TPU or an elastomeric thermoset polyurethane. The elastomeric polyurethane can include hard and soft segments. The hard segments can comprise or consist of urethane segments (e.g., isocyanate-derived segments). The soft segments can comprise or consist of alkoxy segments (e.g., polyol-derived segments including polyether segments, or polyester segments, or a combination of polyether segments and polyester segments). The polyurethane can comprise or consist essentially of an elastomeric polyurethane having repeating hard segments and repeating soft segments.

One or more of the polyurethanes can be produced by polymerizing one or more isocyanates with one or more polyols to produce polymer chains having carbamate linkages (—N(CO)O—) as illustrated below in Formula 1, where the isocyanate(s) each preferably include two or more isocyanate (—NCO) groups per molecule, such as 2, 3, or 4 isocyanate groups per molecule (although, mono-functional isocyanates can also be optionally included, e.g., as chain terminating units).

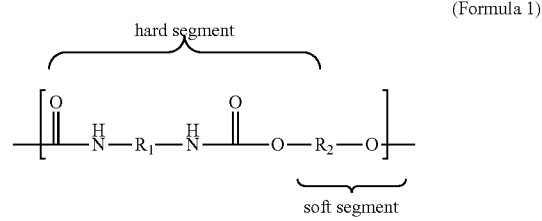

(Formula 1)

Each $R_1$ group and $R_2$ group independently is an aliphatic or aromatic group. Optionally, each $R_2$ can be a relatively hydrophilic group, including a group having one or more hydroxyl groups.

Additionally, the isocyanates can also be chain extended with one or more chain extenders to bridge two or more isocyanates, increasing the length of the hard segment. This can produce polyurethane polymer chains as illustrated below in Formula 2, where $R_3$ includes the chain extender. As with each $R_1$ and $R_2$, each $R_3$ independently is an aliphatic or aromatic functional group.

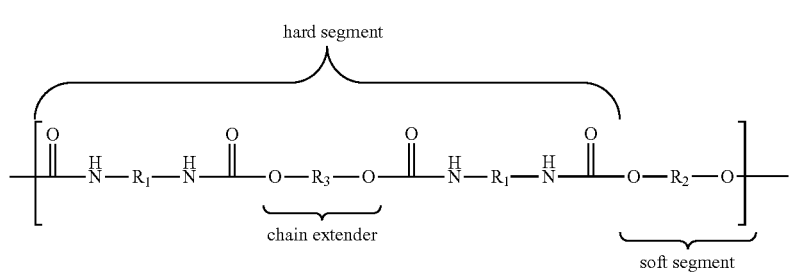

(Formula 2)

Each $R_1$ group in Formulas 1 and 2 can independently include a linear or branched group having from 3 to 30 carbon atoms, based on the particular isocyanate(s) used, and can be aliphatic, aromatic, or include a combination of aliphatic portions(s) and aromatic portion(s). The term "aliphatic" refers to a saturated or unsaturated organic molecule or portion of a molecule that does not include a cyclically conjugated ring system having delocalized pi electrons. In comparison, the term "aromatic" refers to an organic molecule or portion of a molecule having a cyclically conjugated ring system with delocalized pi electrons, which exhibits greater stability than a hypothetical ring system having localized pi electrons.

Each $R_1$ group can be present in an amount of about 5 percent to about 85 percent by weight, from about 5 percent to about 70 percent by weight, or from about 10 percent to about 50 percent by weight, based on the total weight of the reactant compounds or monomers which form the polymer.

In aliphatic embodiments (from aliphatic isocyanate(s)), each $R_1$ group can include a linear aliphatic group, a branched aliphatic group, a cycloaliphatic group, or combinations thereof. For instance, each $R_1$ group can include a linear or branched alkylene group having from 3 to 20 carbon atoms (e.g., an alkylene having from 4 to 15 carbon atoms, or an alkylene having from 6 to 10 carbon atoms), one or more cycloalkylene groups having from 3 to 8 carbon atoms (e.g., cyclopropyl, cyclobutyl, cyclopentyl, cyclohexyl, cycloheptyl, or cyclooctyl), and combinations thereof. The term "alkene" or "alkylene" as used herein refers to a bivalent hydrocarbon. When used in association with the term $C_n$ it means the alkene or alkylene group has "n" carbon atoms. For example, $C_{1-6}$ alkylene refers to an alkylene group having, e.g., 1, 2, 3, 4, 5, or 6 carbon atoms.

Examples of suitable aliphatic diisocyanates for producing the polyurethane polymer chains include hexamethylene diisocyanate (HDI), isophorone diisocyanate (IPDI), butylenediisocyanate (BDI), bisisocyanatocyclohexylmethane (HMDI), 2,2,4-trimethylhexamethylene diisocyanate (TMDI), bisisocyanatomethylcyclohexane, bisisocyanatomethyltricyclodecane, norbornane diisocyanate (NDI), cyclohexane diisocyanate (CHDI), 4,4'-dicyclohexylmethane diisocyanate (H12MDI), diisocyanatododecane, lysine diisocyanate, and combinations thereof.

The isocyanate-derived segments can include segments derived from aliphatic diisocyanate. A majority of the isocyanate-derived segments can comprise segments derived from aliphatic diisocyanates. At least 90 percent of the isocyanate-derived segments are derived from aliphatic diisocyanates. The isocyanate-derived segments can consist essentially of segments derived from aliphatic diisocyanates. The aliphatic diisocyanate-derived segments can be derived substantially (e.g., about 50 percent or more, about 60 percent or more, about 70 percent or more, about 80 percent or more, about 90 percent or more) from linear aliphatic diisocyanates. At least 80 percent of the aliphatic diisocyanate-derived segments can be derived from aliphatic diisocyanates that are free of side chains. The segments derived from aliphatic diisocyanates can include linear aliphatic diisocyanates having from 2 to 10 carbon atoms.

When the isocyanate-derived segments are derived from aromatic isocyanate(s)), each $R_1$ group can include one or more aromatic groups, such as phenyl, naphthyl, tetrahydronaphthyl, phenanthrenyl, biphenylenyl, indanyl, indenyl, anthracenyl, and fluorenyl. Unless otherwise indicated, an aromatic group can be an unsubstituted aromatic group or a substituted aromatic group, and can also include heteroaromatic groups. "Heteroaromatic" refers to monocyclic or polycyclic (e.g., fused bicyclic and fused tricyclic) aromatic ring systems, where one to four ring atoms are selected from oxygen, nitrogen, or sulfur, and the remaining ring atoms are carbon, and where the ring system is joined to the remainder of the molecule by any of the ring atoms. Examples of suitable heteroaryl groups include pyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl groups.

Examples of suitable aromatic diisocyanates for producing the polyurethane polymer chains include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4,4'-diisocyanate (DDDI), 4,4'-dibenzyl diisocyanate (DBDI), 4-chloro-1,3-phenylene diisocyanate, and combinations thereof. The polymer chains can be substantially free of aromatic groups.

The polyurethane polymer chains can be produced from diisocyanates including HMDI, TDI, MDI, $H_{12}$ aliphatics, and combinations thereof. For example, the polyurethane can comprise one or more polyurethane polymer chains produced from diisocyanates including HMDI, TDI, MDI, $H_{12}$ aliphatics, and combinations thereof.

Polyurethane chains which are at least partially crosslinked or which can be crosslinked, can be used in accordance with the present disclosure. It is possible to produce crosslinked or crosslinkable polyurethane chains by reacting multi-functional isocyanates to form the polyurethane. Examples of suitable triisocyanates for producing the polyurethane chains include TDI, HDI, and IPDI adducts with trimethyloylpropane (TMP), uretdiones (i.e., dimerized isocyanates), polymeric MDI, and combinations thereof.

The $R_3$ group in Formula 2 can include a linear or branched group having from 2 to 10 carbon atoms, based on the particular chain extender polyol used, and can be, for example, aliphatic, aromatic, or an ether or polyether. Examples of suitable chain extender polyols for producing the polyurethane include ethylene glycol, lower oligomers of ethylene glycol (e.g., diethylene glycol, triethylene glycol, and tetraethylene glycol), 1,2-propylene glycol, 1,3- propylene glycol, lower oligomers of propylene glycol (e.g., dipropylene glycol, tripropylene glycol, and tetrapropylene glycol), 1,4-butylene glycol, 2,3-butylene glycol, 1,6-hexanediol, 1,8-octanediol, neopentyl glycol, 1,4-cyclohexanedimethanol, 2-ethyl-1,6-hexanediol, 1-methyl-1,3-propanediol, 2-methyl-1,3-propanediol, dihydroxyalkylated aromatic compounds (e.g., bis(2-hydroxyethyl) ethers of hydroquinone and resorcinol, xylene-a,a-diols, bis(2-hydroxyethyl) ethers of xylene-a,a-diols, and combinations thereof.

The $R_2$ group in Formula 1 and 2 can include a polyether group, a polyester group, a polycarbonate group, an aliphatic group, or an aromatic group. Each $R_2$ group can be present in an amount of about 5 percent to about 85 percent by weight, from about 5 percent to about 70 percent by weight, or from about 10 percent to about 50 percent by weight, based on the total weight of the reactant monomers.

At least one $R_2$ group of the polyurethane includes a polyether segment (i.e., a segment having one or more ether groups). Suitable polyether groups include, but are not limited to, polyethylene oxide (PEO), polypropylene oxide (PPO), polytetrahydrofuran (PTHF), polytetramethylene oxide (PTMO), and combinations thereof. The term "alkyl" as used herein refers to straight chained and branched saturated hydrocarbon groups containing one to thirty carbon atoms, for example, one to twenty carbon atoms, or one to ten carbon atoms. When used in association with the term $C_n$ it means the alkyl group has "n" carbon atoms. For example, $C_4$ alkyl refers to an alkyl group that has 4 carbon atoms. $C_{1-7}$ alkyl refers to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Non-limiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group.

In some examples of the polyurethane, the at least one $R_2$ group includes a polyester group. The polyester group can be derived from the polyesterification of one or more dihydric alcohols (e.g., ethylene glycol, 1,3-propylene glycol, 1,2-propylene glycol, 1,4-butanediol, 1,3-butanediol, 2-methylpentanediol, 1,5,diethylene glycol, 1,5-pentanediol, 1,5-hexanediol, 1,2-dodecanediol, cyclohexanedimethanol, and combinations thereof) with one or more dicarboxylic acids (e.g., adipic acid, succinic acid, sebacic acid, suberic acid, methyladipic acid, glutaric acid, pimelic acid, azelaic acid, thiodipropionic acid and citraconic acid and combinations thereof). The polyester group also can be derived from polycarbonate prepolymers, such as poly(hexamethylene carbonate) glycol, poly(propylene carbonate) glycol, poly(tetramethylene carbonate)glycol, and poly (nonanemethylene carbonate) glycol. Suitable polyesters can include, for example, polyethylene adipate (PEA), poly (1,4-butylene adipate), poly(tetramethylene adipate), poly (hexamethylene adipate), polycaprolactone, polyhexamethylene carbonate, poly(propylene carbonate), poly (tetramethylene carbonate), poly(nonanemethylene carbonate), and combinations thereof.

At least one $R_2$ group can include a polycarbonate group. The polycarbonate group can be derived from the reaction of one or more dihydric alcohols (e.g., ethylene glycol, 1,3-propylene glycol, 1,2-propylene glycol, 1,4-butanediol, 1,3-butanediol, 2-methylpentanediol, 1,5, diethylene glycol, 1,5-pentanediol, 1,5-hexanediol, 1,2-dodecanediol, cyclohexanedimethanol, and combinations thereof) with ethylene carbonate.

The aliphatic group can be linear and can include, for example, an alkylene chain having from 1 to 20 carbon atoms or an alkenylene chain having from 1 to 20 carbon atoms (e.g., methylene, ethylene, propylene, butylene, pentylene, hexylene, heptylene, octylene, nonylene, decylene, undecylene, dodecylene, tridecylene, ethenylene, propenylene, butenylene, pentenylene, hexenylene, heptenylene, octenylene, nonenylene, decenylene, undecenylene, dodecenylene, tridecenylene). The term "alkene" or "alkylene" refers to a bivalent hydrocarbon. The term "alkenylene" refers to a bivalent hydrocarbon molecule or portion of a molecule having at least one double bond.

The aliphatic and aromatic groups can be substituted with one or more pendant relatively hydrophilic and/or charged groups. The pendant hydrophilic group can include one or more (e.g., 2, 3, 4, 5, 6, 7, 8, 9, 10 or more) hydroxyl groups. The pendant hydrophilic group includes one or more (e.g., 2, 3, 4, 5, 6, 7, 8, 9, 10 or more) amino groups. In some cases, the pendant hydrophilic group includes one or more (e.g., 2, 3, 4, 5, 6, 7, 8, 9, 10 or more) carboxylate groups. For example, the aliphatic group can include one or more polyacrylic acid group. In some cases, the pendant hydrophilic group includes one or more (e.g., 2, 3, 4, 5, 6, 7, 8, 9, 10 or more) sulfonate groups. In some cases, the pendant hydrophilic group includes one or more (e.g., 2, 3, 4, 5, 6, 7, 8, 9, 10 or more) phosphate groups. In some examples, the pendant hydrophilic group includes one or more ammonium groups (e.g., tertiary and/or quaternary ammonium). In other examples, the pendant hydrophilic group includes one or more zwitterionic groups (e.g., a betaine, such as poly (carboxybetaine (pCB) and ammonium phosphonate groups such as a phosphatidylcholine group).

The $R_2$ group can include charged groups that are capable of binding to a counterion to ionically crosslink the polymer and form ionomers. For example, $R_2$ is an aliphatic or aromatic group having pendant amino, carboxylate, sulfonate, phosphate, ammonium, or zwitterionic groups, or combinations thereof.

When a pendant hydrophilic group is present, the pendant hydrophilic group can be at least one polyether group, such as two polyether groups. In other cases, the pendant hydrophilic group is at least one polyester. The pendant hydrophilic group can be a polylactone group (e.g., polyvinylpyrrolidone). Each carbon atom of the pendant hydrophilic group can optionally be substituted with, e.g., an alkyl group having from 1 to 6 carbon atoms. The aliphatic and aromatic groups can be graft polymeric groups, wherein the pendant groups are homopolymeric groups (e.g., polyether groups, polyester groups, polyvinylpyrrolidone groups).

The pendant hydrophilic group can be a polyether group (e.g., a polyethylene oxide (PEO) group, a polyethylene glycol (PEG) group), a polyvinylpyrrolidone group, a polyacrylic acid group, or combinations thereof.

The pendant hydrophilic group can be bonded to the aliphatic group or aromatic group through a linker. The linker can be any bifunctional small molecule (e.g., one having from 1 to 20 carbon atoms) capable of linking the pendant hydrophilic group to the aliphatic or aromatic group. For example, the linker can include a diisocyanate group, as previously described herein, which when linked to the pendant hydrophilic group and to the aliphatic or aromatic group forms a carbamate bond. The linker can be 4,4'-diphenylmethane diisocyanate (MDI), as shown below.

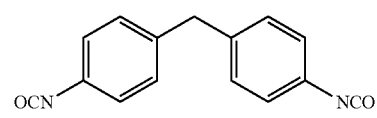

(Formula 3)

The pendant hydrophilic group can be a polyethylene oxide group and the linking group can be MDI, as shown below.

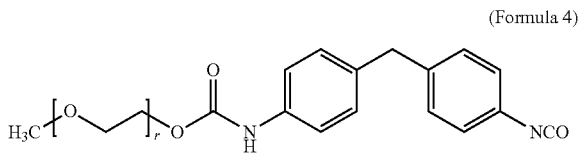

(Formula 4)

The pendant hydrophilic group can be functionalized to enable it to bond to the aliphatic or aromatic group, optionally through the linker. For example, when the pendant hydrophilic group includes an alkene group, which can undergo a Michael addition with a sulfhydryl-containing bifunctional molecule (i.e., a molecule having a second reactive group, such as a hydroxyl group or amino group), resulting in a hydrophilic group that can react with the polymer backbone, optionally through the linker, using the second reactive group. For example, when the pendant hydrophilic group is a polyvinylpyrrolidone group, it can react with the sulfhydryl group on mercaptoethanol to result in hydroxyl-functionalized polyvinylpyrrolidone, as shown below.

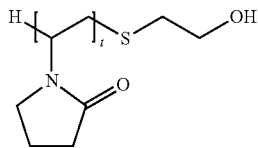

(Formula 5)

At least one $R_2$ group in the polyurethane can include a polytetramethylene oxide group. At least one $R_2$ group of the polyurethane can include an aliphatic polyol group functionalized with a polyethylene oxide group or polyvinylpyrrolidone group, such as the polyols described in E.P. Patent No. 2 462 908, which is hereby incorporated by reference. For example, the $R_2$ group can be derived from the reaction product of a polyol (e.g., pentaerythritol or 2,2,3-trihydroxypropanol) and either MDI-derivatized methoxypolyethylene glycol (to obtain compounds as shown in Formulas 6 or 7) or with MDI-derivatized polyvinylpyrrolidone (to obtain compounds as shown in Formulas 8 or 9) that had been previously been reacted with mercaptoethanol, as shown below.

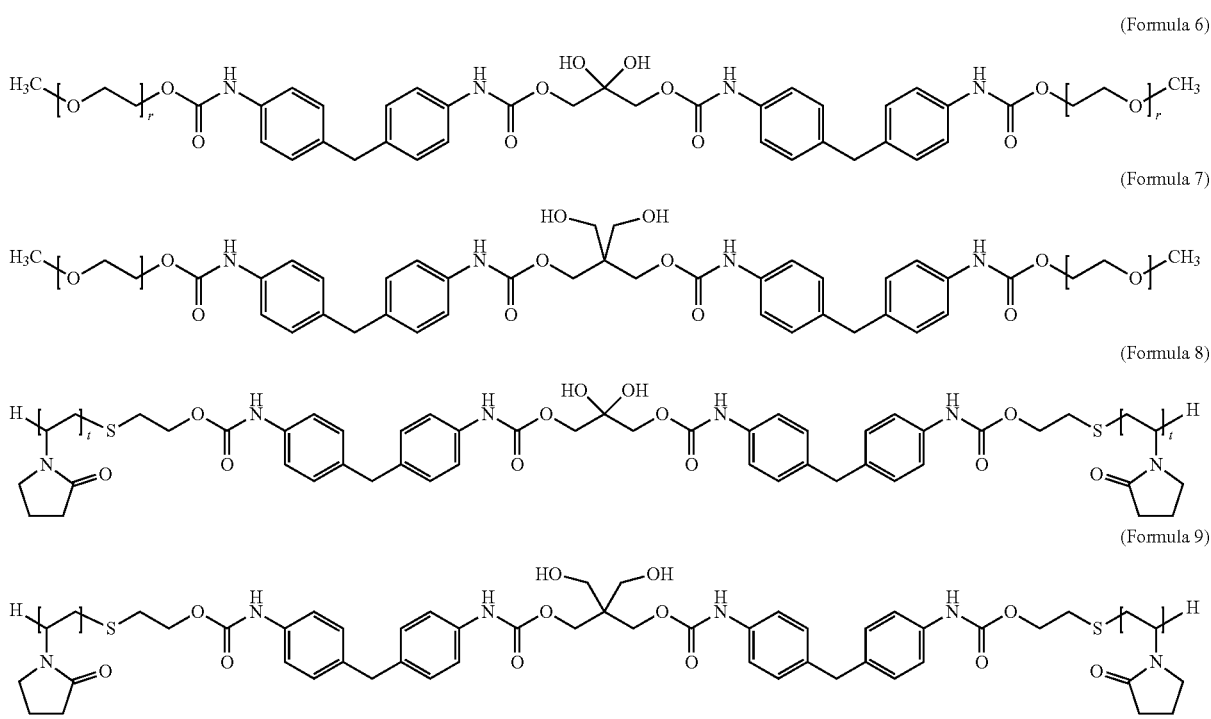

(Formula 6)

(Formula 7)

(Formula 8)

(Formula 9)

At least one $R_2$ of the polyurethane can be a polysiloxane, In these cases, the $R_2$ group can be derived from a silicone monomer of Formula 10, such as a silicone monomer disclosed in U.S. Pat. No. 5,969,076, which is hereby incorporated by reference:

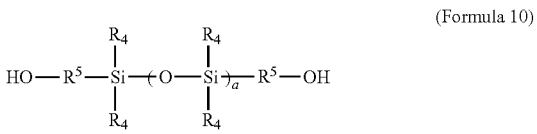

(Formula 10)

wherein: a is 1 to 10 or larger (e.g., 1, 2, 3, 4, 5, 6, 7, 8, 9, or 10); each $R_4$ independently is hydrogen, an alkyl group having from 1 to 18 carbon atoms, an alkenyl group having from 2 to 18 carbon atoms, aryl, or polyether; and each $R_5$ independently is an alkylene group having from 1 to 10 carbon atoms, polyether, or polyurethane.

Each $R_4$ group can independently be a H, an alkyl group having from 1 to 10 carbon atoms, an alkenyl group having from 2 to 10 carbon atoms, an aryl group having from 1 to 6 carbon atoms, polyethylene, polypropylene, or polybutylene group. Each $R_4$ group can independently be selected from the group consisting of methyl, ethyl, n-propyl, isopropyl, n-butyl, isobutyl, s-butyl, t-butyl, ethenyl, propenyl, phenyl, and polyethylene groups.

Each $R_5$ group can independently include an alkylene group having from 1 to 10 carbon atoms (e.g., a methylene, ethylene, propylene, butylene, pentylene, hexylene, heptylene, octylene, nonylene, or decylene group). Each $R_5$ group can be a polyether group (e.g., a polyethylene, polypropylene, or polybutylene group). Each $R_5$ group can be a polyurethane group.

Optionally, the polyurethane can include an at least partially crosslinked polymeric network that includes polymer chains that are derivatives of polyurethane. The level of crosslinking can be such that the polyurethane retains thermoplastic properties (i.e., the crosslinked thermoplastic polyurethane can be melted and re-solidified under the processing conditions described herein). The crosslinked polyurethane can be a thermoset polymer. This crosslinked polymeric network can be produced by polymerizing one or more isocyanates with one or more polyamino compounds, polysulfhydryl compounds, or combinations thereof, as shown in Formulas 11 and 12, below:

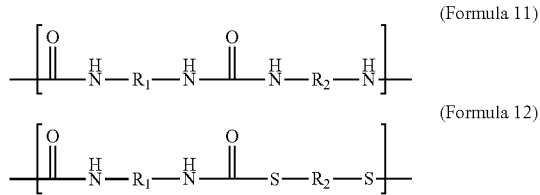

(Formula 11)

(Formula 12)

where the variables are as described above. Additionally, the isocyanates can also be chain extended with one or more polyamino or polythiol chain extenders to bridge two or more isocyanates, such as previously described for the polyurethanes of Formula 2.

The polyurethane chain can be physically crosslinked to another polyurethane chain through e.g., nonpolar or polar interactions between the urethane or carbamate groups of the polymers (the hard segments). The $R_1$ group in Formula 1, and the $R_1$ and $R_3$ groups in Formula 2, form the portion of the polymer often referred to as the "hard segment", and the $R_2$ group forms the portion of the polymer often referred to as the "soft segment". The soft segment is covalently bonded to the hard segment. The polyurethane having physically crosslinked hard and soft segments can be a hydrophilic polyurethane (i.e., a polyurethane, including a thermoplastic polyurethane, including hydrophilic groups as disclosed herein).

One or more of the polyurethanes can be produced by polymerizing one or more isocyanates with one or more polyols to produce copolymer chains having carbamate linkages (—N(C=O)O—) and one or more water-uptake enhancing moieties, where the polymer chain includes one or more water-uptake enhancing moieties (e.g., a monomer in polymer chain). The water-uptake enhancing moiety can be added to the chain of Formula 1 or 2 (e.g., within the chain and/or onto the chain as a side chain). Inclusion of the water-uptake enhancing moiety can enable the formation of a polyurethane hydrogel.

The polyurethane can include one or more water-uptake enhancing moieties. The water-uptake enhancing moiety can have at least one hydrophilic (e.g., poly(ethylene oxide)), ionic or potentially ionic group. A polyurethane can be formed by incorporating a moiety bearing at least one hydrophilic group or a group that can be made hydrophilic (e.g., by chemical modifications such as neutralization) into the polymer chain. For example, these compounds can be nonionic, anionic, cationic or zwitterionic or the combination thereof. In one example, anionic groups such as carboxylic acid groups can be incorporated into the chain in an inactive form and subsequently activated by a salt-forming compound, such as a tertiary amine. Other water-uptake enhancing moieties can also be reacted into the backbone through urethane linkages or urea linkages, including lateral or terminal hydrophilic ethylene oxide or ureido units.

The water-uptake enhancing moiety can be a one that includes carboxyl groups. Water-uptake enhancing moiety that include a carboxyl group can be formed from hydroxycarboxylic acids having the general formula $(HO)_xQ(COOH)_y$, where Q can be a straight or branched bivalent hydrocarbon radical containing 1 to 12 carbon atoms, and x and y can each independently be 1 to 3. Illustrative examples include dimethylolpropanoic acid (DMPA), dimethylol butanoic acid (DMBA), citric acid, tartaric acid, glycolic acid, lactic acid, malic acid, dihydroxymalic acid, dihydroxytartaric acid, and the like, and mixtures thereof.

The water-uptake enhancing moiety can include reactive polymeric polyol components that contain pendant anionic groups that can be polymerized into the backbone to impart water dispersible characteristics to the polyurethane. Anionic functional polymeric polyols can include anionic polyester polyols, anionic polyether polyols, and anionic polycarbonate polyols, where additional detail is provided in U.S. Pat. No. 5,334,690.

The water-uptake enhancing moiety can include a side chain hydrophilic monomer. For example, the water-uptake enhancing moiety including the side chain hydrophilic monomer can include alkylene oxide polymers and copolymers in which the alkylene oxide groups have from 2-10 carbon atoms as shown in U.S. Pat. No. 6,897,281. Additional types of water-uptake enhancing moieties can include thioglycolic acid, 2,6-dihydroxybenzoic acid, sulfoisophthalic acid, polyethylene glycol, and the like, and mixtures thereof. Additional details regarding water-dispersible enhancing moieties can be found in U.S. Pat. No. 7,476,705.

Polyamides

The composition and/or the elastomeric material can comprise a polyamide. The article comprising the elastomeric material can further one or more components comprising a polyamide. The polyamide can be a thermoplastic polyamide, or a thermoset polyamide. The polyamide can be an elastomeric polyamide, including an elastomeric thermoplastic polyamide or an elastomeric thermoset polyamide. The polyamide can be a polyamide homopolymer having repeating polyamide segments of the same chemical structure. Alternatively, the polyamide can comprise a number of polyamide segments having different polyamide chemical structures (e.g., polyamide 6 segments, polyamide 11 segments, polyamide 12 segments, polyamide 66 segments, etc.). The polyamide segments having different chemical structure can be arranged randomly, or can be arranged as repeating blocks.

The polyamide can be a co-polyamide (i.e., a co-polymer including polyamide segments and non-polyamide segments). The polyamide segments of the co-polyamide can comprise or consist of polyamide 6 segments, polyamide 11 segments, polyamide 12 segments, polyamide 66 segments, or any combination thereof. The polyamide segments of the co-polyamide can be arranged randomly, or can be arranged as repeating segments. The polyamide segments can comprise or consist of polyamide 6 segments, or polyamide 12 segments, or both polyamide 6 segment and polyamide 12 segments. In the example where the polyamide segments of the co-polyamide include of polyamide 6 segments and polyamide 12 segments, the segments can be arranged randomly. The non-polyamide segments of the co-polyamide can comprise or consist of polyether segments, polyester segments, or both polyether segments and polyester segments. The co-polyamide can be a block co-polyamide, or can be a random co-polyamide. The copolyamide can be formed from the polycondensation of a polyamide oligomer or prepolymer with a second oligomer prepolymer to form a copolyamide (i.e., a co-polymer including polyamide segments. Optionally, the second prepolymer can be a hydrophilic prepolymer.

The polyamide can be a polyamide-containing block co-polymer. For example, the block co-polymer can have repeating hard segments, and repeating soft segments. The hard segments can comprise polyamide segments, and the soft segments can comprise non-polyamide segments. The polyamide-containing block co-polymer can be an elastomeric co-polyamide comprising or consisting of polyamide-containing block co-polymers having repeating hard segments and repeating soft segments. In block co-polymers, including block co-polymers having repeating hard segments and soft segments, physical crosslinks can be present within the segments or between the segments or both within and between the segments.

The polyamide itself, or the polyamide segment of the polyamide-containing block co-polymer can be derived from the condensation of polyamide prepolymers, such as lactams, amino acids, and/or diamino compounds with dicarboxylic acids, or activated forms thereof. The resulting polyamide segments include amide linkages (—(CO)NH—). The term "amino acid" refers to a molecule having at least one amino group and at least one carboxyl group. Each polyamide segment of the polyamide can be the same or different.

The polyamide or the polyamide segment of the polyamide-containing block co-polymer can be derived from the polycondensation of lactams and/or amino acids, and can include an amide segment having a structure shown in Formula 13, below, wherein $R_6$ group represents the portion of the polyamide derived from the lactam or amino acid.

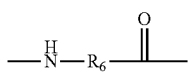

(Formula 13)

The $R_6$ group can be derived from a lactam. The $R_6$ group can be derived from a lactam group having from 3 to 20 carbon atoms, or a lactam group having from 4 to 15 carbon atoms, or a lactam group having from 6 to 12 carbon atoms. The $R_6$ group can be derived from caprolactam or laurolactam. The $R_6$ group can be derived from one or more amino acids. The $R_6$ group can be derived from an amino acid group having from 4 to 25 carbon atoms, or an amino acid group having from 5 to 20 carbon atoms, or an amino acid group having from 8 to 15 carbon atoms. The $R_6$ group can be derived from 12-aminolauric acid or 11-aminoundecanoic acid.

Optionally, in order to increase the relative degree of hydrophilicity of the polyamide-containing block co-polymer, Formula 13 can include a polyamide-polyether block copolymer segment, as shown below:

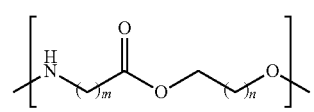

(Formula 14)

wherein m is 3-20, and n is 1-8. Optionally, m is 4-15, or 6-12 (e.g., 6, 7, 8, 9, 10, 11, or 12), and n is 1, 2, or 3. For example, m can be 11 or 12, and n can be 1 or 3. The polyamide or the polyamide segment of the polyamide-containing block co-polymer can be derived from the condensation of diamino compounds with dicarboxylic acids, or activated forms thereof, and can include an amide segment having a structure shown in Formula 15, below, wherein the $R_7$ group represents the portion of the polyamide derived from the diamino compound, and the $R_8$ group represents the portion derived from the dicarboxylic acid compound:

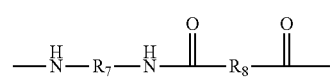

(Formula 15)

The $R_7$ group can be derived from a diamino compound that includes an aliphatic group having from 4 to 15 carbon atoms, or from 5 to 10 carbon atoms, or from 6 to 9 carbon atoms. The diamino compound can include an aromatic group, such as phenyl, naphthyl, xylyl, and tolyl. Suitable diamino compounds from which the $R_7$ group can be derived include, but are not limited to, hexamethylene diamine (HMD), tetramethylene diamine, trimethyl hexamethylene diamine (TMD), m-xylylene diamine (MXD), and 1,5-pentamine diamine. The $R_8$ group can be derived from a dicarboxylic acid or activated form thereof, including an aliphatic group having from 4 to 15 carbon atoms, or from 5 to 12 carbon atoms, or from 6 to 10 carbon atoms. The dicarboxylic acid or activated form thereof from which $R_8$ can be derived includes an aromatic group, such as phenyl, naphthyl, xylyl, and tolyl groups. Suitable carboxylic acids or activated forms thereof from which $R_8$ can be derived include adipic acid, sebacic acid, terephthalic acid, and isophthalic acid. The polyamide chain can be substantially free of aromatic groups.

Each polyamide segment of the polyamide (including the polyamide-containing block co-polymer) can be independently derived from a polyamide prepolymer selected from the group consisting of 12-aminolauric acid, caprolactam, hexamethylene diamine and adipic acid.

The polyamide can comprise or consist essentially of a poly(ether-block-amide). The poly(ether-block-amide) can be formed from the polycondensation of a carboxylic acid terminated polyamide prepolymer and a hydroxyl terminated polyether prepolymer to form a poly(ether-block-amide), as shown in Formula 16:

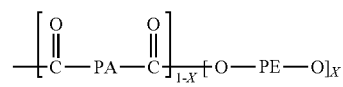

(Formula 16)

The poly(ether block amide) polymer can be prepared by polycondensation of polyamide blocks containing reactive ends with polyether blocks containing reactive ends. Examples include: 1) polyamide blocks containing diamine chain ends with polyoxyalkylene blocks containing carboxylic chain ends; 2) polyamide blocks containing dicarboxylic chain ends with polyoxyalkylene blocks containing diamine chain ends obtained by cyanoethylation and hydrogenation of aliphatic dihydroxylated alpha-omega polyoxyalkylenes known as polyether diols; 3) polyamide blocks containing dicarboxylic chain ends with polyether diols, the products obtained in this particular case being polyetheresteramides. The polyamide block of the poly(ether-block-amide) can be derived from lactams, amino acids, and/or diamino compounds with dicarboxylic acids as previously described. The polyether block can be derived from one or more polyethers selected from the group consisting of polyethylene oxide (PEO), polypropylene oxide (PPO), polytetrahydrofuran (PTHF), polytetramethylene oxide (PTMO), and combinations thereof.

The poly(ether block amide) polymers can include those comprising polyamide blocks comprising dicarboxylic chain ends derived from the condensation of α, ω-aminocarboxylic acids, of lactams or of dicarboxylic acids and diamines in the presence of a chain-limiting dicarboxylic acid. In poly(ether block amide) polymers of this type, a α, ω-aminocarboxylic acid such as aminoundecanoic acid can be used; a lactam such as caprolactam or lauryllactam can be used; a dicarboxylic acid such as adipic acid, decanedioic acid or dodecanedioic acid can be used; and a diamine such as hexamethylenediamine can be used; or various combinations of any of the foregoing. The copolymer can comprise polyamide blocks comprising polyamide 12 or of polyamide 6.

The poly(ether block amide) polymers can include those comprising polyamide blocks derived from the condensation of one or more a, w-aminocarboxylic acids and/or of one or more lactams containing from 6 to 12 carbon atoms in the presence of a dicarboxylic acid containing from 4 to 12 carbon atoms, and are of low mass, i.e., they have a number-average molecular weight of from 400 to 1000. In poly(ether block amide) polymers of this type, an α, w-aminocarboxylic acid such as aminoundecanoic acid or aminododecanoic acid can be used; a dicarboxylic acid such as adipic acid, sebacic acid, isophthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98 weight percent and are preferably hydrogenated) and dodecanedioic acid HOOC—$(CH_2)_{10}$—COOH can be used; and a lactam such as caprolactam and lauryllactam can be used; or various combinations of any of the foregoing. The copolymer can comprise polyamide blocks obtained by condensation of lauryllactam in the presence of adipic acid or dodecanedioic acid and with a number average molecular weight of at least 750 have a melting temperature of from about 127 to about 130 degrees C. The various constituents of the polyamide block and their proportion can be chosen in order to obtain a melting point of less than 150 degrees C., or from about 90 degrees C. to about 135 degrees C.

The poly(ether block amide) polymers can include those comprising polyamide blocks derived from the condensation of at least one a, w-aminocarboxylic acid (or a lactam), at least one diamine and at least one dicarboxylic acid. In copolymers of this type, a α,ω-aminocarboxylic acid, the lactam and the dicarboxylic acid can be chosen from those described herein above and the diamine that can be used can include an aliphatic diamine containing from 6 to 12 atoms and can be acyclic and/or saturated cyclic such as, but not limited to, hexamethylenediamine, piperazine, 1-aminoethylpiperazine, bisaminopropylpiperazine, tetramethylenediamine, octamethylene-diamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(aminocyclohexyl)methane (BACM) and bis(3-methyl-4-aminocyclohexyl)methane (BMACM).

The polyamide can be a thermoplastic polyamide and the constituents of the polyamide block and their proportion can be chosen in order to obtain a melting temperature of less than 150 degrees C., such as a melting point of from about 90 degrees C. to about 135 degrees C. The various constituents of the thermoplastic polyamide block and their proportion can be chosen in order to obtain a melting point of less than 150 degrees C., such as from about and 90 degrees C. to about 135 degrees C.

The number average molar mass of the polyamide blocks can be from about 300 grams per mole to about 15,000 grams per mole, from about 500 grams per mole to about 10,000 grams per mole, from about 500 grams per mole to about 6,000 grams per mole, from about 500 grams per mole to about 5,000 grams per mole, or from about 600 grams per mole to about 5,000 grams per mole. The number average molecular weight of the polyether block can range from about 100 to about 6,000, from about 400 to about 3000, or from about 200 to about 3,000. The polyether (PE) content (x) of the poly(ether block amide) polymer can be from about 0.05 to about 0.8 (i.e., from about 5 mole percent to about 80 mole percent). The polyether blocks can be present in the polyamide in an amount of from about 10 weight percent to about 50 weight percent, from about 20 weight percent to about 40 weight percent, or from about 30 weight percent to about 40 weight percent. The polyamide blocks can be present in the polyamide in an amount of from about 50 weight percent to about 90 weight percent, from about 60 weight percent to about 80 weight percent, or from about 70 weight percent to about 90 weight percent.

The polyether blocks can contain units other than ethylene oxide units, such as, for example, propylene oxide or polytetrahydrofuran (which leads to polytetramethylene glycol sequences). It is also possible to use simultaneously PEG blocks, i.e., those consisting of ethylene oxide units, polypropylene glycol (PPG) blocks, i.e. those consisting of propylene oxide units, and poly(tetramethylene ether)glycol (PTMG) blocks, i.e. those consisting of tetramethylene glycol units, also known as polytetrahydrofuran. PPG or PTMG blocks are advantageously used. The amount of polyether blocks in these copolymers containing polyamide and polyether blocks can be from about 10 weight percent to about 50 weight percent of the copolymer, or from about 35 weight percent to about 50 weight percent.

The copolymers containing polyamide blocks and polyether blocks can be prepared by any means for attaching the polyamide blocks and the polyether blocks. In practice, two processes are essentially used, one being a 2-step process and the other a one-step process.

In the two-step process, the polyamide blocks having dicarboxylic chain ends are prepared first, and then, in a second step, these polyamide blocks are linked to the polyether blocks. The polyamide blocks having dicarboxylic chain ends are derived from the condensation of polyamide precursors in the presence of a chain-stopper dicarboxylic acid. If the polyamide precursors are only lactams or α,ω- aminocarboxylic acids, a dicarboxylic acid is added. If the precursors already comprise a dicarboxylic acid, this is used in excess with respect to the stoichiometry of the diamines. The reaction usually takes place from about 180 to about 300 degrees C., such as from about 200 degrees to about 290 degrees C., and the pressure in the reactor can be set from about 5 to about 30 bar and maintained for approximately 2 to 3 hours. The pressure in the reactor is slowly reduced to atmospheric pressure and then the excess water is distilled off, for example for one or two hours.

Once the polyamide having carboxylic acid end groups has been prepared, the polyether, the polyol and a catalyst are then added. The total amount of polyether can be divided and added in one or more portions, as can the catalyst. The polyether is added first and the reaction of the OH end groups of the polyether and of the polyol with the COOH end groups of the polyamide starts, with the formation of ester linkages and the elimination of water. Water is removed as much as possible from the reaction mixture by distillation and then the catalyst is introduced in order to complete the linking of the polyamide blocks to the polyether blocks. This second step takes place with stirring, preferably under a vacuum of at least 50 millibar (5000 Pascals) at a temperature such that the reactants and the copolymers obtained are in the molten state. By way of example, this temperature can be from about 100 to about 400 degrees C., such as from about 200 to about 250 degrees C. The reaction is monitored by measuring the torque exerted by the polymer melt on the stirrer or by measuring the electric power consumed by the stirrer. The end of the reaction is determined by the value of the torque or of the target power. The catalyst is defined as being any product which promotes the linking of the polyamide blocks to the polyether blocks by esterification. The catalyst can be a derivative of a metal (M) chosen from the group formed by titanium, zirconium and hafnium. The derivative can be prepared from a tetraalkoxides consistent with the general formula $M(OR)_4$, in which M represents titanium, zirconium or hafnium and R, which can be identical or different, represents linear or branched alkyl radicals having from 1 to 24 carbon atoms.

The catalyst can comprise a salt of the metal (M), particularly the salt of (M) and of an organic acid and the complex salts of the oxide of (M) and/or the hydroxide of (M) and an organic acid. The organic acid can be formic acid, acetic acid, propionic acid, butyric acid, valeric acid, caproic acid, caprylic acid, lauric acid, myristic acid, palmitic acid, stearic acid, oleic acid, linoleic acid, linolenic acid, cyclohexanecarboxylic acid, phenylacetic acid, benzoic acid, salicylic acid, oxalic acid, malonic acid, succinic acid, glutaric acid, adipic acid, maleic acid, fumaric acid, phthalic acid or crotonic acid. The organic acid can be an acetic acid or a propionic acid. M can be zirconium and such salts are called zirconyl salts, e.g., the commercially available product sold under the name zirconyl acetate.

The weight proportion of catalyst can vary from about 0.01 to about 5 percent of the weight of the mixture of the dicarboxylic polyamide with the polyetherdiol and the polyol. The weight proportion of catalyst can vary from about 0.05 to about 2 percent of the weight of the mixture of the dicarboxylic polyamide with the polyetherdiol and the polyol.

In the one-step process, the polyamide precursors, the chain stopper and the polyether are blended together; what is then obtained is a polymer having essentially polyether blocks and polyamide blocks of highly variable length, but also the various reactants that have reacted randomly, which are distributed randomly along the polymer chain. They are the same reactants and the same catalyst as in the two-step process described above. If the polyamide precursors are only lactams, it is advantageous to add a little water. The copolymer has essentially the same polyether blocks and the same polyamide blocks, but also a small portion of the various reactants that have reacted randomly, which are distributed randomly along the polymer chain. As in the first step of the two-step process described above, the reactor is closed and heated, with stirring. The pressure established is from about 5 to about 30 bar. When the pressure no longer changes, the reactor is put under reduced pressure while still maintaining vigorous stirring of the molten reactants. The reaction is monitored as previously in the case of the two-step process.

The proper ratio of polyamide to polyether blocks can be found in a single poly(ether block amide), or a blend of two or more different composition poly(ether block amide)s can be used with the proper average composition. It can be useful to blend a block copolymer having a high level of polyamide groups with a block copolymer having a higher level of polyether blocks, to produce a blend having an average level of polyether blocks of about 20 to about 40 weight percent of the total blend of poly(amid-block-ether) copolymers, or about 30 to about 35 weight percent. The copolymer can comprise a blend of two different poly(ether-block-amide)s comprising at least one block copolymer having a level of polyether blocks below 35 weight percent, and a second poly(ether-block-amide) having at least 45 weight percent of polyether blocks.

Exemplary commercially available copolymers include, but are not limited to, those available under the tradenames of "VESTAMID" (Evonik Industries, Essen, Germany); "PLATAMID" (Arkema, Colombes, France), e.g., product code H2694; "PEBAX" (Arkema), e.g., product code "PEBAX MH1657" and "PEBAX MV1074"; "PEBAX RNEW" (Arkema); "GRILAMID" (EMS-Chemie AG, Domat-Ems, Switzerland), or also to other similar materials produced by various other suppliers.

The polyamide can be physically crosslinked through, e.g., nonpolar or polar interactions between the polyamide groups of the polymers. In examples where the polyamide is a copolyamide, the copolyamide can be physically crosslinked through interactions between the polyamide groups, and optionally by interactions between the copolymer groups. When the co-polyamide is physically crosslinked through interactions between the polyamide groups, the polyamide segments can form the portion of the polymer referred to as the hard segment, and copolymer segments can form the portion of the polymer referred to as the soft segment. For example, when the copolyamide is a poly(ether-block-amide), the polyamide segments form the hard segments of the polymer, and polyether segments form the soft segments of the polymer. Therefore, in some examples, the polymer can include a physically crosslinked polymeric network having one or more polymer chains with amide linkages.

The polyamide segment of the co-polyamide can include polyamide-11 or polyamide-12 and the polyether segment can be a segment selected from the group consisting of polyethylene oxide, polypropylene oxide, and polytetramethylene oxide segments, and combinations thereof.

The polyamide can be partially or fully covalently crosslinked, as previously described herein. In some cases, the degree of crosslinking present in the polyamide is such that, when it is thermally processed, e.g., in the form of a yarn or fiber to form the articles of the present disclosure, the partially covalently crosslinked thermoplastic polyamide retains sufficient thermoplastic character that the partially covalently crosslinked thermoplastic polyamide is melted during the processing and re-solidifies. In other cases, the crosslinked polyamide is a thermoset polymer.

Polyesters

The composition and/or the elastomeric material can comprise a polyester. The article comprising the elastomeric material can further one or more components comprising a polyester. The polyester can comprise a thermoplastic polyester, or a thermoset polyester. Additionally, the polyester can be an elastomeric polyester, including a thermoplastic polyester or a thermoset elastomeric polyester. The polyester can be formed by reaction of one or more carboxylic acids, or its ester-forming derivatives, with one or more bivalent or multivalent aliphatic, alicyclic, aromatic or araliphatic alcohols or a bisphenol. The polyester can be a polyester homopolymer having repeating polyester segments of the same chemical structure. Alternatively, the polyester can comprise a number of polyester segments having different polyester chemical structures (e.g., polyglycolic acid segments, polylactic acid segments, polycaprolactone segments, polyhydroxyalkanoate segments, polyhydroxybutyrate segments, etc.). The polyester segments having different chemical structure can be arranged randomly, or can be arranged as repeating blocks.

Exemplary carboxylic acids that can be used to prepare a polyester include, but are not limited to, adipic acid, pimelic acid, suberic acid, azelaic acid, sebacic acid, nonane dicarboxylic acid, decane dicarboxylic acid, undecane dicarboxylic acid, terephthalic acid, isophthalic acid, alkyl-substituted or halogenated terephthalic acid, alkyl-substituted or halogenated isophthalic acid, nitro-terephthalic acid, 4,4'-diphenyl ether dicarboxylic acid, 4,4'-diphenyl thioether dicarboxylic acid, 4,4'-diphenyl sulfone-dicarboxylic acid, 4,4'-diphenyl alkylenedicarboxylic acid, naphthalene-2,6-dicarboxylic acid, cyclohexane-1,4-dicarboxylic acid and cyclohexane-1,3-dicarboxylic acid. Exemplary diols or phenols suitable for the preparation of the polyester include, but are not limited to, ethylene glycol, diethylene glycol, 1,3-propanediol, 1,4-butanediol, 1,6-hexanediol, 1,8-octanediol, 1,10-decanediol, 1,2-propanediol, 2,2-dimethyl-1,3-propanediol, 2,2,4-trimethylhexanediol, p-xylenediol, 1,4-cyclohexanediol, 1,4-cyclohexane dimethanol, and bis-phenol A.

The polyester can be a polybutylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), a liquid crystal polyester, or a blend or mixture of two or more of the foregoing.

The polyester can be a co-polyester (i.e., a co-polymer including polyester segments and non-polyester segments). The co-polyester can be an aliphatic co-polyester (i.e., a co-polyester in which both the polyester segments and the non-polyester segments are aliphatic). Alternatively, the co-polyester can include aromatic segments. The polyester segments of the co-polyester can comprise or consist essentially of polyglycolic acid segments, polylactic acid segments, polycaprolactone segments, polyhydroxyalkanoate segments, polyhydroxybutyrate segments, or any combination thereof. The polyester segments of the co-polyester can be arranged randomly, or can be arranged as repeating blocks.

For example, the polyester can be a block co-polyester having repeating blocks of polymeric units of the same chemical structure which are relatively harder (hard segments), and repeating blocks of the same chemical structure which are relatively softer (soft segments). In block co-polyesters, including block co-polyesters having repeating hard segments and soft segments, physical crosslinks can be present within the blocks or between the blocks or both within and between the blocks. The polymer can comprise or consist essentially of an elastomeric co-polyester having repeating blocks of hard segments and repeating blocks of soft segments.

The non-polyester segments of the co-polyester can comprise or consist essentially of polyether segments, polyamide segments, or both polyether segments and polyamide segments. The co-polyester can be a block co-polyester, or can be a random co-polyester. The co-polyester can be formed from the polycondensation of a polyester oligomer or prepolymer with a second oligomer prepolymer to form a block copolyester. Optionally, the second prepolymer can be a hydrophilic prepolymer. For example, the co-polyester can be formed from the polycondensation of terephthalic acid or naphthalene dicarboxylic acid with ethylene glycol, 1,4-butanediol, or 1,3-propanediol. Examples of co-polyesters include polyethylene adipate, polybutylene succinate, poly (3-hydroxybutyrate-co-3-hydroxyvalerate), polyethylene terephthalate, polybutylene terephthalate, polytrimethylene terephthalate, polyethylene napthalate, and combinations thereof. The co-polyamide can comprise or consist of polyethylene terephthalate.

The polyester can be a block copolymer comprising segments of one or more of polybutylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), and a liquid crystal polyester. For example, a suitable polyester that is a block copolymer can be a PET/PEI copolymer, a polybutylene terephthalate/ tetraethylene glycol copolymer, a polyoxyalkylenediimide diacid/polybutylene terephthalate copolymer, or a blend or mixture of any of the foregoing.

The polyester can be a biodegradable resin, for example, a copolymerized polyester in which poly(α-hydroxy acid) such as polyglycolic acid or polylactic acid is contained as principal repeating units.

The disclosed polyesters can be prepared by a variety of polycondensation methods known to the skilled artisan, such as a solvent polymerization or a melt polymerization process.

Polyolefins

The composition and/or elastomeric material can comprise a polyolefin. The article comprising the elastomeric material can further one or more components comprising a polyolefin. The polyolefin can be a thermoplastic polyolefin or a thermoset polyolefin. Additionally, the polyolefin can be an elastomeric polyolefin, including a thermoplastic elastomeric polyolefin or a thermoset elastomeric polyolefin. Exemplary polyolefins can include polyethylene, polypropylene, and olefin elastomers (e.g., metallocene-catalyzed block copolymers of ethylene and α-olefins having 4 to about 8 carbon atoms). The polyolefin can be a polymer comprising a polyethylene, an ethylene-α-olefin copolymer, an ethylene-propylene rubber (EPDM), a polybutene, a polyisobutylene, a poly-4-methylpent-1-ene, a polyisoprene, a polybutadiene, a ethylene-methacrylic acid copolymer, and an olefin elastomer such as a dynamically cross-linked polymer obtained from polypropylene (PP) and an ethylene-propylene rubber (EPDM), and blends or mixtures of the foregoing. Further exemplary polyolefins include polymers of cycloolefins such as cyclopentene or norbornene.

It is to be understood that polyethylene, which optionally can be crosslinked, is inclusive of a variety of polyethylenes, including low density polyethylene (LDPE), linear low density polyethylene (LLDPE), (VLDPE) and (ULDPE), medium density polyethylene (MDPE), high density polyethylene (HDPE), high density and high molecular weight polyethylene (HDPE-HMW), high density and ultrahigh molecular weight polyethylene (HDPE-UHMW), and blends or mixtures of any the foregoing polyethylenes. A polyethylene can also be a polyethylene copolymer derived from monomers of monolefins and diolefins copolymerized with a vinyl, acrylic acid, methacrylic acid, ethyl acrylate, vinyl alcohol, and/or vinyl acetate. Polyolefin copolymers comprising vinyl acetate-derived units can be a high vinyl acetate content copolymer, e.g., greater than about 50 weight percent vinyl acetate-derived composition.

The polyolefin can be formed through free radical, cationic, and/or anionic polymerization by methods well known to those skilled in the art (e.g., using a peroxide initiator, heat, and/or light). The disclosed polyolefin can be prepared by radical polymerization under high pressure and at elevated temperature. Alternatively, the polyolefin can be prepared by catalytic polymerization using a catalyst that normally contains one or more metals from group IVb, Vb, VIb or VIII metals. The catalyst usually has one or more than one ligand, typically oxides, halides, alcoholates, esters, ethers, amines, alkyls, alkenyls and/or aryls that can be either p- or s-coordinated complexed with the group IVb, Vb, VIb or VIII metal. The metal complexes can be in the free form or fixed on substrates, typically on activated magnesium chloride, titanium(III) chloride, alumina or silicon oxide. The metal catalysts can be soluble or insoluble in the polymerization medium. The catalysts can be used by themselves in the polymerization or further activators can be used, typically a group Ia, IIa and/or IIIa metal alkyls, metal hydrides, metal alkyl halides, metal alkyl oxides or metal alkyloxanes. The activators can be modified conveniently with further ester, ether, amine or silyl ether groups.

Suitable polyolefins can be prepared by polymerization of monomers of monolefins and diolefins as described herein. Exemplary monomers that can be used to prepare the polyolefin include, but are not limited to, ethylene, propylene, 1-butene, 1-pentene, 1-hexene, 2-methyl-1-propene, 3-methyl-1-pentene, 4-methyl-1-pentene, 5-methyl-1-hexene and mixtures thereof.

Suitable ethylene-α-olefin copolymers can be obtained by copolymerization of ethylene with an α-olefin such as propylene, butene-1, hexene-1, octene-1,4-methyl-1-pentene or the like having carbon numbers of 3 to 12.

Suitable dynamically cross-linked polymers can be obtained by cross-linking a rubber component as a soft segment while at the same time physically dispersing a hard segment such as PP and a soft segment such as EPDM by using a kneading machine such as a Banbury mixer and a biaxial extruder.

The polyolefin can be a mixture of polyolefins, such as a mixture of two or more polyolefins disclosed herein above. For example, a suitable mixture of polyolefins can be a mixture of polypropylene with polyisobutylene, polypropylene with polyethylene (for example PP/HDPE, PP/LDPE) or mixtures of different types of polyethylene (for example LDPE/HDPE).

The polyolefin can be a copolymer of suitable monolefin monomers or a copolymer of a suitable monolefin monomer and a vinyl monomer. Exemplary polyolefin copolymers include ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

The polyolefin can be a polypropylene homopolymer, a polypropylene copolymers, a polypropylene random copolymer, a polypropylene block copolymer, a polyethylene homopolymer, a polyethylene random copolymer, a polyethylene block copolymer, a low density polyethylene (LDPE), a linear low density polyethylene (LLDPE), a medium density polyethylene, a high density polyethylene (HDPE), or blends or mixtures of one or more of the preceding polymers.

The polyolefin can be a polypropylene. The term "polypropylene," as used herein, is intended to encompass any polymeric composition comprising propylene monomers, either alone or in mixture or copolymer with other randomly selected and oriented polyolefins, dienes, or other monomers (such as ethylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polypropylene can be of any standard melt flow (by testing); however, standard fiber grade polypropylene resins possess ranges of Melt Flow Indices between about 1 and 1000.

The polyolefin can be a polyethylene. The term "polyethylene," as used herein, is intended to encompass any polymeric composition comprising ethylene monomers, either alone or in mixture or copolymer with other randomly selected and oriented polyolefins, dienes, or other monomers (such as propylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polyethylene can be of any standard melt flow (by testing); however, standard fiber grade polyethylene resins possess ranges of Melt Flow Indices between about 1 and 1000.

The composition and/or the elastomeric material can further comprise one or more processing aids. The article comprising the elastomeric material can further one or more components comprising one or more processing aids. The processing aid can be a non-polymeric material. These processing aids can be independently selected from the group including, but not limited to, curing agents, initiators, plasticizers, mold release agents, lubricants, antioxidants, flame retardants, dyes, pigments, reinforcing and non-reinforcing fillers, fiber reinforcements, and light stabilizers The composition can be a thermoplastic composition. For example, the thermoplastic composition can comprise one or more of thermoplastic polyurethanes, thermoplastic polyesters, thermoplastic polyamides, thermoplastic polyolefins, or a co-polymer or combination including of any of the foregoing.

The thermoplastic composition can have a softening or melting point of about 80° C. to about 140° C. A temperature of the thermoplastic composition can be increased to a temperature at or above creep relaxation temperature ($T_{cr}$), Vicat softening temperature ($T_{vs}$), heat deflection temperature ($T_{hd}$), and/or melting temperature ($T_m$). In an aspect, the layers or structure can be attached using the thermoplastic composition while the temperature is maintained at or above the creep relaxation temperature, the heat deflection temperature, the Vicat softening temperature, or the melting temperature, of the thermoplastic composition. The layers or structure can be attached using the thermoplastic composition after the temperature of the thermoplastic composition is allowed to drop below the creep relaxation temperature, the heat deflection temperature, the Vicat softening temperature, or the melting temperature of the thermoplastic composition, as long as the thermoplastic composition only partially re-solidified, it can be used to attached the structure or the layers.

In general, the thermoplastic composition can have a creep relaxation temperature ($T_{cr}$) of about 80° C. to about 140° C., or from about 90° C. to about 130° C., or about 100° C. to about 120° C. In general, the thermoplastic composition can have a Vicat softening temperature ($T_{vs}$) of about 80° C. to about 140° C., or from about 90° C. to about 130° C., or about 100° C. to about 120° C. In general, the thermoplastic composition can have a heat deflection temperature ($T_{hd}$) of about 80° C. to about 140° C., or from about 90° C. to about 130° C., or about 100° C. to about 120° C. In general, the thermoplastic composition can have a melting temperature ($T_m$) of about 80° C. to about 140° C., or from about 90° C. to about 130° C., or about 100° C. to about 120° C.

The elastomeric material is a thermoset composition. The thermoset composition can comprise a thermoset polyurethane polymer, thermoset polyurea polymer, thermoset polyamide polymer, thermoset polyolefin polymer, or thermoset silicone polymer, or a co-polymer or combination including any of the foregoing.

In addition to the elastomeric material, the articles of the present disclosure can comprise a polymeric foam composition. For example, the polymeric foam composition can include a polyolefin foam, polyurethane foam, an ethylene-vinyl acetate (EVA) foam, a propylene foam, or a combination thereof. The polymeric foam composition can include a blend with one or more additional materials to impart additional characteristics or properties to the composition. The polymeric foam composition can include one or more other components. A foam composition can include a chemical blowing agent such as a carbonate, bicarbonate, carboxylic acid, azo compound, isocyanate, persulfate, peroxide, or a combination thereof. The foam composition can include about 1 parts per hundred resin to about 10 parts per hundred resin, or about 3 parts per hundred resin to about 7 parts per hundred resin of the chemical blowing agent. The chemical blowing agent has a decomposition temperature of about 130° C. to about 160° C., or about 135° C. to about 155° C. A foam composition can include a crosslinking agent such as an aliphatic unsaturated amide, such as methylenebisacryl- or -methacrylamide or ethylenebisacrylamide; aliphatic esters of polyols or alkoxylated polyols with ethylenically unsaturated acids, such as di(meth)acrylates or tri(meth) acrylates of butanediol or ethylene glycol, polyglycols or trimethylolpropane; di- and tri-acrylate esters of trimethylolpropane; acrylate and methacrylate esters of glycerol and pentaerythritol; allyl compounds, such as allyl (meth)acrylate, alkoxylated allyl (meth)acrylate, triallyl cyanurate, triallyl isocyanurate, maleic acid diallyl ester, poly-allyl esters, vinyl trimethoxysilane, vinyl triethoxysilane, polysiloxane comprising at least two vinyl groups, tetraallyloxyethane, tetraallyloxyethane, triallylamine, and tetraallylethylenediamine; or a mixture thereof. The foam composition can include about 0.1 parts per hundred resin to about 1.5 parts per hundred resin, or about 0.3 parts per hundred resin to about 0.8 parts per hundred resin of the crosslinking agent. A foam composition can include zinc oxide. The zinc oxide can be present from about 0.1 parts per hundred resin to about 5 parts per hundred resin, or about 0.7 parts per hundred resin to about 2 parts per hundred resin. The foam composition can include calcium carbonate. The calcium carbonate can be present from about 1 parts per hundred resin to about 10 parts per hundred resin, or from about 3 parts per hundred resin to about 7 parts per hundred resin. The foam composition can include a dye or pigment. The dye or pigment is present in the resin composition at a level of about 0 parts per hundred resin to about 10 parts per hundred resin, or about 0.5 parts per hundred resin to about 5 parts per hundred resin based upon the weight of the resin composition.

When the elastomeric materials an article of footwear or a component of an article of footwear, such as an outsole of an article of footwear, the elastomeric material can include an ingredient providing additional abrasion resistance and durability as necessary or desirable for use in such articles. The composition can pass a flex test pursuant to the Cold Ross Flex Test as described further herein. The composition can have suitable abrasion loss when measured pursuant to ASTM D 5963-97, as described further herein. The composition can have an abrasion loss of about 0.07 cubic centimeters ($cm^3$) to about 0.1 cubic centimeters ($cm^3$), about 0.08 cubic centimeters ($cm^3$) to about 0.1 cubic centimeters ($cm^3$), or about 0.08 cubic centimeters ($cm^3$) to about 0.11 cubic centimeters ($cm^3$) pursuant to ASTM D 5963-97a using the Material Sampling Procedure.

A component of the article can include a variety of polyolefin copolymers. The copolymers can be alternating copolymers or random copolymers or block copolymers or graft copolymers. The copolymers can be random copolymers. The copolymer can include a plurality of repeat units, with each of the plurality of repeat units individually derived from an alkene monomer having about 1 to about 6 carbon atoms. The copolymer can include a plurality of repeat units, with each of the plurality of repeat units individually derived from a monomer selected from the group consisting of ethylene, propylene, 4-methyl-1-pentene, 1-butene, 1-octene, and a combination thereof.

The polyolefin copolymer can be a random copolymer of a first plurality of repeat units and a second plurality of repeat units, and each repeat unit in the first plurality of repeat units is derived from ethylene and the each repeat unit in the second plurality of repeat units is derived from a second olefin. The second olefin can be an alkene monomer having about 1 to about 6 carbon atoms. The second olefin can include propylene, 4-methyl-1-pentene, 1-butene, or other linear or branched terminal alkenes having about 3 to 12 carbon atoms. The polyolefin copolymer can contain about 80 percent to about 99 percent, about 85 percent to about 99 percent, about 90 percent to about 99 percent, or about 95 percent to about 99 percent polyolefin repeat units by weight based upon a total weight of the polyolefin copolymer. The polyolefin copolymer can consist essentially of polyolefin repeat units. The polymers in the polymeric composition can consist essentially of polyolefin copolymers.

The polyolefin copolymer can include ethylene, i.e. can include repeat units derived from ethylene. The polyolefin copolymer can include about 1 percent to about 5 percent, about 1 percent to about 3 percent, about 2 percent to about 3 percent, or about 2 percent to about 5 percent ethylene by weight based upon a total weight of the polyolefin copolymer.

The polyolefin copolymer can be substantially free of polyurethanes. The polymer chains of the polyolefin copolymer can be substantially free of urethane repeat units. The polymeric composition can be substantially free of polymer chains including urethane repeat units. The polyolefin copolymer can be substantially free of polyamide groups. The polymer chains of the polyolefin copolymer can be substantially free of amide repeat units. The polymeric composition can be substantially free of polymer chains including amide repeat units.

The polyolefin copolymer can include polypropylene or can be a polypropylene copolymer. The polymer component of the polymeric composition (i.e., the portion of the polymeric composition that is formed by all of the polymers present in the composition) can consist essentially of polypropylene copolymers. The polypropylene copolymer can include a random copolymer, e.g. a random copolymer of ethylene and propylene. The polypropylene copolymer can include about 80 percent to about 99 percent, about 85 percent to about 99 percent, about 90 percent to about 99 percent, or about 95 percent to about 99 percent propylene repeat units by weight based upon a total weight of the polypropylene copolymer. The polypropylene copolymer can include about 1 percent to about 5 percent, about 1 percent to about 3 percent, about 2 percent to about 3 percent, or about 2 percent to about 5 percent ethylene by weight based upon a total weight of the polypropylene copolymer. The polypropylene copolymer can be a random copolymer including about 2 percent to about 3 percent of a first plurality of repeat units by weight and about 80 percent to about 99 percent by weight of a second plurality of repeat units based upon a total weight of the polypropylene copolymer.

The composition forming the component comprised of the polyolefin copolymer can include a resin modifier that can improved flexural durability while maintaining suitable abrasion resistance. For example, the composition including the resin modifier can pass a flex test pursuant to the Cold Ross Flex Test using the Plaque Sampling Procedure, and at the same time, the composition can still have a suitable abrasion loss when measured pursuant to ASTM D 5963-97a using the Material Sampling Procedure. The composition including the resin modifier can have no significant change in the abrasion loss as compared to an abrasion loss of a substantially similar composition without the resin modifier, when measured pursuant to ASTM D 5963-97a using the Material Sampling Procedure. A change in abrasion loss, as used herein, is said to not be significant when the change is about 30 percent, about 25 percent, about 20 percent, about 15 percent, about 10 percent, or less when measured pursuant to ASTM D 5963-97a using the Material Sampling Procedure.

The combination of abrasion resistance and flexural durability can be related to the overall crystallinity of the composition comprising the polyolefin copolymer. The composition can have a percent crystallization of about 45 percent, about 40 percent, about 35 percent, about 30 percent, about 25 percent or less when measured according to the Differential Scanning Calorimeter (DSC) Test using the Material Sampling Procedure. The resin modifier can provide a decrease in the percent crystallinity of the composition, as compared to a substantially similar composition without the resin modifier. The composition can have a percent crystallization that is at least 6, at least 5, at least 4, at least 3, or at least 2 percentage points less than a percent crystallization a substantially similar composition without the resin modifier when measured according to the Differential Scanning Calorimeter (DSC) Test using the Material Sampling Procedure.

The effective amount of the resin modifier can be about 5 percent to about 30 percent, about 5 percent to about 25 percent, about 5 percent to about 20 percent, about 5 percent to about 15 percent, about 5 percent to about 10 percent, about 10 percent to about 15 percent, about 10 percent to about 20 percent, about 10 percent to about 25 percent, or about 10 percent to about 30 percent by weight based upon a total weight of the composition. The effective amount of the resin modifier can be about 20 percent, about 15 percent, about 10 percent, about 5 percent, or less by weight based upon a total weight of the composition.

The resin modifier can include a variety of known resin modifiers. The resin modifier can be a metallocene catalyzed copolymer primarily composed of isotactic propylene repeat units with about 11 percent by weight-15 percent by weight of ethylene repeat units based on a total weight of metallocene catalyzed copolymer randomly distributed along the copolymer. The resin modifier can include about 10 percent to about 15 percent ethylene repeat units by weight based upon a total weight of the polymeric resin modifier. The resin modifier can be a copolymer containing isotactic propylene repeat units and ethylene repeat units.

Additional detail regarding methods of making and using the structure are now provided. A method of making an article (e.g., an article of footwear, an article of apparel, or an article of sporting equipment, or component of each) can include affixing a structure as provided herein to a component to form the article.

In regard to an article of footwear, the component can be an upper for an article of footwear and/or a sole for an article of footwear. For example, the step of attaching (e.g., affixing, bonding, adhering, coupling, stitching sewing, etc) can include attaching the sole and the structure such that the first layer is the externally facing layer, which is configured to be ground facing. In another example, the structure can be attached to an upper, where the first layer is externally-facing on the article of footwear. The upper can be attached to the second layer of the structure or to a third layer of the structure through the use of cements or adhesives, by mechanical connectors, and by sewing or stitching, to name a few. When desirable, the method may further include including a midsole between the component and the structure.

A method of preparing the second layer for use in a structure is also provided. The composition used to form the second layer can include a mixture of a polymeric hydrogel and an uncured rubber. Following mixing of the polymeric hydrogel to disperse it in the uncured rubber, the uncured composition can be at least partially cured or fully uncured. The polymeric hydrogel can present in the composition in an amount that ranges from about 0.1 percent by weight to about 10 percent by weight based on the overall weight of the composition.

In regard to mixing the polymeric hydrogel and the uncured rubber, the materials are mixed together until they are substantially blended, with the polymeric hydrogel dispersed throughout the uncured rubber. The mixing may be accomplished using, without limitation, an intermeshing-type internal mixer, a tangential-type internal mixer, a planetary mixer, a mill, a ribbon blender, a cone blender, a screw blender, a drum blender, a Banbury mixer, or the like. More specifically, the polymeric hydrogel and uncured rubber may be compounded in conventional rubber processing equipment. In a typical procedure, all components of the composition are weighed out. The uncured rubber, the polymeric hydrogel (e.g., a thermoplastic polyurethane hydrogel), and any additives are then compounded in a conventional mixer such as a Banbury mixer. If desired, the compounded composition may then be further mixed on a roller mill. It is possible to add other additives, such as pigments (e.g., carbon black, etc.) into the uncured composition at any point before curing. The composition may be allowed to mature for a period of hours prior to the addition of a cure system, alternatively, the additives that comprise the cure system may be added immediately on the roller mill.

The uncured composition can be cured using actinic radiation at a concentration and for a duration of time sufficient to fully cure the composition to form the cured mixture of the cured rubber and the polymeric hydrogel. Fully curing the composition may be done before, during, or after the step of attaching the layers of the structure to each other, or before, during or after the step of attaching the structure to one or more other components. The second layer may not be fully cured until cured in contact with the first layer so that the first composition of the first layer and the second composition of the second layer crosslink with one another. The structure can be formed using of one or more of an extrusion process, a calendaring process, an injection molding process, a compression molding process, a thermoforming process, or the like.

When the composition of the first layer and/or the second layer are at least partially cured or are fully cured, the curing can be accomplished by the occurrence of one or more crosslinking mechanisms. These crosslinking mechanisms may occur, without limitation, via the use of crosslinking agents that are thermally initiated, such as sulfur-based or peroxide-based crosslinking agents or initiators that crosslink radiation curable rubbers upon exposure of the rubber to actinic radiation at a centration and for a duration of time sufficient to achieve the desired degree of cure.

The present disclosure provides for a method of preparing the structure that includes attaching an internally-facing side of a first layer and a first side of a second layer. The one or more channels can be formed by exposing a region of the second layer, wherein each of the one or more channels extends through an entire thickness of the first layer to the second layer, includes a first channel sidewall and an opposing second channel sidewall in the first layer, and is configured to allow water to contact the exposed region of the second layer. The first layer and the second layer can be uncured or partially cured and then subsequently cured in a vulcanization process. For example, the curing process can result in a portion of the rubber of the first layer crosslinking with a portion of the rubber of the second layer, forming chemical bonds (e.g., cross-linking) which adhere the first layer and the second layer to each other. In particular the rubber in the first layer can crosslink with the rubber in the second layer and the polymeric material can optionally crosslink with the rubber in the first layer and/or the rubber in the second layer. In this way, the first layer and the second layer can form a strong bond than what might be obtained using adhesives or the like. In an embodiment, the second layer can be disposed in a mold (not shown) and then the first layer disposed on top of the second layer. The first layer and the second layer can be subjected to a vulcanization process to for the outsole. The upper or a component of the upper can be optionally disposed on the second layer before or after vulcanization. In some cases, it may not be necessary to further reinforce the bond using an adhesive. In these cases, the interface between the first component and the second component can be substantially free of adhesive. This method can be used in conjunction with the methods described above and herein.

The present disclosure provides for a method of forming an outsole and the outsole after being formed, the method comprising: shaping a first composition to form a first portion, wherein the first composition includes a mixture of a first uncured or partially cured rubber and a first polymeric hydrogel at a first concentration, wherein the first polymeric hydrogel is distributed throughout the first uncured or partially cured rubber; and curing the first portion to form a first elastomeric material, thereby curing the first uncured or partially cured rubber into a first fully cured rubber, and forming a first polymeric network including the first fully cured rubber in the first elastomeric material, wherein the first polymeric hydrogel is distributed throughout and entrapped by the first polymeric network and optionally: the shaping the second composition comprises placing the second composition in a second region of a mold that is an externally-facing side an outsole, wherein the second region of the mold is configured to form channels and optional traction elements; the shaping the first composition and contacting the at least an edge of the first portion with the at least an edge of the second portion comprises placing the first composition in a first region of the mold, wherein the first region of the mold is configured to form a substrate for the channels and optionally the traction elements, and placing the first composition in the first region of the mold comprises contacting a second side of the second portion with a first side of the first portion; the curing comprises curing fully curing both the first portion and the second portion in the mold and bonding the first side of the first portion to the second side of the second portion; and following the curing, removing the bonded first portion and second from the mold, wherein the channels and optionally the traction elements are on the externally-facing side an outsole Sampling Procedures The properties of the elastomeric material of the component in a finished article can be characterized using samples prepared and measured according to the Materials Sampling Procedure or the Component Sampling Procedure. The Materials Sampling Procedure is used to obtain a sample of a material of the present disclosure that is either in media form or isolated in a neat form (i.e., without any bonded substrate in a layered film, such as that found in the composition defined herein). A material is provided in media form, when it is obtained as flakes, granules, powders, pellets, or the like. If a source of the material is not available in a media form, the material can be cut, scraped, or ground from an outsole of a footwear outsole or from a backing substrate of a co-extruded sheet or web, thereby isolating the material in media form. When desirable, the material in media form may be extruded as a web or sheet having a substantially constant material thickness (within +/−10 percent of the average material thickness), and cooled to solidify the resulting web or sheet. A sample of the material in neat form having a surface area of 4 cm$^2$ is then cut from the resulting web or sheet for use in testing.

The Component Sampling Procedure may include the use of one or more of the following sampling procedures:

(A)—Footwear Sampling Procedure

This procedure is used to obtain a sample of the elastomeric material when the elastomeric material is a component of an article of footwear (e.g., bonded to an article substrate or a substrate). An article sample, which includes the elastomeric material in a non-wet state (e.g., at approximately 25 degrees C. and approximately 20 percent relative humidity) is cut from the article of footwear using a blade. This process is performed by separating the article from an associated footwear upper, and removing any materials from the article's top surface (e.g., corresponding to the top surface) that can uptake water and potentially skew the water uptake measurements of the elastomeric material. For example, the article's top surface can be skinned, abraded, scraped, or otherwise cleaned to remove any upper adhesives, yarns, fibers, foams, and the like that could potentially take up water themselves.

The resulting sample includes the component and any article substrate bonded to the component, and maintains the interfacial bond between the component and the associated substrate of the finished article. As such, this test can simulate how the elastomeric material will perform as part of an article of footwear. Additionally, this sample is also useful in cases where the interfacial bond between the component and the substrate is less defined, such as where the elastomeric material of the component is highly diffused into the substrate of the finished article (e.g., with a concentration gradient).

The sample is taken at a location along the article that provides a substantially constant thickness for the component (within plus or minus 10 percent of the average thickness), such as in a forefoot region, mid-foot region, or a heel region of the article, and has a surface area of about 4.0 square centimeters. In cases where the elastomeric material is not present on the article in any segment having a 4.0 square centimeter surface area and/or where the thickness is not substantially constant for a segment having a 4.0 square centimeter surface area, sample sizes with smaller cross-sectional surface areas can be taken and the area-specific measurements are adjusted accordingly.

(B)—Apparel Sampling Procedure

This procedure is used to obtain a sample of the elastomeric material when the elastomeric material is present as a component in a finished article of apparel (e.g., a garment or other article excluding an article of footwear). A sample including the component in a dry state (e.g., at approximately 25 degrees C. and approximately 20 percent relative humidity) is cut from the article of apparel using a blade. This process is performed by separating the component of the article of apparel from any associated component of the article of apparel. For example, if the component is present on a sleeve of a shirt, the sleeve component can be removed from the rest of the garment, and then the sample can be removed from the sleeve component.

If possible, any remaining or residual substances can be removed from the second surface of the component (e.g., the surface opposing the externally-facing surface which comprises the elastomeric material) that can take up water and potentially skew the water uptake measurements of the elastomeric material. For example, any padding or additional layers, which are not externally facing during use, can be removed from the second side of the sample. For example, if appropriate, the second surface can be skinned, abraded, scraped, or otherwise cleaned to remove any upper adhesives, yarns, fibers, foams, and the like that could potentially take up water themselves.

The resulting sample may include the elastomeric material present on the side of the component configured to be externally-facing during use and any substrate or substrate affixed to the component, and, if one is present, maintains the interfacial bond between the component and the associated substrate. As such, this test can simulate how the component will perform as part of an article of apparel. Additionally, this sample is also useful in cases where the interfacial bond between the component and the substrate or substrate is less defined, such as where the elastomeric material is highly diffused into the substrate (e.g., with a concentration gradient).

The sample is taken at a location along the article of apparel that provides a substantially constant thickness for the material (within +/−10 percent of the average material thickness present in the component), is taken from a portion of the component where soil would typically accumulate during wear, and has a surface area of 4.0 square centimeters. In cases where the elastomeric material is not present on the finished article in any segment having a 4.0 square centimeter surface area and/or where the thickness is not substantially constant for a segment having a 4.0 square centimeter surface area, sample sizes with smaller cross-sectional surface areas can be taken and the area-specific measurements are adjusted accordingly.

(C)—Equipment Sampling Procedure

This procedure is used to obtain a sample of the elastomeric material when the elastomeric material is present as a component in a finished article of sporting equipment (e.g., when the component is affixed to a substrate or substrate). A sample including the elastomeric material in a dry state (e.g., at approximately 25 degrees C. and approximately 20 percent relative humidity) is cut from the article of sporting equipment using a blade. This process is performed by separating the component from the finished article of sporting equipment. For example, if the component is present on a portion of a golf bag, the portion of the golf bag comprising the elastomeric material can be removed from the rest of the golf bag.

If possible, any remaining substances can be removed from the second surface of the component (e.g., the surface opposing the externally-facing surface which comprises the elastomeric material) that can take up water and potentially skew the water uptake measurements of the elastomeric material. For example, any padding or additional layers, which are not externally-facing during use, can be removed from the second side of the sample. For example, if appropriate, the second surface can be skinned, abraded, scraped, or otherwise cleaned to remove any adhesives, yarns, fibers, foams, and the like that could potentially take up water themselves.

The resulting sample includes the elastomeric material present on the externally-facing side of the component and any substrate affixed to the component, and, if one is present, maintains the interfacial bond between the material and the associated substrate or substrate. As such, this test can simulate how the component will perform as part of an article of sporting equipment. Additionally, this sample is also useful in cases where the interfacial bond between the component and the substrate is less defined, such as where the elastomeric material is highly diffused into the substrate or substrate (e.g., with a concentration gradient).

The sample is taken at a location along the component of the article of sporting equipment that provides a substantially constant thickness for the material (within plus or minus 10 percent of the average thickness present in the component). In addition, the sample is taken from a portion of the component where soil would typically accumulate during wear, and has a surface area of 4.0 square centimeters. In cases, where the component is not present on the finished article in any segment having a 4.0 square centimeter surface area and/or where the component thickness is not substantially constant for a segment having a 4.0 square centimeter surface area, sample sizes with smaller cross-sectional surface areas can be taken and the area-specific measurements are adjusted accordingly.

Test Protocols

The following test procedures are described with reference to components of finished articles of footwear using the Materials Sampling Procedure or the Footwear Sampling Procedure as the Component Sampling Procedure. However, the same tests can be applied to samples taken with the Apparel Sampling Procedure and/or the Equipment Sampling Procedure as the Component Sampling Procedure.

(I)—Water Cycling Test Protocol

This test measures the mass stability of elastomeric materials by measuring the weight gain/loss that occurs upon the reversible absorption of water. Test samples are prepared by punching out 2.54 cm (1 inch) diameter disks from sheets of the elastomeric materials. Each of the test samples is weighed prior to soaking in water with the mass being recorded to the nearest milligram as the "initial" mass. The test samples are then soaked in room-temperature water for a time interval of 18-24 hours. To measure the total mass gain/loss of the elastomeric material, the test samples are removed from the water and patted dry with a laboratory wipe to remove free surface water. The test samples are then allowed to dry in ambient laboratory conditions. The mass of each test sample is measured incrementally until a steady state is achieved over a 24 hour period. The final "dried" mass of each test sample is then measured and compared to the corresponding "initial" mass.

(II)—Water Uptake Capacity Test Protocol

This test measures the water uptake capacity of the elastomeric material after a predetermined soaking duration for a sample (e.g., taken with the above-discussed Footwear Sampling Procedure). The sample is initially dried at 60 degrees C. until there is no weight change for consecutive measurement intervals of at least 30 minutes apart (e.g., a 24-hour drying period at 60 degrees C. is typically a suitable duration). The total weight of the dried sample (Wt, sample dry) is then measured in grams. The dried sample is allowed to cool down to 25 degrees C., and is fully immersed in a deionized water bath maintained at 25 degrees C. After a given soaking duration, the sample is removed from the deionized water bath, blotted with a cloth to remove surface water, and the total weight of the soaked sample (Wt, sample wet) is measured in grams.

Any suitable soaking duration can be used, where a 24-hour soaking duration is believed to simulate saturation conditions for the hydrophilic resin or hydrogel of the present disclosure (i.e., the hydrophilic resin will be in its saturated state). Accordingly, as used herein, the expression "having a water uptake capacity at 5 minutes" refers to a soaking duration of 5 minutes, the expression "having a water uptake capacity at 1 hour" refers to a soaking duration of 1 hour, the expression "having a water uptake capacity at 24 hours" refers to a soaking duration of 24 hours, and the like. If no time duration is indicated after a water uptake capacity value, the soaking duration corresponds to a period of 24 hours. In an aspect, the elastomeric material can have a "time value" equilibrium water uptake capacity, where the time value corresponds to the duration of soaking. For example, a "30 second equilibrium water uptake capacity" corresponds to a soaking duration of 30 seconds, a 2 minute equilibrium water uptake capacity corresponds to a soaking duration of 2 minutes, and so on at various time duration of soaking. A time duration of "0 seconds" refers to the dry-state and a time duration of 24 hours corresponds to the saturated state of the elastomeric material.

As can be appreciated, the total weight of a sample taken pursuant to the Footwear Sampling Procedure includes the weight of the material as dried or soaked (Wt. S. Dry or Wt. S. Wet) and the weight of the substrate (Wt. Sub.) needs to be subtracted from the sample measurements.

The weight of the substrate (Wt. Sub.) is calculated using the sample surface area (e.g., 4.0 square centimeters), an average measured thickness of the substrate in the sample, and the average density of the substrate material. Alternatively, if the density of the material for the substrate is not known or obtainable, the weight of the substrate (Wt. Sub.) is determined by taking a second sample using the same sampling procedure as used for the primary sample, and having the same dimensions (surface area and film/substrate thicknesses) as the primary sample. The material of the second sample is then cut apart from the substrate of the second sample with a blade to provide an isolated substrate. The isolated substrate is then dried at 60 degrees C. for 24 hours, which can be performed at the same time as the primary sample drying. The weight of the isolated substrate (Wt. Sub.) is then measured in grams.

The resulting substrate weight (Wt. Sub.) is then subtracted from the weights of the dried and soaked primary sample (Wt. S. Dry or Wt S. Wet) to provide the weights of the material as dried and soaked (Wt. C. Dry or Wt. C. Dry) as depicted by Equations 1 and 2.

$$Wt.\ C.\ Dry = Wt.\ S.\ Dry - Wt.\ Sub \qquad (Eq.\ 1)$$

$$Wt.\ C.\ Wet = Wt.\ S.\ Wet - Wt.\ Sub. \qquad (Eq.\ 2)$$

The weight of the dried component (Wt. C. Dry) is then subtracted from the weight of the soaked component (Wt C. Wet) to provide the weight of water that was taken up by the component, which is then divided by the weight of the dried component (Wt. C. Dry) to provide the water uptake capacity for the given soaking duration as a percentage, as depicted below by Equation 3.

$$\text{Water Uptake Capacity} = \frac{Wt.C.\ Wet - Wt.\ C.\ Dry}{Wt.C.\ Dry}(100\ \text{percent}) \qquad (Eq.\ 3)$$

For example, a water uptake capacity of 50 percent at 1 hour means that the soaked component weighed 1.5 times more than its dry-state weight after soaking for 1 hour. Similarly, a water uptake capacity of 500 percent at 24 hours means that the soaked component weighed 5 times more than its dry-state weight after soaking for 24 hours.

(III)—Water Uptake Rate Test Protocol

This test measures the water uptake rate of the elastomeric material by modeling weight gain as a function of soaking time for a sample with a one-dimensional diffusion model.

The sample can be taken with any of the above-discussed sampling procedures, including the Footwear Sampling Procedure. The sample is dried at 60 degrees C. until there is no weight change for consecutive measurement intervals of at least 30 minutes apart (a 24-hour drying period at 60 degrees C. is typically a suitable duration). The total weight of the dried sample (Wt. S. Dry) is then measured in grams. Additionally, the average thickness of the component for the dried sample is measured for use in calculating the water uptake rate, as explained below.

The dried sample is allowed to cool down to 25 degrees C., and is fully immersed in a deionized water bath maintained at 25 degrees C. Between soaking durations of 1, 2, 4, 9, 16, and 25 minutes, the sample is removed from the deionized water bath, blotted with a cloth to remove surface water, and the total weight of the soaked sample (Wt. S. Wet) is measured at particular soaking-duration data points (e.g., 1, 2, 4, 9, 16, or 25 minutes).

The exposed surface area of the soaked sample is also measured with calipers for determining the specific weight gain, as explained below. The exposed surface area refers to the surface area that comes into contact with the deionized water when fully immersed in the bath. For samples obtained using the Footwear Sampling Procedure, the samples only have one major surface exposed. For convenience, the surface areas of the peripheral edges of the sample are ignored due to their relatively small dimensions.

The measured sample is fully immersed back in the deionized water bath between measurements. The 1, 2, 4, 9, 16, and 25 minute durations refer to cumulative soaking durations while the sample is fully immersed in the deionized water bath (i.e., after the first minute of soaking and first measurement, the sample is returned to the bath for one more minute of soaking before measuring at the 2-minute mark).

As discussed above in the Water Uptake Capacity Test, the total weight of a sample taken pursuant to the Footwear Sampling Procedure includes the weight of the material as dried or soaked (Wt. C. Wet or Wt. C. Dry) and the weight of the article or backing substrate (Wt. Sub.). In order to determine a weight change of the material due to water uptake, the weight of the substrate (Wt. Sub.) needs to be subtracted from the sample weight measurements. This can be accomplished using the same steps discussed above in the Water Uptake Capacity Test to provide the resulting material weights Wt. C. Wet and Wt. C. Dry for each soaking-duration measurement.

The specific weight gain (Wt. Gn.) water uptake for each soaked sample is then calculated as the difference between the weight of the soaked sample (Wt. C. Wet) and the weight of the initial dried sample (W. C. Dry) where the resulting difference is then divided by the exposed surface area of the soaked sample (A) as depicted in Equation 4.

$$(Wt.G.) = \frac{(Wt.C.\ Wet - Wt.C.\ Dry)}{(A)} \qquad (Eq.\ 4)$$

for a particular soaking-duration data point (e.g., 1, 2, 4, 9, 16, or 25 minutes), as mentioned above.

The water uptake rate for the elastomeric material is then determined as the slope of the specific weight gains Wt. G.) versus the square root of time (in minutes) of the soaking duration, as determined by a least squares linear regression of the data points. For the elastomeric material of the present disclosure, the plot of the specific weight gains (Wt. G.) versus the square root of time (in minutes) of the soaking duration provides an initial slope that is substantially linear (to provide the water uptake rate by the linear regression analysis). However, after a period of time depending on the thickness of the component, the specific weight gains will slow down, indicating a reduction in the water uptake rate, until the saturated state is reached. This is believed to be due to the water being sufficiently diffused throughout the elastomeric material as the water uptake approaches saturation, and will vary depending on component thickness.

As such, for the component having an average thickness (as measured above) less than 0.3 millimeters, only the specific weight gain data points at 1, 2, 4, and 9 minutes are used in the linear regression analysis. In these cases, the data points at 16 and 25 minutes can begin to significantly diverge from the linear slope due to the water uptake approaching saturation, and are omitted from the linear regression analysis. In comparison, for the component having an average dried thickness (as measured above) of 0.3 millimeters or more, the specific weight gain data points at 1, 2, 4, 9, 16, and 25 minutes are used in the linear regression analysis. The resulting slope defining the water uptake rate for the sample has units of weight/(surface area-square root of time), such as grams/(meter$^2$-minutes$^{1/2}$) or g/m$^2$/$\sqrt{\text{min}}$.

Furthermore, some component surfaces can create surface phenomenon that quickly attract and retain water molecules (e.g., via surface hydrogen bonding or capillary action) without actually drawing the water molecules into the film or substrate. Thus, samples of these films or substrates can show rapid specific weight gains for the 1-minute sample, and possibly for the 2-minute sample. After that, however, further weight gain is negligible. As such, the linear regression analysis is only applied if the specific weight gain in data points at 1, 2, and 4 minutes continue to show an increase in water uptake. If not, the water uptake rate under this test methodology is considered to be about zero g/m$^2$/$\sqrt{\text{min}}$.

(IV)—Swelling Capacity Test Protocol

This test measures the swelling capacity of the component in terms of increases in thickness and volume after a given soaking duration for a sample (e.g., taken with the above-discussed Footwear Sampling Procedure). The sample is initially dried at 60 degrees C. until there is no weight change for consecutive measurement intervals of at least 30 minutes apart (a 24-hour drying period is typically a suitable duration). The dimensions of the dried sample are then measured (e.g., thickness, length, and width for a rectangular sample; thickness and diameter for a circular sample, etc.). The dried sample is then fully immersed in a deionized water bath maintained at 25 degrees C. After a given soaking duration, the sample is removed from the deionized water bath, blotted with a cloth to remove surface water, and the same dimensions for the soaked sample are re-measured.

Any suitable soaking duration can be used. Accordingly, as used herein, the expression "having a swelling thickness (or volume) increase at 5 minutes of." refers to a soaking duration of 5 minutes, the expression "having a swelling thickness (or volume) increase at 1 hour of" refers to a test duration of 1 hour, the expression "having a swelling thickness (or volume) increase at 24 hours of" refers to a test duration of 24 hours, and the like.

The swelling of the component is determined by (1) an increase in the thickness between the dried and soaked component, by (2) an increase in the volume between the dried and soaked component, or (3) both. The increase in thickness between the dried and soaked components is calculated by subtracting the measured thickness of the initial dried component from the measured thickness of the soaked component. Similarly, the increase in volume between the dried and soaked components is calculated by subtracting the measured volume of the initial dried component from the measured volume of the soaked component. The increases in the thickness and volume can also be represented as percentage increases relative to the dry thickness or volume, respectively.

Clauses

Clause 1. A structure comprising:
   a first layer having an externally-facing side and an internally-facing side opposing the externally-facing side, wherein the first layer is substantially impermeable to water; and
   a second layer attached to the internally-facing side of the first layer, wherein the second layer is water-swellable;
   wherein the first layer comprises one or more channels that extend through an entire thickness of the first layer to the second layer,
      the one or more channels expose a region of the second layer,
      the one or more channels allow water to contact the exposed region of the second layer,
      each of the one or more channels has a first channel sidewall in the first layer and an opposing second channel sidewall in the first layer, and
      the first sidewall has a first position relative to the second sidewall when the exposed region of the second layer is substantially dry, and a second position relative to the second sidewall when the exposed region takes up water and swells, wherein the second position differs from the first position in a measurable distance along at least a portion of a length, a width, a height, or any combination thereof, of the at least one channel.

Clause 2. The structure of clause 1, wherein the one or more channels allow liquid water to contact the exposed region of the second layer.

Clause 3. The structure of any preceding clause, wherein the first layer is a cured rubber, optionally a cured natural rubber, a cured polybutadiene rubber, or cured polyisoprene rubber, or any combination thereof.

Clause 4. The structure of any preceding clause, wherein the second layer comprises an elastomeric material, optionally wherein the elastomeric material comprises a polymeric hydrogel, or optionally wherein the elastomeric material is formed of a mixture of a polymeric hydrogel and a cured rubber.

Clause 5. The structure of any preceding clause, wherein the rubber is a cured rubber, wherein the composition is an elastomeric material, wherein, in the elastomeric material, the polymeric hydrogel is distributed throughout the cured rubber and at least a portion of the polymeric hydrogel in the elastomeric material is entrapped by the cured rubber, wherein optionally the polymeric hydrogel is physically entrapped by the cured rubber, or is chemically bonded to the cured rubber, or is both physically entrapped by the cured rubber and chemically bonded to the cured rubber.

Clause 6. The composition of any preceding clause, wherein the composition of the polymeric hydrogel and the cured rubber has a water uptake of at least 40 percent by weight, based on a total weight of the composition.

Clause 7. The structure of any preceding clause, wherein the first layer comprises the cured rubber, the second layer comprises the elastomeric material, and the second layer is attached to the internally-facing side of the first layer by crosslinks between the cured rubber of the first layer and the cured rubber of the second layer.

Clause 8. The composition of any preceding clause, wherein the polymeric hydrogel comprises a polyurethane hydrogel, optionally wherein the polyurethane hydrogel is a reaction polymer of a diisocyanate with a polyol, or optionally wherein the polyurethane hydrogel comprises a thermoplastic polyurethane (TPU) which includes a plurality of alkoxy segments and a plurality of diisocyanate segments, wherein the plurality of diisocyanate segments are linked to each other by chain extending segments.

Clause 9. The composition of any preceding clause, wherein the TPU is a reaction polymer of a diisocyanate with a polyol.

Clause 10. The composition of any preceding clause, wherein the diisocyanate segments comprise an aliphatic diisocyanate segment, an aromatic diisocyanate segment, or both.

Clause 11. The composition of any preceding clause, wherein the diisocyanate segments comprise aliphatic diisocyanate segments, optionally wherein the aliphatic diisocyanate segments include hexamethylene diisocyanate (HDI) segments, optionally wherein a majority of the diisocyanate segments are HDI segments, or optionally wherein the aliphatic diisocyanate segments include isophorone diisocyanate (IPDI) segments.

Clause 12. The composition of any preceding clause, wherein the diisocyanate segments includes aromatic diisocyanate segments, optionally wherein the aromatic diisocyanate segments include diphenylmethane diisocyanate (MDI) segments, and optionally wherein the aromatic diisocyanate segments include toluene diisocyanate (TDI) segments.

Clause 13. The composition of any preceding clause, wherein the alkoxy segments include ester segments and ether segments, optionally wherein the alkoxy segments include ester segments, and optionally wherein the alkoxy segments include ether segments.

Clause 14. The composition of any preceding clause, wherein the polymeric hydrogel comprises a polyamide hydrogel, optionally wherein the polyamide hydrogel is a reaction polymer of a condensation of diamino compounds with dicarboxylic acids.

Clause 15. The composition of any preceding clause, wherein the polymeric hydrogel comprises a polyurea hydrogel, optionally wherein the polyurea hydrogel is a reaction polymer of a diisocyanate with a diamine.

Clause 16. The composition of any preceding clause, wherein the polymeric hydrogel comprises a polyester hydrogel, optionally wherein the polyester hydrogel is a reaction polymer of a dicarboxylic acid with a diol.

Clause 17. The composition of any preceding clause, wherein the polymeric hydrogel comprises a polycarbonate hydrogel, optionally wherein the polycarbonate hydrogel is a reaction polymer of a diol with phosgene or a carbonate diester.

Clause 18. The composition of any preceding clause, wherein the polymeric hydrogel comprises a polyetheramide hydrogel, optionally wherein the polyetheramide hydrogel is a reaction polymer of dicarboxylic acid and polyether diamine.

Clause 19. The composition of any preceding clause, wherein the polymeric hydrogel comprises a hydrogel formed of addition polymers of ethylenically unsaturated monomers.

Clause 20. The composition of any preceding clause, wherein the polymeric hydrogel comprises a hydrogel formed of a copolymer, wherein the copolymer is a combination of two or more types of polymers within each polymer chain, optionally wherein the copolymer is selected from the group consisting of: a polyurethane/polyurea copolymer, a polyurethane/polyester copolymer, and a polyester/polycarbonate copolymer.

Clause 21. The composition of any preceding clause, wherein the hydrogel comprises a plurality of copolymer chains, each copolymer chain independently having a combination of hard segments (HS) and soft segments, wherein each of the soft segments (SS) independently includes a plurality of hydroxyl groups, one or more poly(ethylene oxide) (PEO) segments, or both; optionally wherein each of the soft segments (SS) of the polymeric hydrogel independently has a greater level of hydrophilicity than each of the hard segments (HS), or optionally wherein an average ratio of a number of soft segments to a number hard segments (SS:HS) present in the copolymer chains of the polymeric hydrogel range from about 6:1 to about 100:1.

Clause 22. The composition of any preceding clause, wherein the polymeric hydrogel has a water uptake capacity in the range of about 50 weight percent to about 2000 weight percent, as measured using the Water Uptake Capacity Test with the Material Sampling Procedure, or optionally wherein the polymeric hydrogel has a water uptake capacity in the range of about 100 weight percent to about 1500 weight percent, or optionally wherein the polymeric hydrogel has a water uptake capacity in the range of about 300 weight percent to about 1200 weight percent or optionally the elastomeric material has an equilibrium water uptake capacity of at least 20 weight percent, or at least 40 weight percent, or at least 60 weight percent, or at least 80 weight percent, or at least 100 weight percent.

Clause 23. The composition of any preceding clause, wherein the polymeric hydrogel has a water uptake rate of 10 g/m²/√min to 120 g/m²/√min as measured using the Water Uptake Rate Test with the Material Sampling Procedure.

Clause 24. The composition of any preceding clause, wherein the composition includes from about 0.5 parts per hundred resin to about 85 parts per hundred resin of the polymeric hydrogel based on an overall weight of the composition, wherein the composition includes from about 5 parts per hundred to about 80 parts per hundred of the polymeric hydrogel based on an overall weight of the composition, wherein the composition includes from about 10 parts per hundred to about 75 parts per hundred of the polymeric hydrogel based on an overall weight of the composition, or wherein the composition includes from about 20 parts per hundred to about 70 parts per hundred of the polymeric hydrogel based on an overall weight of the composition.

Clause 25. The composition of any preceding clause, wherein the colorant is selected from a dye, pigment, or combination thereof.

Clause 26. The composition of any preceding clause, wherein the elastomeric material has an equilibrium water uptake of at least 2 weight percent, wherein the elastomeric material has an equilibrium water uptake capacity of at least 5 percent, wherein the elastomeric material has an equilibrium water uptake capacity of at least 10 percent, wherein the elastomeric material has an equilibrium water uptake capacity of at least 20 percent or, wherein the elastomeric material has an equilibrium water uptake capacity of at least 30 percent.

Clause 27. The composition of any preceding clause, wherein the elastomeric material has a water cycling weight loss from about 0 weight percent to about 15 weight percent as measured using the Water Cycling Test with the Material Sampling Procedure.

Clause 28. The structure of any preceding clause, wherein the first layer has a thickness of about 0.5 millimeter to about 10 millimeters and the second layer has a dry-state thickness of about 0.1 millimeter to about 10 millimeters.

Clause 29. The structure of any preceding clause, wherein the channel in the first layer has a width of about 0.1 millimeter to about 5 millimeters in the dry-state structure.

Clause 30. The structure of any preceding clause, wherein the channel increases in width by about 10 percent to 500 percent upon exposure of the structure to water.

Clause 31. The structure of any preceding clause, wherein the structure is attached to a textile.

Clause 32. The structure of any preceding clause, wherein at least one layer of the structure comprises a plurality of fibers, one or more yarns, one or more textiles, or any combination thereof.

Clause 33. The structure of any preceding clause, wherein the structure is attached to, or at least one layer of the structure comprises a plurality of fibers, one or more yarns, one or more textiles, or any combination thereof, wherein the plurality of fibers, the one or more yarns, the one or more textiles, or the combination thereof, comprise synthetic fibers.

Clause 34. The structure of any preceding clause, wherein the textile is a knit textile, a woven textile, a non-woven textile, a braided textile a crocheted textile, or any combination thereof.

Clause 35. The structure of any preceding clause, wherein the synthetic fibers or yarns comprise, consist of, or consist essentially of a thermoplastic composition.

Clause 36. The structure of any preceding clause, wherein the thermoplastic composition comprises, consists of, or consists essentially of a thermoplastic polyurethane (TPU), a thermoplastic polyamide, a thermoplastic polyester, a thermoplastic polyolefin, or a mixture thereof.

Clause 37. The structure of any preceding clause, wherein the structure comprises a plurality of fibers, one or more yarns, one or more textiles, or any combination thereof.

Clause 38. The structure of any preceding clause, wherein the plurality of fibers, the one or more yarns, the one or more textiles, or any combination thereof, is a filler or as a reinforcing element in one or more layers of the structure.

Clause 39. The method of any preceding clause, wherein the first layer comprises a first composition, and the second layer comprises a second composition.

Clause 40. The structure of any preceding clause, wherein the plurality of fibers are dispersed in the first composition or the second composition.

Clause 41. The structure of any preceding clause, wherein the first composition, the second composition, or both infiltrate the yarn and/or the textile and consolidates the fibers of the yarn and/or the fibers or yarn of the textile.

Clause 42. The structure of any preceding clause, further comprising a third layer disposed on the second layer on the side opposite the first layer.

Clause 43. The structure of any preceding clause, wherein the third layer is a first boundary layer that constrains the second layer.

Clause 44. The structure of any preceding clause, further comprising a fourth layer, wherein at least a portion of the fourth layer is disposed on at least one edge of the second layer.

Clause 45. The structure of any preceding clause, wherein the fourth layer is a second boundary layer that constrains the second layer.

Clause 46. The structure of any preceding clause, wherein the first boundary, the second boundary, or both are configured to constrain the second layer so that upon swelling of the second layer, the topography of the first layer changes relative to the topography of the first layer prior to swelling of the second layer.

Clause 47. The structure of any preceding clause, wherein the first boundary, the second boundary, or both are configured to constrain the second layer so that upon swelling of the second layer, the topography of the first layer changes relative to the topography of the first layer when the second layer swells without the first boundary, the second boundary, or both.

Clause 48. An article comprising the structure of any of the preceding clauses.

Clause 49. The article of any preceding clause, wherein the second layer has a dry-state thickness in the range of about 0.2 mm to about 2.0 mm.

Clause 50. The article of any preceding clause, wherein the second layer has a saturated-state thickness that is at least 100 percent greater than the dry-state thickness of the second layer.

Clause 51. The article of any preceding clause, wherein the saturated-state thickness of the second layer is at least 200 percent greater than the dry-state thickness of the second layer.

Clause 52. The article of any preceding clause, wherein the article is an article of footwear, a component of footwear, an article of apparel, a component of apparel, an article of sporting equipment, or a component of sporting equipment.

Clause 53. The article of any preceding clause, wherein the article is an article of footwear.

Clause 54. The article of any preceding clause, wherein the article is a sole component for an article of footwear, wherein the first layer is ground facing.

Clause 55. The article of any preceding clause, wherein the one or more channels form a tread pattern.

Clause 56. The article of any preceding clause, wherein the tread pattern is a linear configuration, a non-linear configuration or a combination thereof.

Clause 57. The article of any preceding clause, wherein the structure further comprises a third layer comprising, a polymeric foam, a molded solid polymeric material, a textile, or a combination thereof.

Clause 58. The article of any preceding clause, wherein the textile is a natural leather or a synthetic leather, including a synthetic leather comprising ground natural leather.

Clause 59. The article of any preceding clause, wherein the third layer includes a thermoset polymeric material, a thermoplastic polymeric material, or both.

Clause 60. The article of any preceding clause, wherein the thermoplastic polymeric material includes a thermoplastic polyurethane, a thermoplastic polyester, a thermoplastic polyamide, a thermoplastic polyolefin, or any combination thereof.

Clause 61. The article of any preceding clause, wherein the third layer includes a textile.

Clause 62. The article of any preceding clause, wherein the textile includes fibers or yarns formed from a thermoplastic polymeric material that includes a thermoplastic polyurethane, a thermoplastic polyester, a thermoplastic polyamide, a thermoplastic polyolefin, or any combination thereof.

Clause 63. A method of making an article, comprising:

attaching a first component and structure of any one of preceding clauses to one another, thereby forming the article.

Clause 64. The method of any preceding clause, wherein the article is an article of footwear, an article of apparel, or an article of sporting equipment.

Clause 65. The method of any preceding clause, wherein the first component is an upper component for an article of footwear.

Clause 66. The method of any preceding clause, wherein the structure is a sole component for an article of footwear.

Clause 67. The method of any preceding clause, wherein the step of attaching is attaching the sole component such that the first layer is ground facing.

Clause 68. An article comprising: a product of the method of of any preceding clause.

Clause 69. The article of any preceding clause, wherein the first component is substrate comprises a natural leather, a synthetic leather, a polymeric foam, a molded solid polymeric material, a textile, or a combination thereof, and the second component is affixed to the first component.

Clause 70. The article of any preceding clause, wherein the first component is a substrate that includes a thermoset polymeric material, a thermoplastic polymeric material, or both.

Clause 71. The article of any preceding clause, wherein the thermoplastic polymeric material includes a thermoplastic polyurethane, a thermoplastic polyester, a thermoplastic polyamide, a thermoplastic polyolefin, or any combination thereof.

Clause 72. The article of any preceding clause, wherein the first component includes a textile.

Clause 73. The article of any preceding clause, wherein the textile includes fibers or yarns formed from a thermoplastic polymeric material that includes a thermoplastic polyurethane, a thermoplastic polyester, a thermoplastic polyamide, a thermoplastic polyolefin, or any combination thereof.

Clause 74. A method of preparing a structure, the method comprising:

attaching an internally-facing side of a first layer and a first side of a second layer, wherein the first layer is substantially impermeable to water and the second layer is water-swellable; and forming one or more channels exposing a region of the second layer, wherein each of the one or more channels extends through an entire thickness of the first layer to the second layer, includes a first channel sidewall and an opposing second channel sidewall in the first layer, and is configured to allow water to contact the exposed region of the second layer.

Clause 75. The method of any preceding clause, wherein the first layer comprises a first composition, and the second layer comprises a second composition.

Clause 76. The method of any preceding clause, wherein the method further comprises curing the first layer in contact with the second layer, thereby forming a chemical bond or a mechanical bond or both between the first layer material and the second layer material.

Clause 77. The method of any preceding clause, wherein the curing is conducted after the forming the one or more channels.

Clause 78. The method of any preceding clause, wherein the curing is conducted prior to the forming the one or more channels.

Clause 79. The method of any preceding method clause, wherein prior to the curing step, the first composition comprises an uncured rubber, and the second composition comprises a polymeric hydrogel dispersed in an uncured rubber; and following the curing step, the first composition comprises a cured rubber, and the second composition comprises the polymeric hydrogel dispersed in a cured rubber, wherein the polymeric hydrogel is entrapped by the cured rubber.

Clause 80. The method of any preceding method clause, wherein the structure is a structure of any preceding clause.

Clause 81. The method of any preceding clause, wherein prior to curing, the first layer comprises a first uncured rubber and the second layer comprises a second uncured rubber and a polymeric hydrogel.

Clause 82. The method of any preceding clause, wherein the first uncured rubber and the second uncured rubber can independently comprise an uncured natural rubber.

Clause 83. The method of any preceding clause, wherein the first uncured rubber and the second uncured rubber can independently comprise an uncured synthetic rubber.

Clause 84. The method of any preceding clause, wherein the first uncured rubber and the second uncured rubber can independently comprise an uncured butadiene rubber, an uncured styrene-butadiene (SBR) rubber, an uncured butyl rubber, an uncured isoprene rubber, an uncured nitrile rubber, an uncured urethane rubber, or any combination thereof.

Clause 85. The method of any preceding clause, wherein the composition further comprises a crosslinking agent for crosslinking the uncured rubber.

Clause 86. The method of any preceding clause, wherein the crosslinking agent includes a thermally initiated crosslinking agent.

Clause 87. The method of any preceding clause, wherein the thermally initiated crosslinking agent is a sulfur-based crosslinking agent or a peroxide-based crosslinking agent.

Clause 88. The method of any preceding clause, wherein the uncured rubber is an actinic radiation curable rubber, and the crosslinking agent is an initiator for crosslinking the radiation curable rubber upon exposure to actinic radiation.

Clause 89. The method of any preceding clause, wherein curing includes exposing the first uncured rubber and the second uncured rubber to actinic radiation in an amount and for a duration to at least partially cure the first uncured rubber and the second uncured rubber.

Clause 90. A structure prepared according to the method of any preceding clause.

Clause 91. An article of footwear prepared according to the method of any preceding clause.

Clause 92. A method of forming an outsole, the method comprising: shaping a first composition to form a first portion, wherein the first composition includes a mixture of a first uncured or partially cured rubber and a first polymeric hydrogel at a first concentration, wherein the first polymeric hydrogel is distributed throughout the first uncured or partially cured rubber; and curing the first portion to form a first elastomeric material, thereby curing the first uncured or partially cured rubber into a first fully cured rubber, and forming a first polymeric network including the first fully cured rubber in the first elastomeric material, wherein the first polymeric hydrogel is distributed throughout and entrapped by the first polymeric network and optionally: the shaping the second composition comprises placing the second composition in a second region of a mold that is an externally-facing side an outsole, wherein the second region of the mold is configured to form channels and optional traction elements; the shaping the first composition and contacting the at least an edge of the first portion with the at least an edge of the second portion comprises placing the first composition in a first region of the mold, wherein the first region of the mold is configured to form a substrate for the channels and optionally the traction elements, and placing the first composition in the first region of the mold comprises contacting a second side of the second portion with a first side of the first portion; the curing comprises curing fully curing both the first portion and the second portion in the mold and bonding the first side of the first portion to the second side of the second portion; and following the curing, removing the bonded first portion and second from the mold, wherein the channels and optionally the traction elements are on the externally-facing side an outsole.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1 percent to about 5 percent" should be interpreted to include not only the explicitly recited concentration of about 0.1 wt percent to about 5 wt percent, but also include individual concentrations (e.g., 1 percent, 2 percent, 3 percent, and 4 percent) and the sub-ranges (e.g., 0.5 percent, 1.1 percent, 2.2 percent, 3.3 percent, and 4.4 percent) within the indicated range. The term "about" can include traditional rounding according to significant figures of the numerical value. In addition, the phrase "about 'x' to 'y'" includes "about 'x' to about 'y'".

Many variations and modifications may be made to the above-described aspects, embodiments and examples. All such modifications and variations are intended to be included herein within the scope of this disclosure and protected by the following claims.

What is claimed:

1. A structure comprising:
a first layer having an externally-facing side and an internally-facing side opposing the externally-facing side, wherein the first layer is formed from a cured rubber that is substantially impermeable to water; and
a second layer attached to the internally-facing side of the first layer, wherein the second layer is water-swellable, and wherein the second layer comprises an elastomeric material that is a cured product of a blend of a polymeric hydrogel and an uncured millable rubber, wherein the polymeric hydrogel is distributed throughout the cured product, at least a portion of the polymeric hydrogel is entrapped in the cured product, and the polymeric hydrogel comprises a polymer selected from polyurethanes, polyesters, polyethers, polyamides, vinyl polymers, polyacrylonitriles, polyphenylene ethers, polycarbonates, polyureas, polystyrenes, co-polymers thereof, and any combination thereof;
wherein the second layer is attached to the internally-facing side of the first layer by crosslinks between the cured rubber of the first layer and the cured product of the second layer;
wherein the first layer comprises one or more channels that extend through an entire thickness of the first layer to the second layer,
the one or more channels expose a region of the second layer,
the one or more channels allow water to contact the exposed region of the second layer, each of the one or more channels has a first channel sidewall in the first layer and an opposing second channel sidewall in the first layer, and the first sidewall has a first position relative to the second sidewall when the exposed region of the second layer is substantially dry, and a second position relative to the second sidewall when the exposed region takes up water and swells, wherein the second position differs from the first position in a measurable distance along at least a portion of a length, a width, a height, or any combination thereof, of the at least one channel.

2. The structure of claim 1, wherein the one or more channels allow liquid water to contact the exposed region of the second layer.

3. The structure of claim 1, wherein at least one of the channels in the first layer has a width of about 0.1 millimeter to about 5 millimeters in the dry-state structure.

4. The structure of claim 1, wherein at least one of the channels increases in width by about 10 percent to 500 percent upon exposure of the structure to water.

5. The structure of claim 1, wherein the structure is attached to a textile.

6. The structure of claim 5, wherein the cured rubber of the first layer, the cured product of the second layer, or both infiltrate the textile and consolidate a plurality of fibers of the textile.

7. The structure of claim 1, further comprising a third layer disposed on the second layer on the side opposite the first layer, wherein the third layer is a first boundary layer that constrains the second layer.

8. The structure of claim 7, further comprising a fourth layer, wherein at least a portion of the fourth layer is disposed on at least one edge of the second layer, wherein the fourth layer is a second boundary layer that constrains the second layer.

9. The structure of claim 8, wherein the first boundary, the second boundary, or both are configured to constrain the second layer so that upon swelling of the second layer, the topography of the first layer changes relative to the topography of the first layer when the second layer swells without the first boundary, the second boundary, or both.

10. The structure of claim 1, wherein the polymeric hydrogel comprises a polyurethane hydrogel.

11. The structure of claim 1,
wherein the elastomeric material of the second layer is a thermally cured product of the blend, and the blend further comprises a thermally-initiated crosslinking agent.

12. The structure of claim 11, wherein the thermally-initiated crosslinking agent is a sulfur-based thermally-initiated crosslinking agent or a peroxide-based thermally-initiated crosslinking agent.

13. The structure of claim 12, wherein the uncured millable rubber is a millable polyurethane rubber.

14. The structure of claim 1, wherein the polymeric hydrogel is a thermoplastic hydrogel, and the melting temperature of the thermoplastic hydrogel is about 90 degrees C. to about 190 degrees C. when determined in accordance with ASTM D3418-97.

* * * * *